US012101788B2

(12) United States Patent
Jeon et al.

(10) Patent No.: US 12,101,788 B2
(45) Date of Patent: *Sep. 24, 2024

(54) GROUP COMMON DCI FOR WIRELESS RESOURCES

(71) Applicant: Comcast Cable Communications, LLC, Philadelphia, PA (US)

(72) Inventors: Hyoungsuk Jeon, Centreville, VA (US); Esmael Hejazi Dinan, McLean, VA (US); Hua Zhou, Vienna, VA (US); Alireza Babaei, Fairfax, VA (US); Kyungmin Park, Vienna, VA (US); Ali Cagatay Cirik, Chantilly, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/353,144

(22) Filed: Jul. 17, 2023

(65) Prior Publication Data
US 2024/0032048 A1 Jan. 25, 2024

Related U.S. Application Data

(63) Continuation of application No. 16/171,800, filed on Oct. 26, 2018, now Pat. No. 11,751,204.
(Continued)

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/00* (2013.01); *H04L 5/0098* (2013.01); *H04W 28/20* (2013.01); *H04W 72/0453* (2013.01)

(58) Field of Classification Search
None
See application file for complete search history.

(56) References Cited

U.S. PATENT DOCUMENTS

| 8,976,698 B2 | 3/2015 | Chen et al. |
| 2009/0257408 A1 | 10/2009 | Zhang et al. |

(Continued)

FOREIGN PATENT DOCUMENTS

| EP | 2672649 A1 | 12/2013 |
| EP | 2485519 B1 | 10/2016 |

(Continued)

OTHER PUBLICATIONS

R1-1715675 3GPP TSG RAN WG1 Meeting NR Ad Hoc, Nagoya, Japan, Sep. 18-21, 2017, Source: Guangdong OPPO Mobile Telecom, Title: Uplink power control mechanism for NR.
(Continued)

*Primary Examiner* — Andre Tacdiran
(74) *Attorney, Agent, or Firm* — Banner & Witcoff, Ltd.

(57) ABSTRACT

Systems, apparatuses, and methods are described for wireless communications. A base station may send, to a wireless device, one or more radio resource control messages comprising parameters for one or more bandwidth parts or other wireless resources. The base station may send, to the wireless device, downlink control information comprising one or more bandwidth part identifiers. The wireless device may switch, based on the downlink control information, from a first bandwidth part to a second bandwidth part.

36 Claims, 22 Drawing Sheets

Related U.S. Application Data

(60) Provisional application No. 62/577,995, filed on Oct. 27, 2017.

(51) Int. Cl.
*H04W 28/20* (2009.01)
*H04W 72/0453* (2023.01)

(56) References Cited

U.S. PATENT DOCUMENTS

| | | |
|---|---|---|
| 2011/0003555 A1 | 1/2011 | Guo |
| 2011/0032895 A1 | 2/2011 | Englund et al. |
| 2013/0343273 A1 | 12/2013 | Barbieri et al. |
| 2014/0029486 A1 | 1/2014 | Li et al. |
| 2014/0098761 A1 | 4/2014 | Lee et al. |
| 2014/0105164 A1 | 4/2014 | Moulsley et al. |
| 2014/0171144 A1 | 6/2014 | Kim et al. |
| 2014/0286283 A1 | 9/2014 | Kim et al. |
| 2014/0362832 A1 | 12/2014 | Rudolf et al. |
| 2015/0016352 A1 | 1/2015 | Bressanelli et al. |
| 2015/0208386 A1 | 7/2015 | Yang et al. |
| 2015/0327107 A1 | 11/2015 | Kim et al. |
| 2015/0334769 A1 | 11/2015 | Kim et al. |
| 2016/0150440 A1 | 5/2016 | Lee et al. |
| 2017/0134880 A1 | 5/2017 | Rico Alvarino et al. |
| 2017/0156152 A1 | 6/2017 | Nazar et al. |
| 2017/0238323 A1 | 8/2017 | Marinier et al. |
| 2017/0245165 A1 | 8/2017 | Onggosanusi et al. |
| 2017/0264401 A1 | 9/2017 | Soong et al. |
| 2017/0332387 A1 | 11/2017 | Zhang et al. |
| 2017/0353223 A1 | 12/2017 | Kim et al. |
| 2018/0006701 A1 | 1/2018 | Ahn et al. |
| 2018/0049047 A1 | 2/2018 | Lin et al. |
| 2018/0049060 A1 | 2/2018 | Fujishiro et al. |
| 2018/0049169 A1 | 2/2018 | Lin et al. |
| 2018/0070403 A1 | 3/2018 | Uemura et al. |
| 2018/0084593 A1 | 3/2018 | Chen et al. |
| 2018/0092157 A1 | 3/2018 | Chen |
| 2018/0123765 A1 | 5/2018 | Cao et al. |
| 2018/0124648 A1 | 5/2018 | Park et al. |
| 2018/0124687 A1 | 5/2018 | Park et al. |
| 2018/0124815 A1 | 5/2018 | Papasakellariou |
| 2018/0131493 A1 | 5/2018 | Luo et al. |
| 2018/0139734 A1 | 5/2018 | Babaei et al. |
| 2018/0176937 A1 | 6/2018 | Chen et al. |
| 2018/0183551 A1 | 6/2018 | Chou et al. |
| 2018/0288746 A1 | 10/2018 | Zhang et al. |
| 2018/0295651 A1 | 10/2018 | Cao et al. |
| 2018/0343154 A1 | 11/2018 | Park et al. |
| 2018/0376380 A1 | 12/2018 | Leroux |
| 2019/0044649 A1 | 2/2019 | Kim et al. |
| 2019/0044811 A1* | 2/2019 | Miao ............... H04L 5/001 |
| 2019/0052432 A1 | 2/2019 | Islam et al. |
| 2019/0103953 A1 | 4/2019 | Liao et al. |
| 2019/0103954 A1 | 4/2019 | Lee et al. |
| 2019/0132092 A1 | 5/2019 | Chen et al. |
| 2019/0132109 A1 | 5/2019 | Zhou et al. |
| 2019/0132824 A1 | 5/2019 | Jeon et al. |
| 2019/0132845 A1* | 5/2019 | Babaei ............... H04L 1/1812 |
| 2019/0149213 A1* | 5/2019 | Zhou ............... H04L 5/0055 370/329 |
| 2019/0191381 A1 | 6/2019 | Zhang et al. |
| 2019/0199503 A1 | 6/2019 | Son et al. |
| 2019/0254110 A1 | 8/2019 | He et al. |
| 2019/0373667 A1 | 12/2019 | Jeon et al. |
| 2020/0059345 A1 | 2/2020 | Pelletier et al. |
| 2020/0092864 A1* | 3/2020 | Chen ............... H04W 36/06 |
| 2020/0163085 A1 | 5/2020 | Takeda et al. |
| 2020/0205157 A1 | 6/2020 | Zhu |
| 2020/0259622 A1 | 8/2020 | Cao et al. |
| 2020/0260442 A1* | 8/2020 | Yi ............... H04W 72/23 |
| 2020/0337069 A1 | 10/2020 | Jiang et al. |
| 2020/0344034 A1* | 10/2020 | Moon ............... H04W 72/1263 |
| 2020/0374866 A1 | 11/2020 | Takeda et al. |

FOREIGN PATENT DOCUMENTS

| | | |
|---|---|---|
| EP | 3282633 A1 | 2/2018 |
| WO | 2011038243 A2 | 3/2011 |
| WO | 2011038243 A3 | 7/2011 |
| WO | 2011085230 A2 | 7/2011 |
| WO | 2017197155 A1 | 11/2017 |
| WO | 2017204595 A1 | 11/2017 |
| WO | 2018021834 A1 | 2/2018 |
| WO | 2018031638 A1 | 2/2018 |
| WO | 2018031924 A1 | 2/2018 |
| WO | 2018044116 A1 | 3/2018 |
| WO | 2018080260 A1 | 5/2018 |
| WO | 2018084544 A1 | 5/2018 |
| WO | 2018084571 A1 | 5/2018 |
| WO | 2018085145 A1 | 5/2018 |
| WO | 2018089117 A1 | 5/2018 |
| WO | 2018145019 A1 | 8/2018 |

OTHER PUBLICATIONS

R1-1715838 3GPP TSG RAN WG1 Meeting NR Ad Hoc, Nagoya, Japan, Sep. 18-21, 2017, Source: CATT, Title: NR Power Control Framework.

R1-1715902 3GPP TSG RAN WG1 Meeting NR Ad Hoc, Nagoya, Japan, Sep. 18-21, 2017, Source: LG Electronics, Title: Discussion on UL power control for NR.

R1-1716040 3GPP TSG RAN WG1 Meeting NR Ad Hoc, Nagoya, Japan, Sep. 18-21, 2017, Source: Samsung, Title: On UL Power Control.

R1-1716061 3GPP TSG RAN WG1 Meeting NR Ad Hoc, Nagoya, Japan, Sep. 18-21, 2017, Source: CMCC, Title: Discussion on power control framework.

R1-1716114 3GPP TSG RAN WG1 Meeting NR Ad Hoc, Nagoya, Japan, Sep. 18-21, 2017, Source: NTT Docomo, Inc., Title: Power control framework for PUSCH.

R1-1716127 3GPP TSG RAN WG1 Meeting NR Ad Hoc, Nagoya, Japan, Sep. 18-21, 2017, Source: Nokia, Nokia Shanghai Bell, Title: Discussion on NR power control framework.

R1-1716451 3GPP TSG RAN WG1 Meeting NR Ad Hoc, Nagoya, Japan, Sep. 18-21, 2017, Source: Qualcomm Incorporated, Title: Power control and PHR for NR.

R1-1716515 3GPP TSG RAN WG1 Meeting NR Ad Hoc, Nagoya, Japan, Sep. 18-21, 2017, Source: InterDigital Inc., Title: Further Details on Uplink Power Control.

R1-1716535 3GPP TSG RAN WG1 Meeting NR Ad Hoc, Nagoya, Japan, Sep. 18-21, 2017, Source: Panasonic, Title: Discussion on NR power control framework.

R1-1716604 3GPP TSG RAN WG1 Meeting NR Ad Hoc, Nagoya, Japan, Sep. 18-21, 2017, Source: Ericsson, Title: NR UL power control framework.

R1-1716606 3GPP TSG RAN WG1 Meeting NR Ad Hoc, Nagoya, Japan, Sep. 18-21, 2017, Source: Ericsson, Title: Closed loop PC in NR.

R1-1717311 3GPP TSG RAN WG1 Meeting NR Ad Hoc, Nagoya, Japan, Sep. 18-21, 2017, Source: Huawei, HiSilicon, Title: General considerations on UL power control design.

R1-1717408 3GPP TSG RAN WG1 Meeting #90bis, Prague, Czech Republic, Oct. 9-13, 2017, Source: Intel Corporation, Title: Remaining Details on UL Power Control Framework.

R1-1717438 3GPP TSG RAN WG1 Meeting #90bis, Prague, Czech Republic, Oct. 9-13, 2017, Source: ZTE, Sanechips, Title: On NR Power Control.

R1-1717508 3GPP TSG RAN WG1 Meeting #90bis, Prague, Czech Republic, Oct. 9-13, 2017, Source: vivo, Title: Remaining issues on NR UL power control.

R1-1717692 3GPP TSG RAN WG1 Meeting #90bis, Prague, Czech Republic, Oct. 9-13, 2017, Source: Samsung, Title: On UL Power Control.

R1-1717846 3GPP TSG RAN WG1 Meeting NR Ad Hoc, Nagoya, Japan, Sep. 18-21, 2017, Source: CATT, Title: NR Power Control Aspects.

(56) References Cited

OTHER PUBLICATIONS

R1-1717892 3GPP TSG RAN WG1 Meeting #90bis, Prague, Czech Republic, Oct. 9-13, 2017, Source: CMCC, Title: Discussion on power control framework.
R1-1717919 3GPP TSG RAN WG1 Meeting #90bis, Prague, Czech Republic, Oct. 9-13, 2017, Source: Panasonic, Title: Discussion on NR power control framework.
R1-1717983 3GPP TSG RAN WG1 Meeting #90bis, Prague, Czech Republic, Oct. 9-13, 2017, Source: LG Electronics, Title: Discussion on UL power control for NR.
R1-1718031 3GPP TSG RAN WG1 Meeting #90bis, Prague, Czech Republic, Oct. 9-13, 2017, Source: OPPO, Title: On uplink power control for NR.
R1-1718228 3GPP TSG RAN WG1 Meeting #90bis, Prague, Czech Republic, Oct. 9-13, 2017, Source: NTT Docomo, Inc., Title: Power control framework for PUSCH.
R1-1718502 3GPP TSG RAN WG1 Meeting #90bis, Prague, Czech Republic, Oct. 9-13, 2017, Source: InterDigital, Inc., Title: On NR Power Control Framework.
R1-1718592 3GPP TSG RAN WG1 Meeting #90bis, Prague, Czech Republic, Oct. 9-13, 2017, Source: Qualcomm Incorporated, Title: Power control and PHR for NR.
R1-1718625 3GPP TSG RAN WG1 Meeting #90bis, Prague, Czech Republic, Oct. 9-13, 2017, Source: ITL, Title: UL power control and PHR.
R1-1718652 3GPP TSG RAN WG1 Meeting #90bis, Prague, Czech Republic, Oct. 9-13, 2017, Source: Ericsson, Title: NR power control framework.
R1-1718655 3GPP TSG RAN WG1 Meeting #90bis, Prague, Czech Republic, Oct. 9-13, 2017, Source: Ericsson, Title: Further details on closed loop power control.
R1-1718692 3GPP TSG RAN WG1 Meeting #90bis, Prague, Czech Republic, Oct. 9-13, 2017, Source: Nokia, Nokia Shanghai Bell, Title: Discussion on NR power control framework.
R1-1718704 3GPP TSG RAN WG1 Meeting #90bis, Prague, Czech Republic, Oct. 9-13, 2017, Source: Motorola Mobility, Lenovo, Title: On NR power control.
3GPP TS 36.413 V13.3.0 (Jun. 2016), Technical Specification, 3rd Generation Partnership Project; Technical Specification Group Radio Access Network; Evolved Universal Terrestrial Radio Access Network (E-Utran); S1 Application ; Protocol (S1AP) (Release 13).
3GPP TS 36.211 V14.3.0 (Jun. 2017); Technical Specification; 3rd Generation Partnership Project; Technical Specification Group Radio Access Network; Evolved Universal Terrestrial Radio Access (E-UTRA); Physical channels and modulation (Release 14).
3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding (Release 14).
3GPP TS 36.213 V14.3.0 (Jun. 2017); Technical Specification; 3rd Generation Partnership Project; Technical Specification Group Radio Access Network; Evolved Universal Terrestrial Radio Access (E-UTRA); Physical layer procedures (Release 14).
3GPP TS 36.321 V10.3.0 (Sep. 2011), Technical Specification, 3rd Generation Partnership Project; Technical Specification Group Radio Access Network; Evolved Universal Terrestrial Radio Access (E-UTRA); Medium Access Control (MAC) Protocol Specification (Release 10).
3GPP TS 36.321 V14.3.0 (Jun. 2017), Technical Specification, 3rd Generation Partnership Project; Technical Specification Group Radio Access Network; Evolved Universal Terrestrial Radio Access (E-UTRA); Medium Access Control (MAC) Protocol Specification (Release 14).
3GPP TS 36.331 V14.3.0 (Jun. 2017), Technical Specification, 3rd Generation Partnership Project; Technical Specification Group Radio Access Network; Evolved Universal Terrestrial Radio Access (E-UTRA); Radio Resource Control (RCC); Protocol Specification (Release 14).
3GPP TR 38.802 V14.1.0 (Jun. 2017), Technical Report, 3rd Generation Partnership Project; Technical Specification Group Radio Access Network; Study on New Radio Access Technology Physical Layer Aspects (Release 14).
3GPP TR 38.912 V14.0.0 (Mar. 2017), Technical Report, 3rd Generation Partnership Project; Technical Specification Group Radio Access Network; Study on New Radio (NR) Access Technology (Release 14).
3GPP TSG RAN WG1 Meeting #90bis, Prague, Czech Republic, Oct. 9-13, 2017, Title: RAN1 Chairman's Notes.
3GPP TSG RAN WG1 Meeting #93, Busan, Korea, May 21-25, 2018, Title: RAN1 Chairman's Notes.
3GPP TSG RAN WG2 NR Ad Hoc, Vancouver, Canada, Jan. 22-26, 2018, Source: Session Chair (InterDigital), Title: Report from LTE and NR User Plane Break-Out Session.
R2-1711835 3GPP TSG RAN WG2 Meeting #99bis, Prague, Czech Republic, Oct. 9-13, 2017, Source: Session Chair (InterDigital), Title: Report from LTE and NR User Plane Break-Out Session.
R1-1716353 3GPP TSG RAN WG1 Meeting NR Ad Hoc, Nagoya, Japan, Sep. 18-21, 2017, Source: Ericsson, Title: On dynamic triggering for CSI reports and CSI-RS.
R1-1716354 3GPP TSG RAN WG1 Meeting NR Ad Hoc, Nagoya, Japan, Sep. 18-21, 2017, Source: Ericsson, Title: A comparison of CSI-RS activation schemes based on MAC CE and DCI.
R1-1716357 3GPP TSG RAN WG1 Meeting NR Ad Hoc, Nagoya, Japan, Sep. 18-21, 2017, Source: Ericsson, Title: On semi-persistent CSI reporting on PUSCH.
R1-1717939 3GPP TSG RAN WG1 Meeting #90bis, Prague, Czech Republic, Oct. 9-13, 2017, Source: LG Electronics, Title: Discussion on CSI measurement.
R1-1801073 3GPP TSG RAN WG1 NR Ad Hoc, Vancouver, Canada, Jan. 22-26, 2018, Source: RAN2, Title: LS on PDCCH order for initiation of random access.
R1-1805701 3GPP TSG RAN WG1 Meeting #92bis, Sanya, China, Apr. 16-20, 2018, Source: Qualcomm Incorporated, Title: Summary of Remaining Details on RACH Procedure.
R1-1805876 3GPP TSG RAN WG1 Meeting #93, Busan, Korea, May 21-25, 2018, Source: Huawei, HiSilicon, Title: Remaining details of RACH Procedures.
Jan. 1, 20196—European Search Report—EP 18202948.8.
OPPO "SPS operations for BWP switching" Oct. 8, 2017.
Ericsson "URLLC aspects for grant-free UL transmission in NR" Feb. 12, 2017.
Mar. 2, 20199—Extended European Search Report—EP 18205418.9.
Jun. 2, 20198—European Extended Search Report—19166254.3.
Huawei, HiSilicon: "Bandwidth part activation and adaptation", Sep. 18, 2017.
Interdigital, Inc.: "Remaining details of BWP", Sep. 18, 2017.
LG Electronics: "Discussion on carrier aggregation and bandwidth parts", Sep. 18, 2017.
R1-1718901 3GPP TSG RAN WG1 Meeting 90bis, Prague, Czech Republic, Oct. 9-13, 2017, Source: MediaTek Inc., Title: Summary of Bandwidth Part Operation.
Jul. 1, 20190—European Extended Search Report—EP 19175762.4.
3GPP TSG-RAN WG2 Meeting #102: "Email Discussion on SSB and Cell relationship", May 21, 2018.
3GPP TSG RAN WG1 Meeting #93: "Remaining Issues on Beam Management", May 21, 2018.
R1-1715425 3GPP TSG RAN WG1 Meeting NR Ad Hoc, Nagoya, Japan, Sep. 18-21, 2017, Source: Huawei, HiSilicon, Title: Overview of bandwidth part, CA, and DC operation including SRS switching.
R1-1715492 3GPP TSG RAN WG1 Meeting NR Ad Hoc, Nagoya, Japan, Sep. 18-21, 2017, Source: Fujitsu, Title: Considerations on UCI feedback for carrier aggregation.
R1-1715517 3GPP TSG RAN WG1 Meeting NR Ad Hoc, Nagoya, Japan, Sep. 18-21, 2017, Source: Spreadtrum Communications, Title: Consideration on monitoring preemption indication in bandwidth parts.

(56) References Cited

OTHER PUBLICATIONS

R1-1715535 3GPP TSG RAN WG1 Meeting NR Ad Hoc, Nagoya, Japan, Sep. 18-21, 2017, Source: Lenovo, Motorola Mobility, Title: HARQ-ACK codebook size determination for CA with different numerologies.
R1-1715648 3GPP TSG RAN WG1 Meeting NR Ad Hoc, Nagoya, Japan, Sep. 18-21, 2017, Source: vivo, Title: Remaining details for bandwidth part operation.
R1-1715692 3GPP TSG RAN WG1 Meeting NR Ad Hoc, Nagoya, Japan, Sep. 18-21, 2017, Source: Guangdong OPPO Mobile Telecom, Title: Remaining issues on bandwidth part configuration and activation.
R1-1715755 3GPP TSG RAN WG1 Meeting NR Ad Hoc, Nagoya, Japan, Sep. 18-21, 2017, Source: Nokia, Nokia Shanghai Bell, Title: On remaining aspects of NR CA/DC and BWPs.
R1-1715770 3GPP TSG RAN WG1 Meeting NR Ad Hoc, Nagoya, Japan, Sep. 18-21, 2017, Source: ETRI, Title: Remaining details of bandwidth part for initial access.
R1-1715774 3GPP TSG RAN WG1 Meeting NR Ad Hoc, Nagoya, Japan, Sep. 18-21, 2017, Source: Panasonic, Title: Combining DRX with BWP adaptation.
R1-1715830 3GPP TSG RAN WG1 Meeting NR Ad Hoc, Nagoya, Japan, Sep. 18-21, 2017, Source: CATT, Title: Remaining aspects of CA and wider bandwidth operation.
R1-1715892 3GPP TSG RAN WG1 Meeting NR Ad Hoc, Nagoya, Japan, Sep. 18-21, 2017, Source: LG Electronics, Title: Discussion on carrier aggregation and bandwidth parts.
R1-1716019 3GPP TSG RAN WG1 Meeting NR Ad Hoc, Nagoya, Japan, Sep. 18-21, 2017, Source: Samsung, Title: On Bandwidth Part Operation.
R1-1716109 3GPP TSG RAN WG1 Meeting NR Ad Hoc, Nagoya, Japan, Sep. 18-21, 2017, Source: NTT Docomo, Inc., Title: Remaing issues on bandwidth parts for NR.
R1-1716192 3GPP TSG RAN WG1 Meeting NR Ad Hoc, Nagoya, Japan, Sep. 18-21, 2017, Source: AT&T, Title: Remaining Details of Carrier Aggregation and Bandwidth Parts.
R1-1716202 3GPP TSG RAN WG1 Meeting NR Ad Hoc, Nagoya, Japan, Sep. 18-21, 2017, Source: MediaTek Inc., Title: Remaining Details on Bandwidth Part Operation in NR.
R1-1716258 3GPP TSG RAN WG1 Meeting NR Ad Hoc, Nagoya, Japan, Sep. 18-21, 2017, Source: InterDigital, Inc., Title: Remaining details of BWP.
R1-1716327 3GPP TSG RAN WG1 Meeting NR Ad Hoc, Nagoya, Japan, Sep. 18-21, 2017, Source: Intel Corporation, Title: Remaining aspects for carrier aggregation and bandwidth parts.
R1-1716440 3GPP TSG RAN WG1 Meeting NR Ad Hoc, Nagoya, Japan, Sep. 18-21, 2017, Source: Qualcomm Incorporated, Title: CA and BWP.
R1-1716601 3GPP TSG RAN WG1 Meeting NR Ad Hoc, Nagoya, Japan, Sep. 18-21, 2017, Source: Ericsson, Title: On CA related aspects and BWP related aspects.
R1-1716647 3GPP TSG RAN WG1 Meeting NR Ad Hoc, Nagoya, Japan, Sep. 18-21, 2017, Source: Convida Wireless, Title: Discussion on BWP Design.
R1-1717077 3GPP TSG RAN WG1 Meeting #90bis, Prague, Czech Republic, Oct. 9-13, 2017, Source: Huawei, HiSilicon, Title: Remaining issues on bandwidth part.
R1-1717400 3GPP TSG RAN WG1 Meeting #90bis, Prague, Czech Republic, Oct. 9-13, 2017, Source: Intel Corporation, Title: Remaining details for bandwidth parts.
R1-1717504 3GPP TSG RAN WG1 Meeting #90bis, Prague, Czech Republic, Oct. 9-13, 2017, Source: vivo, Title: Remaining details for bandwidth part operation.
R1-1717675 3GPP TSG RAN WG1 Meeting #90bis, Prague, Czech Republic, Oct. 9-13, 2017, Source: Samsung, Title: On Bandwidth Part Operation.
R1-1717839 3GPP TSG RAN WG1 Meeting #90bis, Prague, Czech Republic, Oct. 9-13, 2017, Source: CATT, Title: Remaining aspects of BWP operation.
R1-1717972 3GPP TSG RAN WG1 Meeting #90bis, Prague, Czech Republic, Oct. 9-13, 2017, Source: LG Electronics, Title: Remaining issues on bandwidth parts.
R1-1718050 3GPP TSG RAN WG1 Meeting #90bis, Prague, Czech Republic, Oct. 9-13, 2017, Source: OPPO, Title: Remaining issues on bandwidth part configuration and activation.
R1-1718223 3GPP TSG RAN WG1 Meeting #90bis, Prague, Czech Republic, Oct. 9-13, 2017, Source: NTT Docomo, Inc., Title: Remaing issues on bandwidth parts for NR.
R1-1718327 3GPP TSG RAN WG1 Meeting #90bis, Prague, Czech Republic, Oct. 9-13, 2017, Source: MediaTek Inc., Title: Remaining Details on Bandwidth Part Operation in NR.
R1-1718365 3GPP TSG RAN WG1 Meeting #90bis, Prague, Czech Republic, Oct. 9-13, 2017, Source: InterDigital, Inc., Title: Remaining details of BWP.
R1-1718404 3GPP TSG RAN WG1 Meeting #90bis, Prague, Czech Republic, Oct. 9-13, 2017, Source: AT&T, Title: Remaining details for bandwidth parts.
R1-1718523 3GPP TSG RAN WG1 Meeting #90bis, Prague, Czech Republic, Oct. 9-13, 2017, Source: Ericsson, Title: On bandwidth parties.
R1-1718580 3GPP TSG RAN WG1 Meeting #90bis, Prague, Czech Republic, Oct. 9-13, 2017, Source: Qualcomm Incorporated, Title: Open Issues on BWP.
R1-1718607 3GPP TSG RAN WG1 Meeting #90bis, Prague, Czech Republic, Oct. 9-13, 2017, Source: Nokia, Nokia Shanghai Bell, Title: On remaining aspects of BWPs.
R1-1715454 3GPP TSG RAN WG1 Meeting NR Ad Hoc, Nagoya, Japan, Sep. 18-21, 2017, Source: ZTE, Sanechips, Title: On NR Power Control.
R1-1715478 3GPP TSG RAN WG1 Meeting NR Ad Hoc, Nagoya, Japan, Sep. 18-21, 2017, Source: Huawei, HiSilicon, Title: General considerations on UL power control design.
R1-1715505 3GPP TSG RAN WG1 Meeting NR Ad Hoc, Nagoya, Japan, Sep. 18-21, 2017, Source: Mitsubishi Electric, Title: UL transmission power control.
R1-1715651 3GPP TSG RAN WG1 Meeting NR Ad Hoc, Nagoya, Japan, Sep. 18-21, 2017, Source: vivo, Title: NR UL power control framework.
R1-1807747 3GPP TSG RAN WG1 Meeting #93, Busan, Korea, May 21-25, 2018, Source: Qualcomm Incorporated, Title: Summary of Remaining Details on RACH Procedure.
R2-1800688 3GPP TSG RAN WG2 NR Ad Hoc, Vancouver, Canada, Jan. 22-26, 2018, Source: Ericsson, Title: Need for PDCCH order.
Sep. 9, 2019—European Extended Search Report—EP 19174705.4.
3GPP TR 38.804 V14.1.0 (Mar. 2017), Technical Report, 3rd Generation Partnership Project, Technical Specification Group Radio Access Network, Study on New Radio Access Technology, Radio Interface Protocol Aspects (Release 14).
3GPP TSG RAN WG1 Meeting #90, Prague, Czech Republic, Aug. 21-25, 2017, Title: RAN1 Chairman's Notes.
3GPP TSG RAN WG1 Meeting NR#3, Nagoya, Japan, Sep. 18-21, 2017, Title: RAN1 Chairman's Notes.
3GPP TSG RAN WG2 #99, Berlin, Germany, Aug. 21-25, 2017, Source: Vice-Chairwoman (InterDigital), Title: Report from LTE and NR User Plane Break-Out Session.
3GPP TSG-RAN WG2 NR Ad Hoc, Qingdao, China, Jun. 27-30, 2017, Source: RAN1 Chairman, Object: Chairman Notes.
R1-1706901 3GPP TSG-RAN WG1 #89, Hangzhou, China, May 15-19, 2017, Source: Huawei, HiSilicon, Title: TB mapping for slot aggregation.
R1-1706909 3GPP TSG-RAN WG1 #89, Hangzhou, China, May 15-19, 2017, Source: Huawei, HiSilicon, Title: On uplink data scheduling.
R1-1706914 3GPP TSG-RAN WG1 #89, Hangzhou, China, May 15-19, 2017, Source: Huawei, HiSilicon, Title: Numerology for multiplexing of eMBB and URLLC.
R1-1707166 3GPP TSG-RAN WG1 #89, Hangzhou, China, May 15-19, 2017, Source: ZTE, Title: HARQ for URLLC UL Grant-free transmission.

(56) References Cited

OTHER PUBLICATIONS

R1-1707176 3GPP TSG-RAN WG1 #89, Hangzhou, China, May 15-19, 2017, Source: ZTE, Title: Multiplexing data with different transmission durations.
R1-1707195 3GPP TSG-RAN WG1 #89, Hangzhou, China, May 15-19, 2017, Source: FiberHome, Title: Discussion on resource allocation for NR.
R1-1707237 3GPP TSG-RAN WG1 #89, Hangzhou, China, May 15-19, 2017, Source: vivo, Title: Discussion on flexible length scheduling.
R1-1707508 3GPP TSG-RAN WG1 #89, Hangzhou, China, May 15-19, 2017, Source: CATT, Title: NR DL scheduling mechanism.
R1-1707656 3GPP TSG-RAN WG1 #89, Hangzhou, China, May 15-19, 2017, Source: LG Electronics, Title: Consideration on HARQ-ACK feedback method for NR.
R1-1707662 3GPP TSG-RAN WG1 #89, Hangzhou, China, May 15-19, 2017, Source: LG Electronics, Title: Consideration on CB group based HARQ-ACK feedback.
R1-1708017 3GPP TSG-RAN WG1 #89, Hangzhou, China, May 15-19, 2017, Source: Samsung, Title: DL Resource Allocation Aspects.
R1-1709991 3GPP TSG-RAN WG1 NR Ad Hoc, Qingdao, China, Jun. 27-30, 2017, Source: Huawei, HiSilicon, Title: Resource configuration on UL transmission without grant.
R1-1710015 3GPP TSG-RAN WG1 NR Ad Hoc, Qingdao, China, Jun. 27-30, 2017, Source: ZTE, Title: Considerations on the procedures of UL data transmission without grant.
R1-1710094 3GPP TSG-RAN WG1 NR Ad Hoc, Qingdao, China, Jun. 27-30, 2017, Source: CATT, Title: Grant-free UL transmission procedure.
R1-1710327 3GPP TSG-RAN WG1 NR Ad Hoc, Qingdao, China, Jun. 27-30, 2017, Source: LG Electronics, Title: Discussion on UL transmission without grant.
R1-1710380 3GPP TSG-RAN WG1 NR Ad Hoc, Qingdao, China, Jun. 27-30, 2017, Source: vivio, Title: Discussion on UL grant-free transmission.
R1-1710568 3GPP TSG-RAN WG1 NR Ad Hoc, Qingdao, China, Jun. 27-30, 2017, Source: Intel Corporation, Title: UL grant-free transmissions: Resource configuration.
R1-1710621 3GPP TSG-RAN WG1 NR Ad Hoc, Qingdao, China, Jun. 27-30, 2017, Source: ETRI, Title: Resource allocation and transmission scheme for URLLC grant-free transmission.
R1-1710723 3GPP TSG-RAN WG1 NR Ad Hoc, Qingdao, China, Jun. 27-30, 2017, Source: Samsung, Title: Procedures for Grant-Free UL Transmissions.
R1-1710724 3GPP TSG-RAN WG1 NR Ad Hoc, Qingdao, China, Jun. 27-30, 2017, Source: Samsung, Title: Grant-free and grant-based UL transmissions.
R1-1710887 3GPP TSG-RAN WG1 NR Ad Hoc, Qingdao, China, Jun. 27-30, 2017, Source: Intel Corporation, Title: UL grant-free transmissions: Physical layer procedures.
R1-1710963 3GPP TSG-RAN WG1 NR Ad Hoc, Qingdao, China, Jun. 27-30, 2017, Source: NEC, Title: On network resources and UE transmission configurations for grant-free access.
R1-1710971 3GPP TSG-RAN WG1 NR Ad Hoc, Qingdao, China, Jun. 27-30, 2017, Source: China Telecom, Title: UL grant-free transmission for URLLC.
R1-1711006 3GPP TSG-RAN WG1 NR Ad Hoc, Qingdao, China, Jun. 27-30, 2017, Source: Institute for Information Industry (III), Title: Issues and Control Design for UL Grant-free URLLC.
R1-1711111 3GPP TSG-RAN WG1 NR Ad Hoc, Qingdao, China, Jun. 27-30, 2017, Source: NTT Docomo, Inc., Title: Overall solutions for UL grant free transmission.
R1-1711253 3GPP TSG-RAN WG1 NR Ad Hoc, Qingdao, China, Jun. 27-30, 2017, Source: NICT, Title: Resource configuration for UL transmission without grant.
R1-1711504 3GPP TSG-RAN WG1 NR Ad Hoc, Qingdao, China, Jun. 27-30, 2017, Source: Ericsson, Title: On SPS/Grant-Free Transmission.
R1-1712689 3GPP TSG RAN WG1 Meeting #90, Prague, Czech Republic, Aug. 21-25, 2017, Source: Lenovo, Motorola Mobility, Title: HARQ design for uplink grant-free transmission.
R1-1712743 3GPP TSG RAN WG1 Meeting #90, Prague, Czech Republic, Aug. 21-25, 2017, Source: Fujitsu, Title: Discussions on HARQ for grant-free transmission.
R1-1712823 3GPP TSG RAN WG1 Meeting #90, Prague, Czech Republic, Aug. 21-25, 2017, Source: Orange, China Unicom, Nokia, Nokia Shanghai Bell, Ericsson, ZTE, Apple, Title: WF on Scenario 1.
R1-1712863 3GPP TSG RAN WG1 Meeting #90, Prague, Czech Republic, Aug. 21-25, 2017, Source: vivo, Title: Discussion on UL grant-free transmission.
R1-1713189 3GPP TSG RAN WG1 Meeting #90, Prague, Czech Republic, Aug. 21-25, 2017, Source: LG Electronics, Title: Discussion on UL transmission without grant.
R1-1713639 3GPP TSG RAN WG1 Meeting #90, Prague, Czech Republic, Aug. 21-25, 2017, Source: Samsung, Title: Procedures for Grant-Free UL Transmissions.
R1-1714011 3GPP TSG RAN WG1 Meeting #90, Prague, Czech Republic, Aug. 21-25, 2017, Source: Nokia, Nokia Shanghai Bell, Title: UL transmission procedure without grant.
R1-1715419 3GPP TSG RAN WG1 Meeting NR Ad Hoc, Nagoya, Japan, Sep. 18-21, 2017, Source: Huawei, HiSilicon, Title: UL data transmission with and without SR/UL grant.
R1-1715490 3GPP TSG RAN WG1 Meeting NR Ad Hoc, Nagoya, Japan, Sep. 18-21, 2017, Source: Fujitsu, Title: Discussions on HARQ for UL data transmission without grant.
R1-1715548 3GPP TSG RAN WG1 Meeting NR Ad Hoc, Nagoya, Japan, Sep. 18-21, 2017, Source: Nokia, Nokia Shanghai Bell, Title: Remaining issues on UL transmission without grant.
R1-1715562 3GPP TSG RAN WG1 Meeting NR Ad Hoc, Nagoya, Japan, Sep. 18-21, 2017, Source: ZTE, Sanechips, Title: Further discussion on UL transmission without grant.
R1-1715645 3GPP TSG RAN WG1 Meeting NR Ad Hoc, Nagoya, Japan, Sep. 18-21, 2017, Source: vivo, Title: Support of UL data transmission without grant.
R1-1715662 3GPP TSG RAN WG1 Meeting NR Ad Hoc, Nagoya, Japan, Sep. 18-21, 2017, Source: NEC, Title: Remaining issues on UL transmission without grant.
R1-1715769 3GPP TSG RAN WG1 Meeting NR Ad Hoc, Nagoya, Japan, Sep. 18-21, 2017, Source: ETRI, Title: DL HARQ-ACK for GF PUSCH transmission.
R1-1715888 3GPP TSG RAN WG1 Meeting NR Ad Hoc, Nagoya, Japan, Sep. 18-21, 2017, Source: LG Electronics, Title: Discussion on UL data transmission procedure.
R1-1716107 3GPP TSG RAN WG1 Meeting NR Ad Hoc, Nagoya, Japan, Sep. 18-21, 2017, Source: NTT Docomo, Inc., Title: UL data transmission without UL grant.
R1-1716483 3GPP TSG RAN WG1 Meeting NR Ad Hoc, Nagoya, Japan, Sep. 18-21, 2017, Source: InterDigital, Inc., Title: On remaining details of UL data transmission without grant.
R1-1716597 3GPP TSG RAN WG1 Meeting NR Ad Hoc, Nagoya, Japan, Sep. 18-21, 2017, Source: Ericsson, Title: On UL Data Transmission Procedure.
R1-1716623 3GPP TSG RAN WG1 Meeting NR Ad Hoc, Nagoya, Japan, Sep. 18-21, 2017, Source: MediaTek Inc., Title: On UL data transmission without grant design and configuration.
R1-171xxxx 3GPP TSG-RAN WG1 NR Ad Hoc, Qingdao, China, Jun. 27-30, 2017, Source: LG Electronics, Title: [draft] Summary of [89-22] Email discussion about UL data transmission without UL grant.
R1-17xxxxx 3GPP TSG RAN WG1 Meeting #90, Prague, Czech Republic, Aug. 21-25, 2017, Source: NTT Docomo, Inc., Title: Offline discussions on some topics for AI 6.1.3.1.
R2-1703453 3GPP TSG-RAN WG2 #97bis, Spokane, USA, Apr. 3-7, 2017, Source: Samsung, Title: HARQ for Numerology Multiplexing.
R2-1704479 3GPP TSG-RAN WG1 #98, Hangzhou, China, May 15-19, 2017, Source: Samsung, Title: The number of TBs per UL HARQ process.

(56) References Cited

OTHER PUBLICATIONS

R2-1704505 3GPP TSG-RAN WG1 #98, Hangzhou, China, May 15-19, 2017, Source: Samsung, Title: HARQ for numerology multiplexing.

R2-1704684 3GPP TSG-RAN WG1 #98, Hangzhou, China, May 15-19, 2017, Source: Ericsson, Title: Enhanced HARQ feedback mode in SPS.

R2-1706417 3GPP TSG-RAN WG2 NR Ad Hoc, Qingdao, China, Jun. 27-29, 2017, Source: CATT, Title: Grant-free transmission and SPS.

R2-1706448 3GPP TSG-RAN WG2 NR Ad Hoc, Qingdao, China, Jun. 27-29, 2017, Source: Spreadtrum Communications, Title: Discussion on UL grant-free transmission.

R2-1706589 3GPP TSG-RAN WG2 NR Ad Hoc, Qingdao, China, Jun. 27-29, 2017, Source: Nokia, Alcatel-Lucent Shanghai Bell, Title: Unified SPS and Grant-free operation.

R2-1706645 3GPP TSG-RAN WG2 NR Ad Hoc, Qingdao, China, Jun. 27-29, 2017, Source: ZTE, Title: Consideration on the multiple SPS and grant free.

R2-1706687 3GPP TSG-RAN WG2 NR Ad Hoc, Qingdao, China, Jun. 27-29, 2017, Source: InterDigital, Inc., Title: SPS and Grant-free operation for NR.

R2-1707098 3GPP TSG-RAN WG2 NR Ad Hoc, Qingdao, China, Jun. 27-29, 2017, Source: Samsung, Title: Uplink SPS and Grant-free Transmission Aspects.

R2-1707174 3GPP TSG-RAN WG2 NR Ad Hoc, Qingdao, China, Jun. 27-29, 2017, Source: Ericsson, Title: Grant Free and Semi-Persistent Scheduling in NR.

R2-1707247 3GPP TSG-RAN WG2 NR Ad Hoc, Qingdao, China, Jun. 27-29, 2017, Source: Huawei, HiSilicon, Title: Modelling of Grant free and SPS.

R2-1707268 3GPP TSG-RAN WG2 NR Ad Hoc, Qingdao, China, Jun. 27-29, 2017, Source: MediaTek Inc., Title: Comparison of SPS and grant-free schemes.

R2-1707500 3GPP TSG-RAN WG2 NR Ad Hoc, Quingdao, China, Jun. 27-29, 2017, Source: Vice-Chairwoman (InterDigital), Title: Report from NR User Plane Break-Out Session.

R2-1708732 3GPP TSG RAN WG2 #99, Berlin, Germany, Aug. 21-25, 2017, Source: InterDigital, Inc., Title: SPS and grant free operation.

R2-1708956 3GPP TSG RAN WG2 #99, Berlin, Germany, Aug. 21-25, 2017, Source: Huawei, HiSilicon, Title: Considerations on SPS and TTI-bundling in EN-DC.

R2-1709125 3GPP TSG RAN WG2 #99, Berlin, Germany, Aug. 21-25, 2017, Source: Qualcomm, Title: On reliable transmission of URLLC data.

R2-1709264 3GPP TSG RAN WG2 #99, Berlin, Germany, Aug. 21-25, 2017, Source: Huawei, HiSilicon, Title: Discussion on type 1 grant-free for connected mode UE.

R2-1710134 3GPP TSG RAN WG2 Meeting #99bis, Prague, Czech Republic, Oct. 9-13, 2017, Source: OPPO, Title: SPS operations for BWP switching.

R2-1710662 3GPP TSG RAN WG2 Meeting #99bis, Prague, Czech Republic, Oct. 9-13, 2017, Source: InterDigital, Inc., Title: SPS and grant free operation.

R2-1710958 3GPP TSG RAN WG2 Meeting #99bis, Prague, Czech Republic, Oct. 9-13, 2017, Source: vivo, Title: Duplication deactivation due to Scell or BWP deactivation.

R2-1711441 3GPP TSG RAN WG2 Meeting #99bis, Prague, Czech Republic, Oct. 9-13, 2017, Source: Huawei, HiSilicon, Title: MAC impact of bandwidth part activation/deactivation.

R2-1711613 3GPP TSG RAN WG2 Meeting #99bis, Prague, Czech Republic, Oct. 9-13, 2017, Source: LG Electronics, Title: PHR for wider bandwidth operation.

R2-1711643 3GPP TSG RAN WG2 Meeting #99bis, Prague, Czech Republic, Oct. 9-13, 2017, Source: Intel Corporation, Title: Activation of SCell containing BWPs.

R2-1711856 3GPP TSG-RAN WG2 #99bis, Prague, Czech Republic, Oct. 9-13, 2017, Source: RAN2, Title: LS to RAN1 on SPS and Grant-free.

R2-1711904 3GPP TSG RAN WG2 Meeting #99bis, Prague, Czech Republic, Oct. 9-13, 2017, Source: Qualcomm Incorporated, Title: UE Power Saving during Active State.

R2-1711993 3GPP TSG-RAN WG2 #99bis, Prague, Czech Republic, Oct. 9-13, 2017, Source: RAN2, Title: LS to RAN1 on SPS and Grant-free.

Apr. 2, 20209—European Office Action—EP 18202948.8.

R1-1717905 3GPP TSG RAN WG1 Meeting #90bis, Prague, Czech Republic, Oct. 9-13, 2017, Source: Huawei, HiSilicon, Title: Bandwidth part activation and adaptation.

U.S. Appl. No. 62/416,235. Pelletier (Year: 2016).
U.S. Appl. No. 62/440,262. Pelletier (Year: 2016).
U.S. Appl. No. 62/500,785. Pelletier (Year: 2017).
U.S. Appl. No. 62/519,249. Pelletier (Year: 2017).
U.S. Appl. No. 62/539,057. Pelletier (Year: 2017).
U.S. Appl. No. 62/563,440. Pelletier (Year: 2017).
Jun. 4, 2021—European Office Action—EP 18202948.8.

* cited by examiner

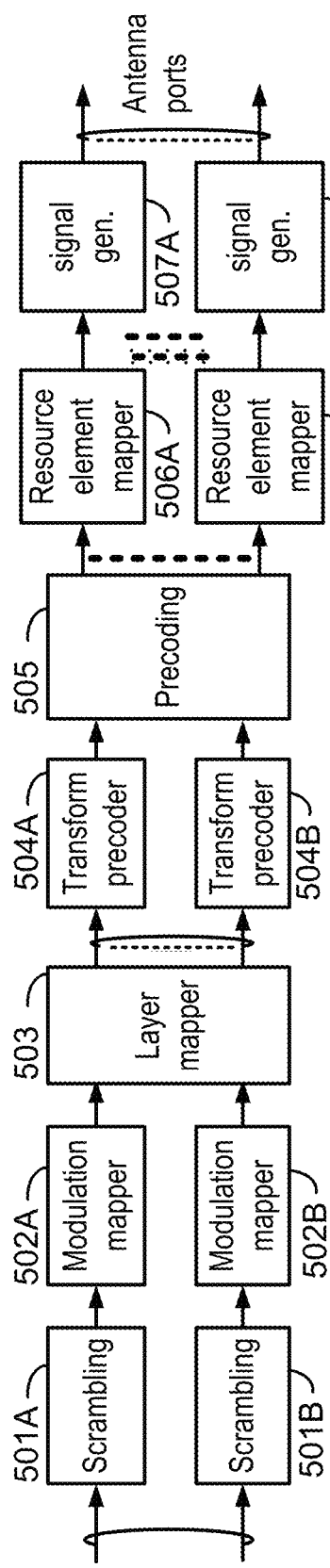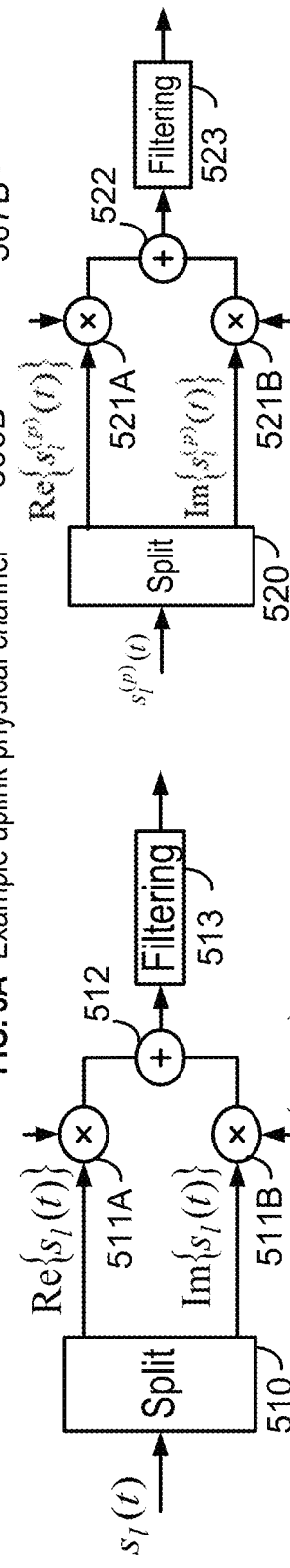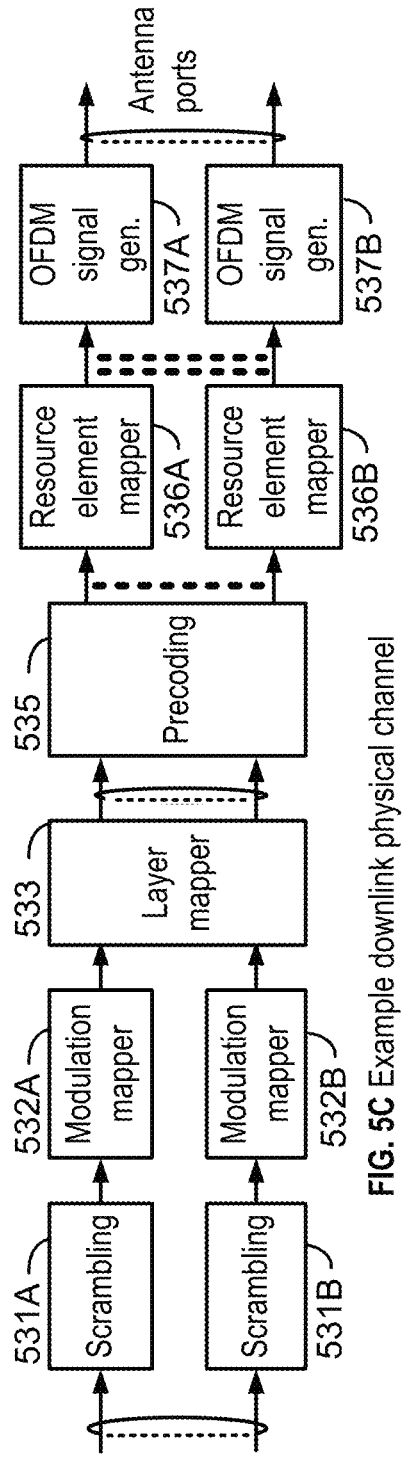
FIG. 5A Example uplink physical channel
FIG. 5B Example uplink modulation
FIG. 5C Example downlink physical channel
FIG. 5D Example downlink modulation

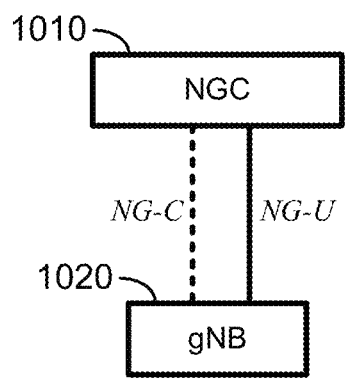
FIG. 10A gNB connected to NGC
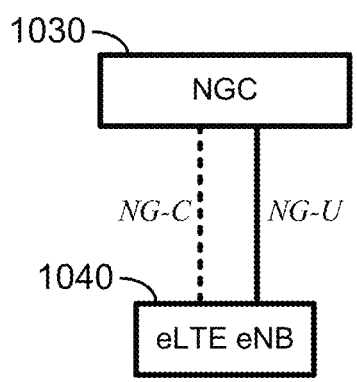
FIG. 10B eLTE eNB connected to NGC

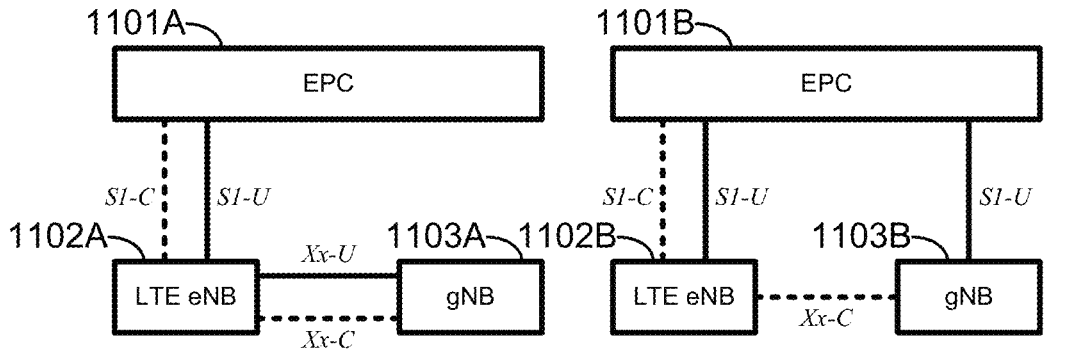

FIG. 11A LTE eNB connected to EPC with non-standalone gNB. gNB user plane connected to EPC via LTE eNB.

FIG. 11B LTE eNB connected to EPC with non-standalone gNB. gNB user plane connected to EPC directly.

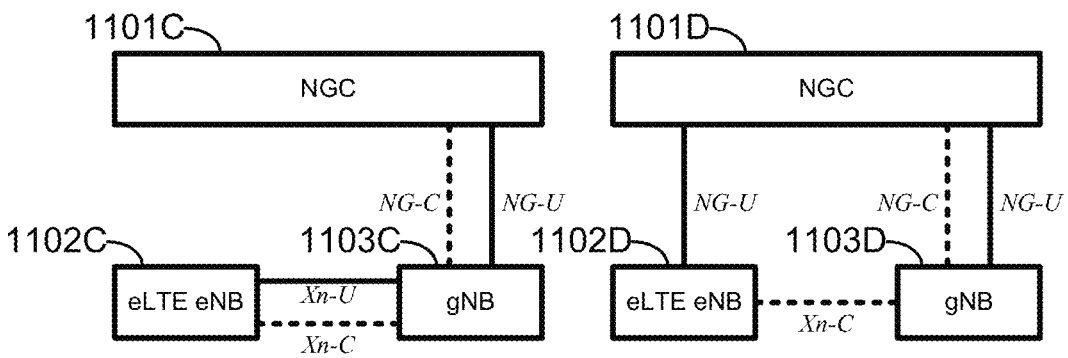

FIG. 11C gNB connected to NGC with non-standalone eLTE eNB. eLTE eNB user plane connected to NGC via gNB.

FIG. 11D gNB connected to NGC with non-standalone eLTE eNB. eLTE eNB user plane connected to NGC directly.

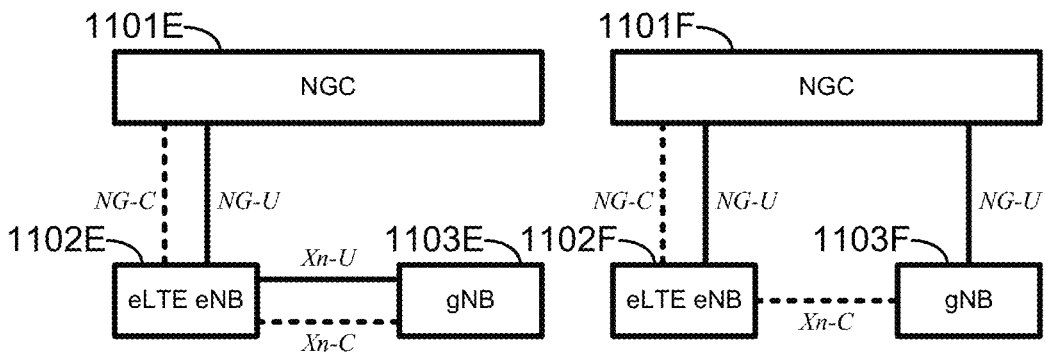

FIG. 11E eLTE eNB connected to NGC with non-standalone gNB. gNB user plane connected to NGC via eLTE eNB.

FIG. 11F eLTE eNB connected to NGC with non-standalone gNB. gNB user plane connected to NGC directly.

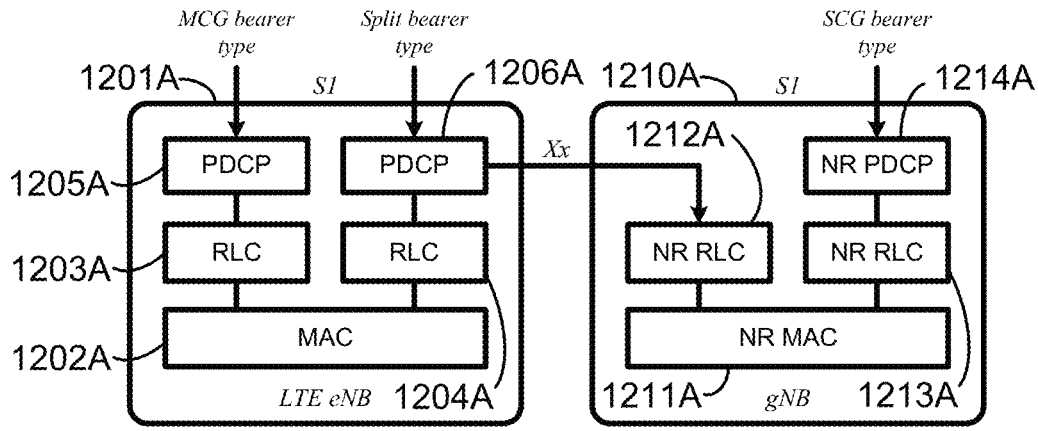
FIG. 12A Radio protocol architecture for split bearer and SCG bearer. LTE eNB connected to EPC with non-standalone gNB.
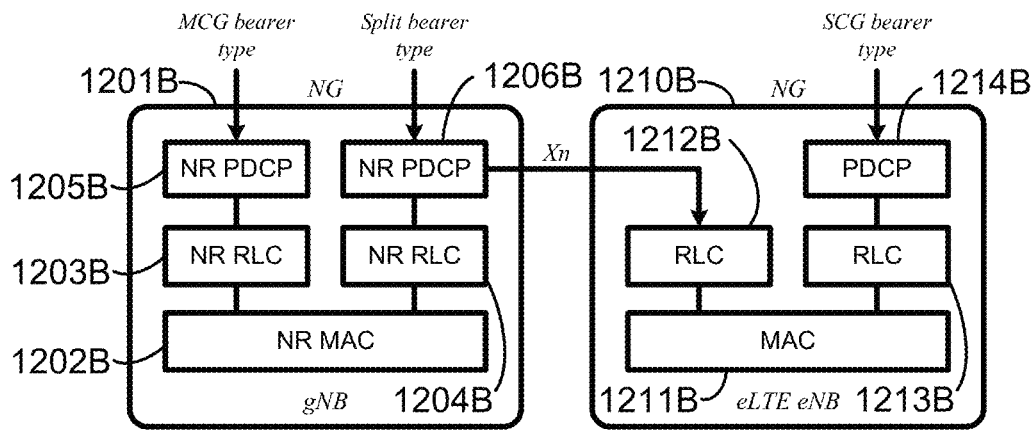
FIG. 12B Radio protocol architecture for split bearer and SCG bearer. gNB connected to NGC with non-standalone eLTE eNB.
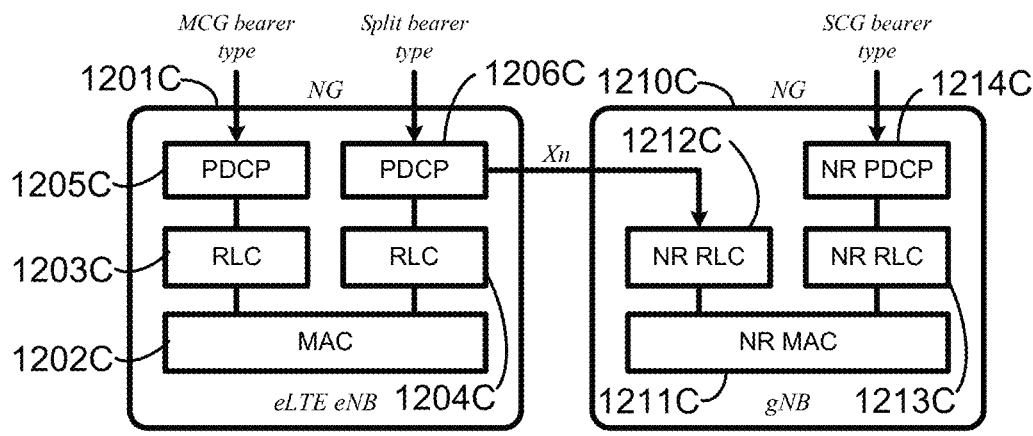
FIG. 12C Radio protocol architecture for split bearer and SCG bearer. eLTE eNB connected to NGC with non-standalone gNB.

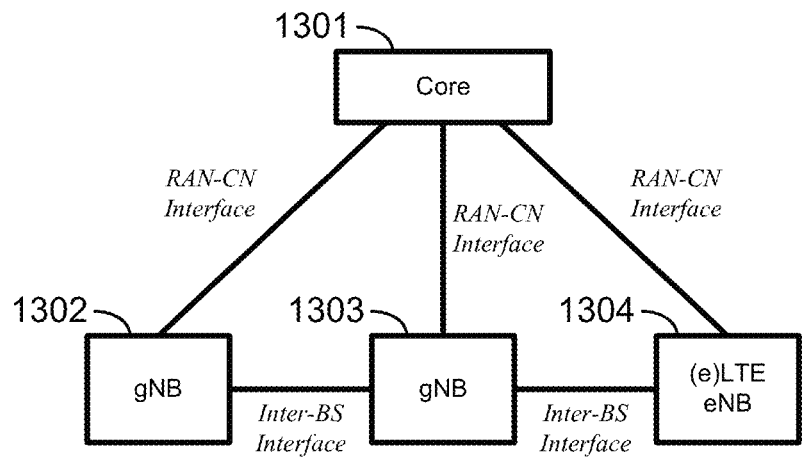
FIG. 13A Non-centralized deployment
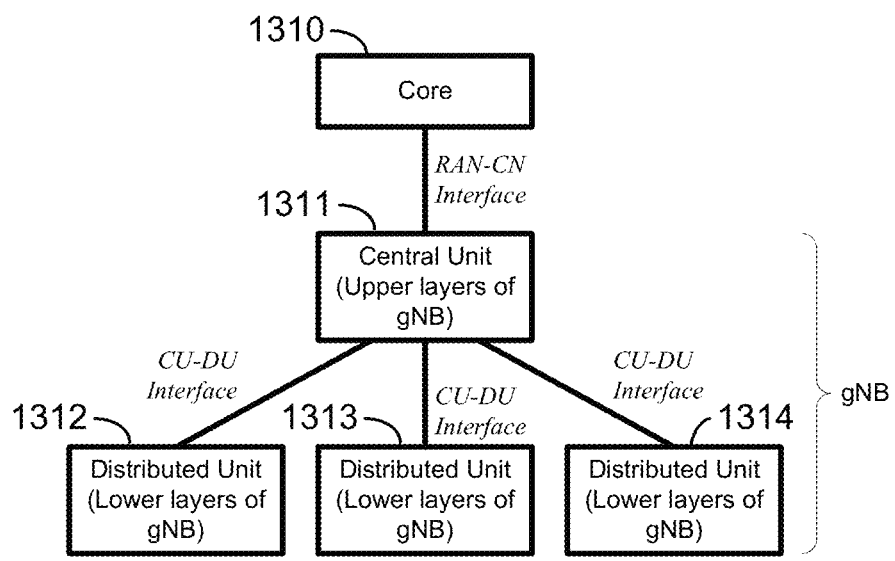
FIG. 13B Centralized deployment

GROUP COMMON DCI FOR WIRELESS RESOURCES

CROSS-REFERENCE TO RELATED APPLICATIONS

This application is a continuation of and claims priority to U.S. patent application Ser. No. 16/171,800, filed Oct. 26, 2018, which claims the benefit of U.S. Provisional Application No. 62/577,995, filed on Oct. 27, 2017, each of which is hereby incorporated by reference in its entirety.

BACKGROUND

In wireless communications, bandwidth parts and other wireless resources may be used by wireless devices. A base station may determine that one or more wireless devices should use or switch to one or more bandwidth parts or other wireless resources. It is desired to improve wireless communications without adversely increasing signaling overhead and/or decreasing spectral efficiency.

SUMMARY

The following summary presents a simplified summary of certain features. The summary is not an extensive overview and is not intended to identify key or critical elements.

Systems, apparatuses, and methods are described for communications associated with switching bandwidth parts or other wireless resources. A base station may send, to a wireless device, one or more radio resource control messages comprising parameters for one or more bandwidth parts and/or an index or an identifier associated with the wireless device. The base station may send, to the wireless device, downlink control information comprising one or more bandwidth part identifiers. The wireless device may determine, based on the index or the identifier for the wireless device, a position of a bandwidth part identifier in the downlink control information. The wireless device may switch from a first bandwidth part to a second bandwidth part indicated by the bandwidth part identifier.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A, FIG. 5B, FIG. 5C and FIG. 5D show examples for uplink and downlink signal transmission.

FIG. 10A and FIG. 10B show examples for interfaces between a 5G core network and base stations.

FIG. 11A, FIG. 11B, FIG. 11C, FIG. 11D, FIG. 11E, and FIG. 11F show examples for architectures of tight interworking between a 5G RAN and a long term evolution (LTE) radio access network (RAN).

FIG. 12A, FIG. 12B, and FIG. 12C show examples for radio protocol structures of tight interworking bearers.

FIG. 13A and FIG. 13B show examples for gNodeB (gNB) deployment.

DETAILED DESCRIPTION

Figure 1:
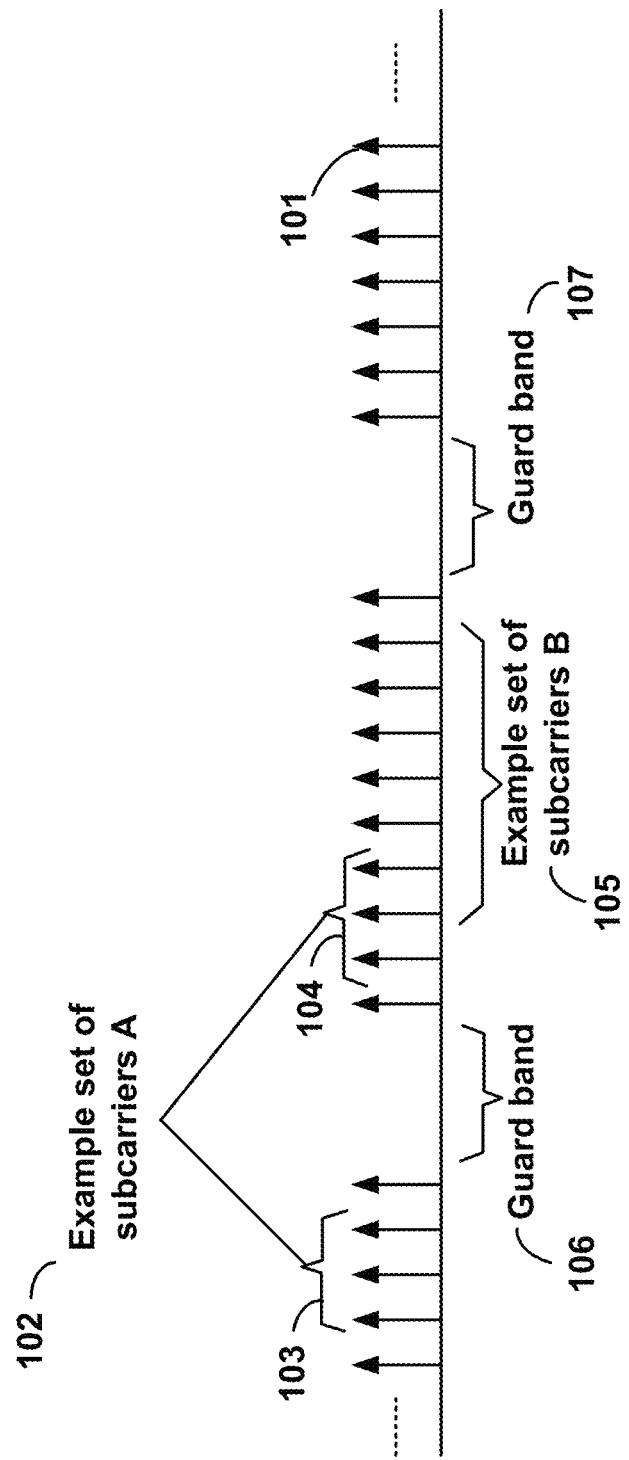
FIG. 1 shows example sets of orthogonal frequency division multiplexing (OFDM) subcarriers.

The accompanying drawings, which form a part hereof, show examples of the disclosure. It is to be understood that the examples shown in the drawings and/or discussed herein are non-exclusive and that there are other examples of how the disclosure may be practiced.

Examples may enable operation of carrier aggregation and may be used in the technical field of multicarrier communication systems. Examples may relate to bandwidth part switching in multicarrier communication systems.

The following acronyms are used throughout the present disclosure, provided below for convenience although other acronyms may be introduced in the detailed description:

3GPP 3rd Generation Partnership Project
5G 5th generation wireless systems
5GC 5G Core Network
ACK Acknowledgement
AMF Access and Mobility Management Function
ASIC application-specific integrated circuit
BPSK binary phase shift keying
CA carrier aggregation
CC component carrier
CDMA code division multiple access
CP cyclic prefix
CPLD complex programmable logic devices
CSI channel state information
CSS common search space
CU central unit
DC dual connectivity
DCI downlink control information
DFTS-OFDM discrete Fourier transform spreading OFDM DL downlink
DU distributed unit
eLTE enhanced LTE
eMBB enhanced mobile broadband
eNB evolved Node B
EPC evolved packet core
E-UTRAN evolved-universal terrestrial radio access network
FDD frequency division multiplexing
FPGA field programmable gate arrays
Fs-C Fs-control plane
Fs-U Fs-user plane
gNB next generation node B
HARQ hybrid automatic repeat request
HDL hardware description languages
ID identifier
IE information element
LTE long term evolution
MAC media access control
MCG master cell group
MeNB master evolved node B
MIB master information block
MME mobility management entity
mMTC massive machine type communications
NACK Negative Acknowledgement
NAS non-access stratum
NG CP next generation control plane core
NGC next generation core
NG-C NG-control plane
NG-U NG-user plane
NR MAC new radio MAC
NR PDCP new radio PDCP
NR PHY new radio physical
NR RLC new radio RLC
NR RRC new radio RRC
NR new radio
NSSAI network slice selection assistance information
OFDM orthogonal frequency division multiplexing
PCC primary component carrier
PCell primary cell
PDCCH physical downlink control channel
PDCP packet data convergence protocol
PDU packet data unit
PHICH physical HARQ indicator channel
PHY physical
PLMN public land mobile network
PSCell primary secondary cell
pTAG primary timing advance group
PUCCH physical uplink control channel
PUSCH physical uplink shared channel
QAM quadrature amplitude modulation
QPSK quadrature phase shift keying
RA random access
RACH random access channel
RAN radio access network
RAP random access preamble
RAR random access response
RB resource blocks
RBG resource block groups
RLC radio link control
RRC radio resource control
RRM radio resource management
RV redundancy version
SCC secondary component carrier
SCell secondary cell
SCG secondary cell group
SC-OFDM single carrier-OFDM
SDU service data unit
SeNB secondary evolved node B
SFN system frame number
S-GW serving gateway
SIB system information block
SC-OFDM single carrier orthogonal frequency division multiplexing
SRB signaling radio bearer
sTAG(s) secondary timing advance group(s)
TA timing advance
TAG timing advance group
TAI tracking area identifier
TAT time alignment timer
TDD time division duplexing
TDMA time division multiple access
TTI transmission time interval
TB transport block
UE user equipment
UL uplink
UPGW user plane gateway
URLLC ultra-reliable low-latency communications
VHDL VHSIC hardware description language
Xn-C Xn-control plane
Xn-U Xn-user plane
Xx-C Xx-control plane
Xx-U Xx-user plane Examples may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be used for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 shows example sets of OFDM subcarriers. As shown in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is shown as an example, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As shown in FIG. 1, guard band 106 is between subcarriers 103 and subcarriers 104. The example set of subcarriers A 102 includes subcarriers 103 and subcarriers 104. FIG. 1 also shows an example set of subcarriers B 105. As shown, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
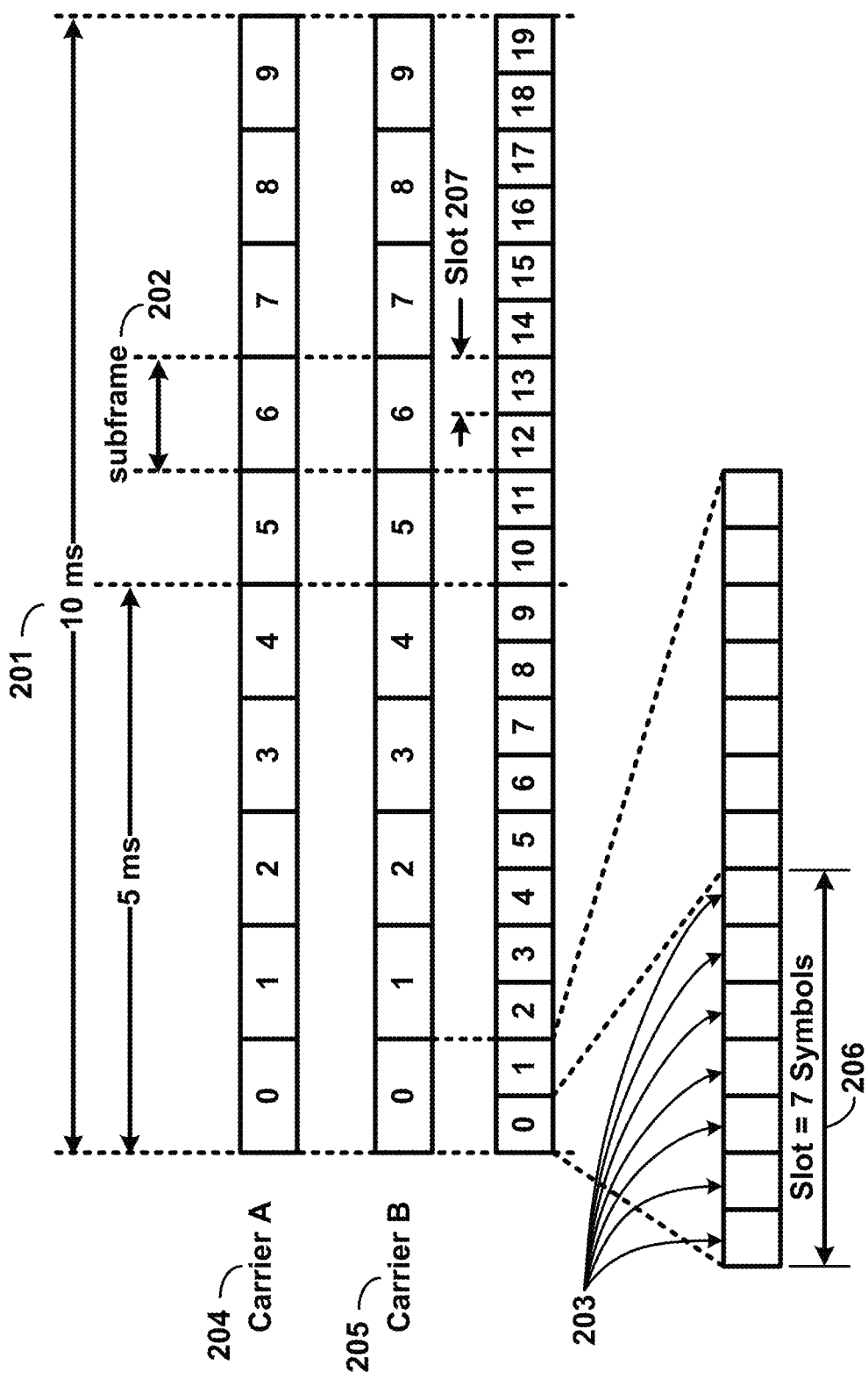
FIG. 2 shows example transmission time and reception time for two carriers in a carrier group.

FIG. 2 shows an example timing arrangement with transmission time and reception time for two carriers. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 milliseconds (msec). Other frame durations, for example, in the range of 1 to 100 msec may also be supported. In this example, each 10 msec radio frame 201 may be divided into ten equally sized subframes 202. Other subframe durations such as including 0.5 msec, 1 msec, 2 msec, and 5 msec may also be supported. Subframe(s) may consist of two or more slots (e.g., slots 206 and 207). For the example of FDD, 10 subframes may be available for downlink transmission and 10 subframes may be available for uplink transmissions in each 10 msec interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may include all downlink, all uplink, or a downlink part and an uplink part, and/or alike. Slot aggregation may be supported, for example, data transmission may be scheduled to span one or multiple slots. For example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
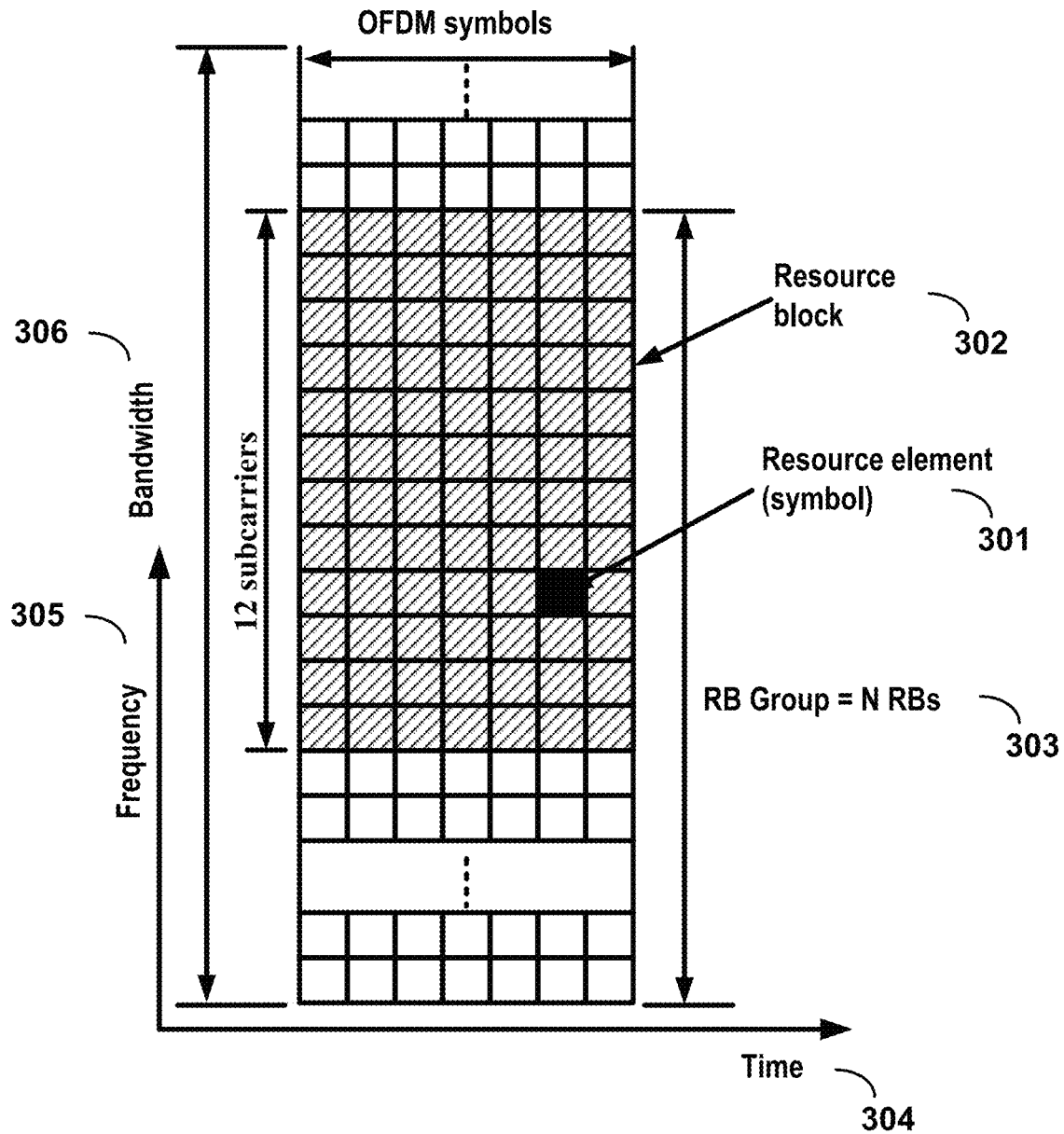
FIG. 3 shows example OFDM radio resources.

FIG. 3 shows an example of OFDM radio resources. The resource grid structure in time 304 and frequency 305 is shown in FIG. 3. The quantity of downlink subcarriers or RBs may depend, at least in part, on the downlink transmission bandwidth 306 configured in the cell. The smallest radio resource unit may be called a resource element (e.g., 301). Resource elements may be grouped into resource blocks (e.g., 302). Resource blocks may be grouped into larger radio resources called Resource Block Groups (RBG) (e.g., 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. A resource block may correspond to one slot in the time domain and 180 kHz in the frequency domain (for 15 kHz subcarrier bandwidth and 12 subcarriers).

Multiple numerologies may be supported. A numerology may be derived by scaling a basic subcarrier spacing by an integer N. Scalable numerology may allow at least from 15 kHz to 480 kHz subcarrier spacing. The numerology with 15 kHz and scaled numerology with different subcarrier spacing with the same CP overhead may align at a symbol boundary every 1 msec in a NR carrier.

Figure 4:
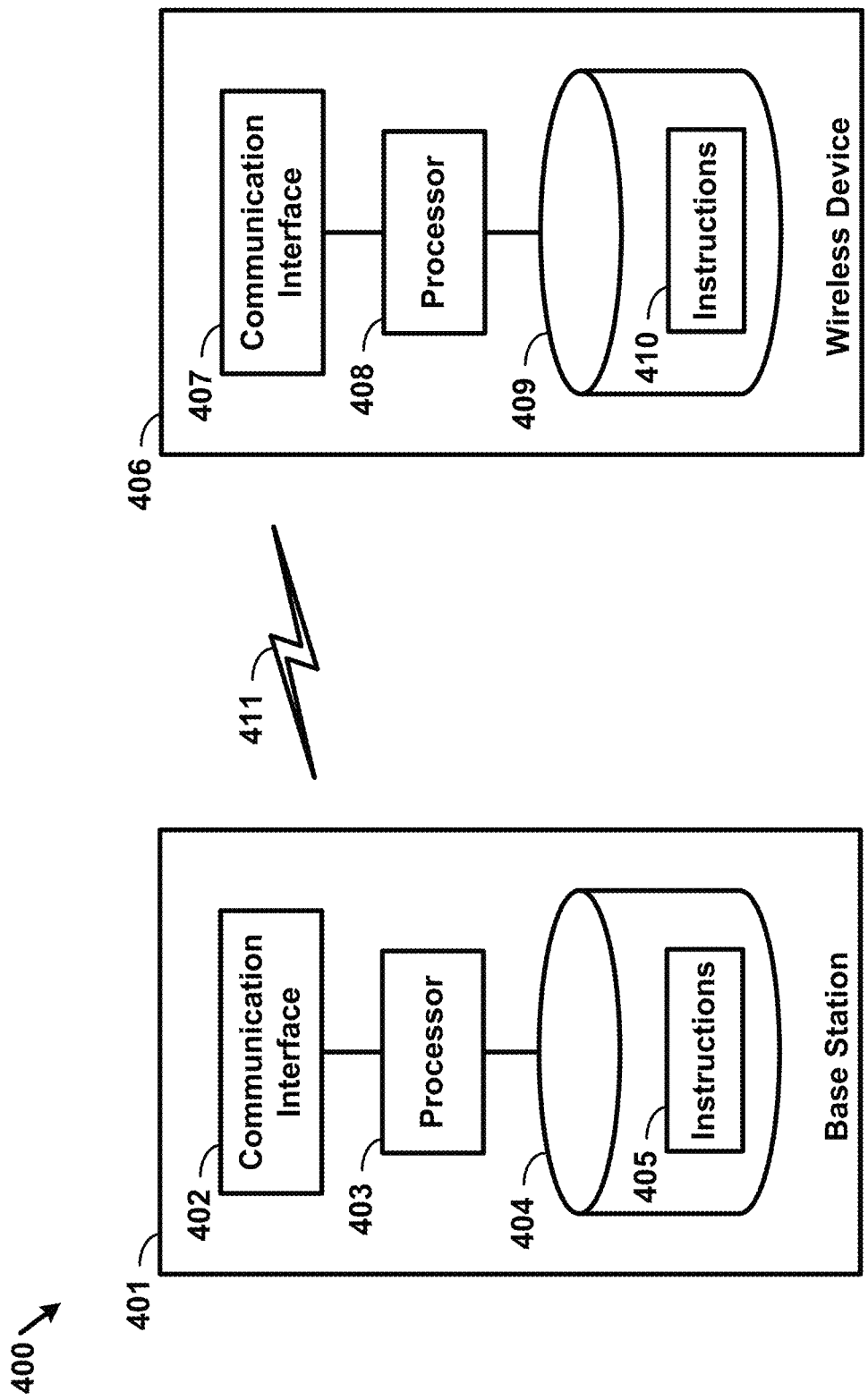
FIG. 4 shows hardware elements of a base station and a wireless device.

FIG. 4 shows hardware elements of a base station 401 and a wireless device 406. A communication network 400 may include at least one base station 401 and at least one wireless device 406. The base station 401 may include at least one communication interface 402, one or more processors 403, and at least one set of program code instructions 405 stored in non-transitory memory 404 and executable by the one or more processors 403. The wireless device 406 may include at least one communication interface 407, one or more processors 408, and at least one set of program code instructions 410 stored in non-transitory memory 409 and executable by the one or more processors 408. A communication interface 402 in the base station 401 may be configured to engage in communication with a communication interface 407 in the wireless device 406, such as via a communication path that includes at least one wireless link 411. The wireless link 411 may be a bi-directional link. The communication interface 407 in the wireless device 406 may also be configured to engage in communication with the communication interface 402 in the base station 401. The base station 401 and the wireless device 406 may be configured to send and receive data over the wireless link 411 using multiple frequency carriers. Base stations, wireless devices, and other communication devices may include structure and operations of transceiver(s). A transceiver is a device that includes both a transmitter and receiver. Transceivers may be employed in devices such as wireless devices, base stations, relay nodes, and/or the like. Examples for radio technology implemented in the communication interfaces 402, 407 and the wireless link 411 are shown in FIG. 1, FIG. 2, FIG. 3, FIG. 5, and associated text. The communication network 400 may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network 400, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

The communications network 400 may comprise Radio Access Network (RAN) architecture. The RAN architecture may comprise one or more RAN nodes that may be a next generation Node B (gNB) (e.g., 401) providing New Radio (NR) user plane and control plane protocol terminations towards a first wireless device (e.g. 406). A RAN node may be a next generation evolved Node B (ng-eNB), providing Evolved UMTS Terrestrial Radio Access (E-UTRA) user plane and control plane protocol terminations towards a second wireless device. The first wireless device may communicate with a gNB over a Uu interface. The second wireless device may communicate with a ng-eNB over a Uu interface. Base station 401 may comprise one or more of a gNB, ng-eNB, and/or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_INACTIVE state, distribution function for Non-Access Stratum (NAS) messages, RAN sharing, and dual connectivity or tight interworking between NR and E-UTRA.

One or more gNBs and/or one or more ng-eNBs may be interconnected with each other by means of Xn interface. A gNB or an ng-eNB may be connected by means of NG interfaces to 5G Core Network (5GC). 5GC may comprise one or more AMF/User Plane Function (UPF) functions. A gNB or an ng-eNB may be connected to a UPF by means of an NG-User plane (NG-U) interface. The NG-U interface may provide delivery (e.g., non-guaranteed delivery) of user plane Protocol Data Units (PDUs) between a RAN node and the UPF. A gNB or an ng-eNB may be connected to an AMF by means of an NG-Control plane (e.g., NG-C) interface. The NG-C interface may provide functions such as NG interface management, UE context management, UE mobility management, transport of NAS messages, paging, PDU session management, configuration transfer or warning message transmission.

A UPF may host functions such as anchor point for intra-/inter-Radio Access Technology (RAT) mobility (if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, for example, packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or a non-operational state. Configured may also refer to specific settings in a device that effect the operational characteristics of the device whether the device is in an operational or a non-operational state. In other words, the hardware, software, firmware, registers, memory values, and/or the like may be "configured" within a device, whether the device is in an operational or a nonoperational state, to provide the device with specific characteristics. Terms such as "a control message to cause in a device" may mean that a control message has parameters that may be used to configure specific characteristics in the device, whether the device is in an operational or a non-operational state.

A network may include a multitude of base stations, providing a user plane NR PDCP/NR RLC/NR MAC/NR PHY and control plane (e.g., NR RRC) protocol terminations towards the wireless device. The base station(s) may be interconnected with other base station(s) (e.g., employing an Xn interface). The base stations may also be connected employing, for example, an NG interface to an NGC. FIG. 10A and FIG. 10B show examples for interfaces between a 5G core network (e.g., NGC) and base stations (e.g., gNB and eLTE eNB). For example, the base stations may be interconnected to the NGC control plane (e.g., NG CP) employing the NG-C interface and to the NGC user plane (e.g., UPGW) employing the NG-U interface. The NG interface may support a many-to-many relation between 5G core networks and base stations.

A base station may include many sectors, for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g., TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC); in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC); in the uplink, the carrier corresponding to an SCell may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or cell index may also identify the downlink carrier or uplink carrier of the cell (depending on the context in which it is used). The cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, reference to a first physical cell ID for a first downlink carrier may indicate that the first physical cell ID is for a cell comprising the first downlink carrier. The same concept may apply to, for example, carrier activation. Reference to a first carrier that is activated may indicate that the cell comprising the first carrier is activated.

A device may be configured to operate as needed by freely combining any of the examples. The disclosed mechanisms may be performed if certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. One or more criteria may be satisfied. It may be possible to implement examples that selectively implement disclosed protocols.

A base station may communicate with a variety of wireless devices. Wireless devices may support multiple technologies, and/or multiple releases of the same technology. Wireless devices may have some specific capability(ies) depending on its wireless device category and/or capability(ies). A base station may comprise multiple sectors. Reference to a base station communicating with a plurality of wireless devices may indicate that a base station may communicate with a subset of the total wireless devices in a coverage area. A plurality of wireless devices of a given LTE or 5G release, with a given capability and in a given sector of the base station, may be used. The plurality of wireless devices may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

A base station may transmit (e.g., to a wireless device) one or more messages (e.g. RRC messages) that may comprise a plurality of configuration parameters for one or more cells. One or more cells may comprise at least one primary cell and at least one secondary cell. An RRC message may be broadcasted or unicasted to the wireless device. Configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). The other SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may send its radio access capability information which may be static. A base station may request what capabilities for a wireless device to report based on band information. If allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

If CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. If adding a new SCell, dedicated RRC signaling may be employed to send all required system information of the SCell. In connected mode, wireless devices may not need to acquire broadcasted system information directly from the SCells.

An RRC connection reconfiguration procedure may be used to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be used to establish (or reestablish, resume) an RRC connection. An RRC connection establishment procedure may comprise SRB1 establishment. The RRC connection establishment procedure may be used to transfer the initial NAS dedicated information message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure, for example, after successful security activation. A measurement report message may be employed to transmit measurement results.

FIG. 5A, FIG. 5B, FIG. 5C, and FIG. 5D show examples of architecture for uplink and downlink signal transmission. FIG. 5A shows an example for an uplink physical channel. The baseband signal representing the physical uplink shared channel may be processed according to the following processes, which may be performed by structures described below. These structures and corresponding functions are shown as examples, however, it is anticipated that other structures and/or functions may be implemented in various examples. The structures and corresponding functions may comprise, for example, one or more scrambling devices 501A and 501B configured to perform scrambling of coded bits in each of the codewords to be transmitted on a physical channel; one or more modulation mappers 502A and 502B configured to perform modulation of scrambled bits to generate complex-valued symbols; a layer mapper 503 configured to perform mapping of the complex-valued modulation symbols onto one or several transmission layers; one or more transform precoders 504A and 504B to generate complex-valued symbols; a precoding device 505 configured to perform precoding of the complex-valued symbols; one or more resource element mappers 506A and 506B configured to perform mapping of precoded complex-valued symbols to resource elements; one or more signal generators 507A and 507B configured to perform the generation of a complex-valued time-domain DFTS-OFDM/SC-FDMA signal for each antenna port; and/or the like.

FIG. 5B shows an example for performing modulation and up-conversion to the carrier frequency of the complex-valued DFTS-OFDM/SC-FDMA baseband signal, for example, for each antenna port and/or for the complex-valued physical random access channel (PRACH) baseband signal. For example, the baseband signal, represented as $s_1(t)$, may be split, by a signal splitter 510, into real and imaginary components, $\text{Re}\{s_1(t)\}$ and $\text{Im}\{s_1(t)\}$, respectively. The real component may be modulated by a modulator 511A, and the imaginary component may be modulated by a modulator 511B. The output signal of the modulator 511A and the output signal of the modulator 511B may be mixed by a mixer 512. The output signal of the mixer 512 may be input to a filtering device 513, and filtering may be employed by the filtering device 513 prior to transmission.

FIG. 5C shows an example structure for downlink transmissions. The baseband signal representing a downlink physical channel may be processed by the following processes, which may be performed by structures described below. These structures and corresponding functions are shown as examples, however, it is anticipated that other structures and/or functions may be implemented in various examples. The structures and corresponding functions may comprise, for example, one or more scrambling devices 531A and 531B configured to perform scrambling of coded bits in each of the codewords to be transmitted on a physical channel; one or more modulation mappers 532A and 532B configured to perform modulation of scrambled bits to generate complex-valued modulation symbols; a layer mapper 533 configured to perform mapping of the complex-valued modulation symbols onto one or several transmission layers; a precoding device 534 configured to perform precoding of the complex-valued modulation symbols on each layer for transmission on the antenna ports; one or more resource element mappers 535A and 535B configured to perform mapping of complex-valued modulation symbols for each antenna port to resource elements; one or more OFDM signal generators 536A and 536B configured to perform the generation of complex-valued time-domain OFDM signal for each antenna port; and/or the like.

FIG. 5D shows an example structure for modulation and up-conversion to the carrier frequency of the complex-valued OFDM baseband signal for each antenna port. For example, the baseband signal, represented as $s_1^{(p)}(t)$, may be split, by a signal splitter 520, into real and imaginary components, $\text{Re}\{s_1^{(p)}(t)\}$ and $\text{Im}\{s_1^{(p)}(t)\}$, respectively. The real component may be modulated by a modulator 521A, and the imaginary component may be modulated by a modulator 521B. The output signal of the modulator 521A and the output signal of the modulator 521B may be mixed by a mixer 522. The output signal of the mixer 522 may be input to a filtering device 523, and filtering may be employed by the filtering device 523 prior to transmission.

Figure 6:
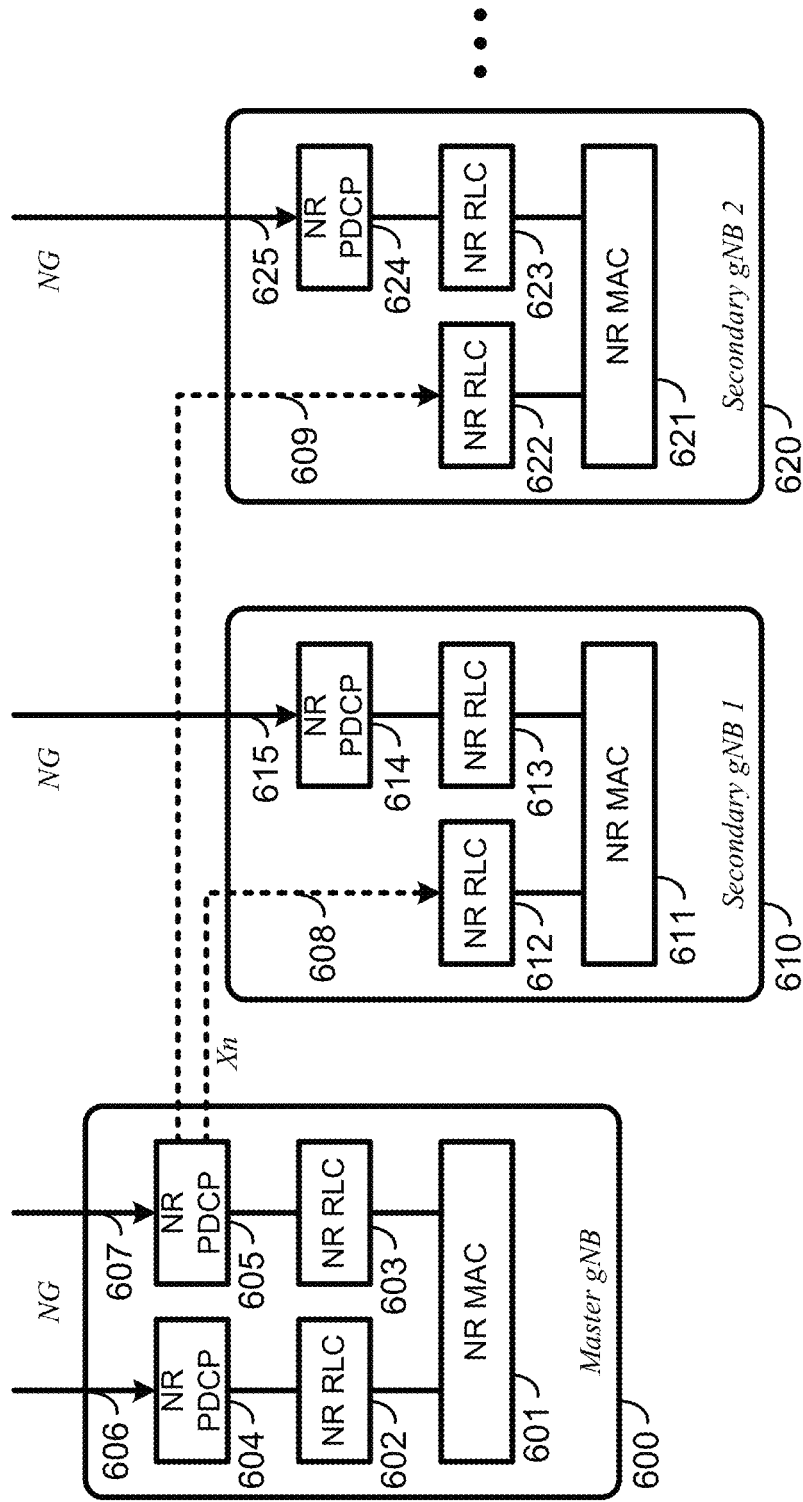
FIG. 6 shows an example protocol structure with multi-connectivity.
Figure 7:
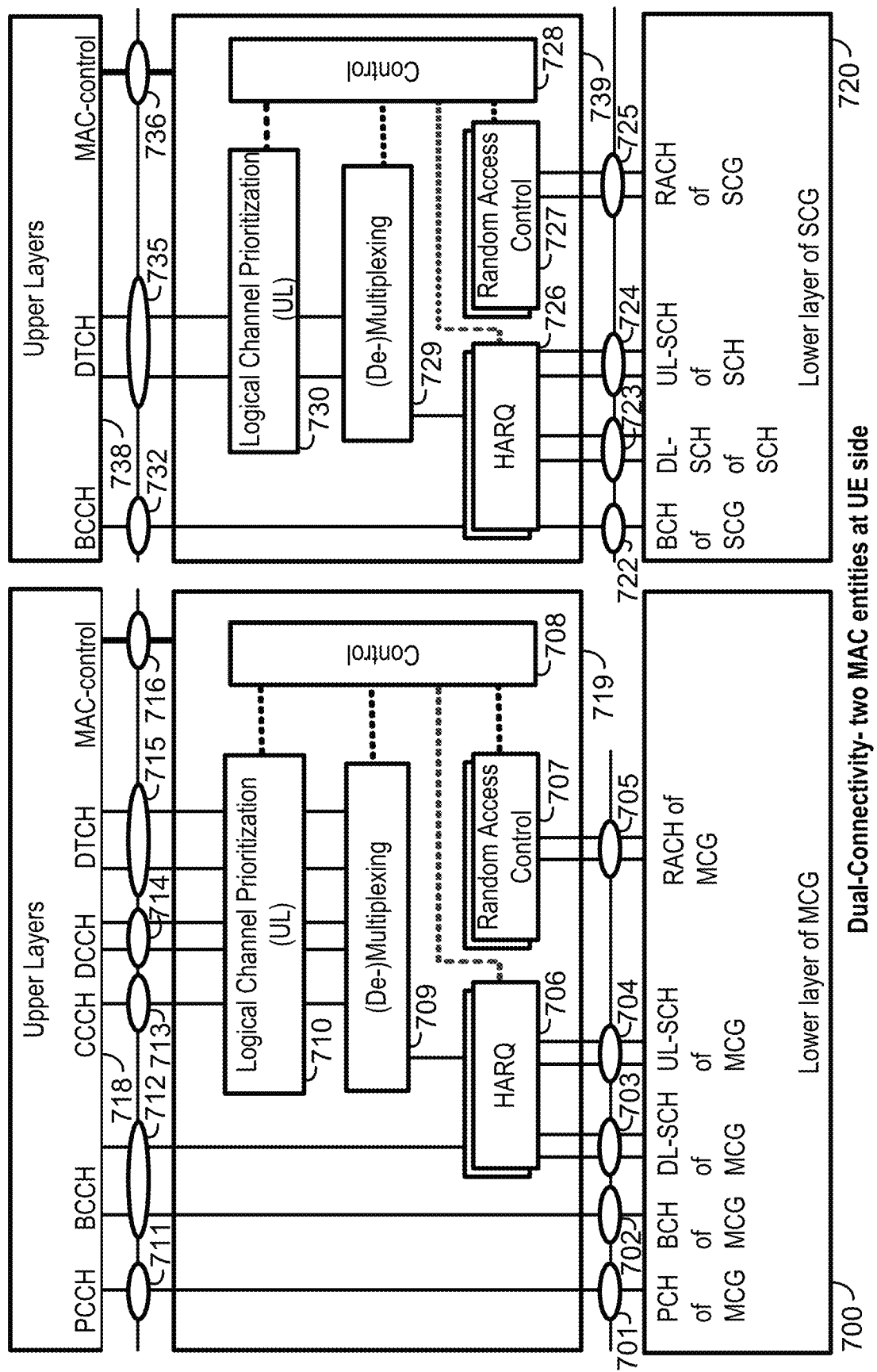
FIG. 7 shows an example protocol structure with carrier aggregation (CA) and dual connectivity (DC).

FIG. 6 and FIG. 7 show examples for protocol structures with CA and multi-connectivity. NR may support multi-connectivity operation, whereby a multiple receiver/transmitter (RX/TX) wireless device in RRC_CONNECTED may be configured to utilize radio resources provided by multiple schedulers located in multiple gNBs connected via a non-ideal or ideal backhaul over the Xn interface. gNBs involved in multi-connectivity for a certain wireless device may assume two different roles: a gNB may either act as a master gNB (e.g., 600) or as a secondary gNB (e.g., 610 or 620). In multi-connectivity, a wireless device may be connected to one master gNB (e.g., 600) and one or more secondary gNBs (e.g., 610 and/or 620). Any one or more of the Master gNB 600 and/or the secondary gNBs 610 and 620 may be a Next Generation (NG) NodeB. The master gNB 600 may comprise protocol layers NR MAC 601, NR RLC 602 and 603, and NR PDCP 604 and 605. The secondary gNB may comprise protocol layers NR MAC 611, NR RLC 612 and 613, and NR PDCP 614. The secondary gNB may comprise protocol layers NR MAC 621, NR RLC 622 and 623, and NR PDCP 624. The master gNB 600 may communicate via an interface 606 and/or via an interface 607, the secondary gNB 610 may communicate via an interface 615, and the secondary gNB 620 may communicate via an interface 625. The master gNB 600 may also communicate with the secondary gNB 610 and the secondary gNB 621 via interfaces 608 and 609, respectively, which may include Xn interfaces. For example, the master gNB 600 may communicate via the interface 608, at layer NR PDCP 605, and with the secondary gNB 610 at layer NR RLC 612. The master gNB 600 may communicate via the interface 609, at layer NR PDCP 605, and with the secondary gNB 620 at layer NR RLC 622.

FIG. 7 shows an example structure for the UE side MAC entities, for example, if a Master Cell Group (MCG) and a Secondary Cell Group (SCG) are configured. Media Broadcast Multicast Service (MBMS) reception may be included but is not shown in this figure for simplicity.

In multi-connectivity, the radio protocol architecture that a particular bearer uses may depend on how the bearer is set up. As an example, three alternatives may exist, an MCG bearer, an SCG bearer, and a split bearer, such as shown in FIG. 6. NR RRC may be located in a master gNB and SRBs may be configured as a MCG bearer type and may use the radio resources of the master gNB. Multi-connectivity may have at least one bearer configured to use radio resources provided by the secondary gNB. Multi-connectivity may or may not be configured or implemented.

For multi-connectivity, the wireless device may be configured with multiple NR MAC entities: e.g., one NR MAC entity for a master gNB, and other NR MAC entities for secondary gNBs. In multi-connectivity, the configured set of serving cells for a wireless device may comprise two subsets: e.g., the Master Cell Group (MCG) including the serving cells of the master gNB, and the Secondary Cell Groups (SCGs) including the serving cells of the secondary gNBs.

At least one cell in a SCG may have a configured UL component carrier (CC) and one of the UL CCs, for example, named PSCell (or PCell of SCG, or sometimes called PCell), may be configured with PUCCH resources. If the SCG is configured, there may be at least one SCG bearer or one split bearer. If a physical layer problem or a random access problem on a PSCell occurs or is detected, if the maximum number of NR RLC retransmissions has been reached associated with the SCG, or if an access problem on a PSCell during a SCG addition or a SCG change occurs or is detected, then an RRC connection re-establishment procedure may not be triggered, UL transmissions towards cells of the SCG may be stopped, a master gNB may be informed by the wireless device of a SCG failure type, and for a split bearer the DL data transfer over the master gNB may be maintained. The NR RLC Acknowledge Mode (AM) bearer may be configured for the split bearer. Like the PCell, a PSCell may not be de-activated. The PSCell may be changed with an SCG change (e.g., with a security key change and a RACH procedure). A direct bearer type may change between a split bearer and an SCG bearer, or a simultaneous configuration of an SCG and a split bearer may or may not be supported.

A master gNB and secondary gNBs may interact for multi-connectivity. The master gNB may maintain the RRM measurement configuration of the wireless device, and the master gNB may, (e.g., based on received measurement reports, and/or based on traffic conditions and/or bearer types), decide to ask a secondary gNB to provide additional resources (e.g., serving cells) for a wireless device. If a request from the master gNB is received, a secondary gNB may create a container that may result in the configuration of additional serving cells for the wireless device (or the secondary gNB decide that it has no resource available to do so). For wireless device capability coordination, the master gNB may provide some or all of the Active Set (AS) configuration and the wireless device capabilities to the secondary gNB. The master gNB and the secondary gNB may exchange information about a wireless device configuration, such as by employing NR RRC containers (e.g., inter-node messages) carried in Xn messages. The secondary gNB may initiate a reconfiguration of its existing serving cells (e.g., PUCCH towards the secondary gNB). The secondary gNB may decide which cell is the PSCell within the SCG. The master gNB may or may not change the content of the NR RRC configuration provided by the secondary gNB. In an SCG addition and an SCG SCell addition, the master gNB may provide the latest measurement results for the SCG cell(s). Both a master gNB and a secondary gNBs may know the system frame number (SFN) and subframe offset of each other by operations, administration, and maintenance (OAM) (e.g., for the purpose of discontinuous reception (DRX) alignment and identification of a measurement gap). If adding a new SCG SCell, dedicated NR RRC signaling may be used for sending required system information of the cell for CA, except, for example, for the SFN acquired from an MIB of the PSCell of an SCG.

FIG. 7 shows an example of dual-connectivity (DC) for two MAC entities at a wireless device side. A first MAC entity may comprise a lower layer of an MCG 700, an upper layer of an MCG 718, and one or more intermediate layers of an MCG 719. The lower layer of the MCG 700 may comprise, for example, a paging channel (PCH) 701, a broadcast channel (BCH) 702, a downlink shared channel (DL-SCH) 703, an uplink shared channel (UL-SCH) 704, and a random access channel (RACH) 705. The one or more intermediate layers of the MCG 719 may comprise, for example, one or more hybrid automatic repeat request (HARQ) processes 706, one or more random access control processes 707, multiplexing and/or de-multiplexing processes 709, logical channel prioritization on the uplink processes 710, and a control processes 708 providing control for the above processes in the one or more intermediate layers of the MCG 719. The upper layer of the MCG 718 may comprise, for example, a paging control channel (PCCH) 711, a broadcast control channel (BCCH) 712, a common control channel (CCCH) 713, a dedicated control channel (DCCH) 714, a dedicated traffic channel (DTCH) 715, and a MAC control 716.

A second MAC entity may comprise a lower layer of an SCG 720, an upper layer of an SCG 738, and one or more intermediate layers of an SCG 739. The lower layer of the SCG 720 may comprise, for example, a BCH 722, a DL-SCH 723, an UL-SCH 724, and a RACH 725. The one or more intermediate layers of the SCG 739 may comprise, for example, one or more HARQ processes 726, one or more random access control processes 727, multiplexing and/or de-multiplexing processes 729, logical channel prioritization on the uplink processes 730, and a control processes 728 providing control for the above processes in the one or more intermediate layers of the SCG 739. The upper layer of the SCG 738 may comprise, for example, a BCCH 732, a DCCH 714, a DTCH 735, and a MAC control 736.

Serving cells may be grouped in a TA group (TAG). Serving cells in one TAG may use the same timing reference. For a given TAG, a wireless device may use at least one downlink carrier as a timing reference. For a given TAG, a wireless device may synchronize uplink subframe and frame transmission timing of uplink carriers belonging to the same TAG. Serving cells having an uplink to which the same TA applies may correspond to serving cells hosted by the same receiver. A wireless device supporting multiple TAs may support two or more TA groups. One TA group may include the PCell and may be called a primary TAG (pTAG). In a multiple TAG configuration, at least one TA group may not include the PCell and may be called a secondary TAG (sTAG). Carriers within the same TA group may use the same TA value and/or the same timing reference. If DC is configured, cells belonging to a cell group (e.g., MCG or SCG) may be grouped into multiple TAGs including a pTAG and one or more sTAGs.

Figure 8:
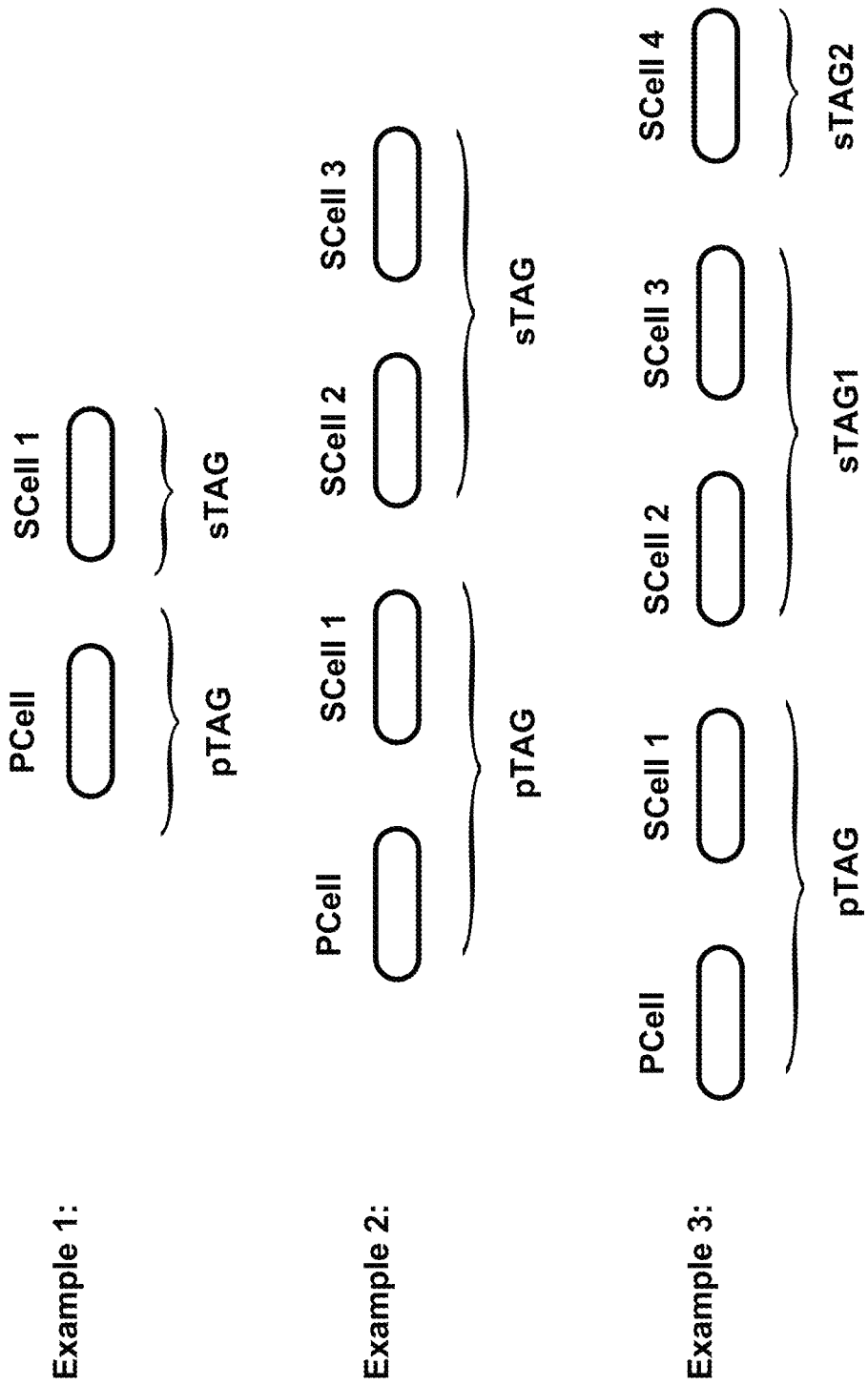
FIG. 8 shows example timing advance group (TAG) configurations.

FIG. 8 shows example TAG configurations. In Example 1, a pTAG comprises a PCell, and an sTAG comprises an SCell1. In Example 2, a pTAG comprises a PCell and an SCell1, and an sTAG comprises an SCell2 and an SCell3. In Example 3, a pTAG comprises a PCell and an SCell1, and an sTAG1 comprises an SCell2 and an SCell3, and an sTAG2 comprises a SCell4. Up to four TAGs may be supported in a cell group (MCG or SCG), and other example TAG configurations may also be provided. In various examples, structures and operations are described for use with a pTAG and an sTAG. Some of the examples may be used for configurations with multiple sTAGs.

An eNB may initiate an RA procedure, via a PDCCH order, for an activated SCell. The PDCCH order may be sent on a scheduling cell of this SCell. If cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
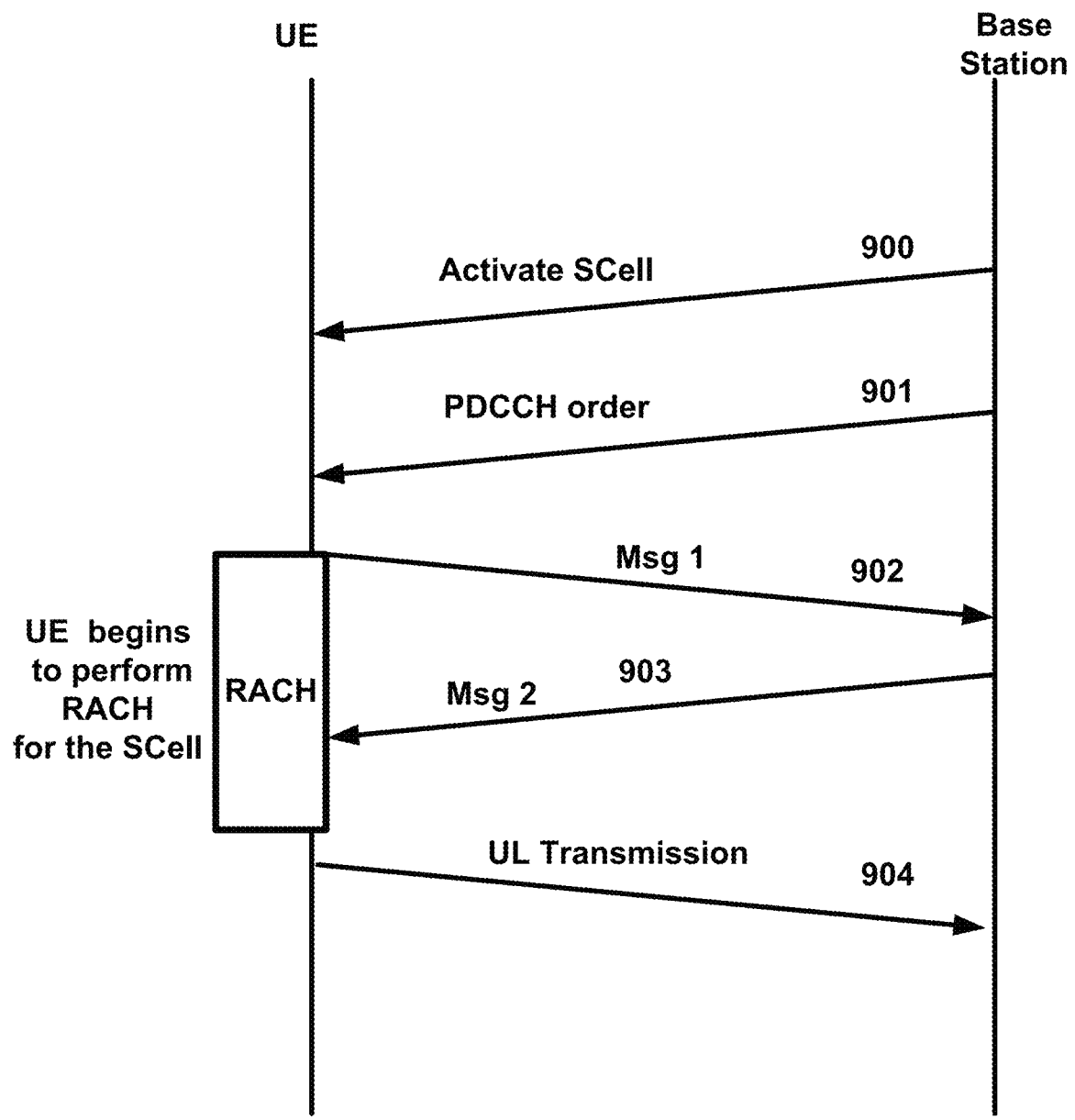
FIG. 9 shows example message flow in a random access process in a secondary TAG.

FIG. 9 shows an example of random access processes, and a corresponding message flow, in a secondary TAG. A base station, such as an eNB, may transmit an activation command 900 to a wireless device, such as a UE. The activation command 900 may be transmitted to activate an SCell. The base station may also transmit a PDDCH order 901 to the wireless device, which may be transmitted, for example, after the activation command 900. The wireless device may begin to perform a RACH process for the SCell, which may be initiated, for example, after receiving the PDDCH order 901. A wireless device may transmit to the base station (e.g., as part of a RACH process) a preamble 902 (e.g., Msg1), such as a random access preamble (RAP). The preamble 902 may be transmitted after or in response to the PDCCH order 901. The wireless device may transmit the preamble 902 via an SCell belonging to an sTAG. Preamble transmission for SCells may be controlled by a network using PDCCH format 1A. The base station may send a random access response (RAR) 903 (e.g., Msg2 message) to the wireless device. The RAR 903 may be after or in response to the preamble 902 transmission via the SCell. The RAR 903 may be addressed to a random access radio network temporary identifier (RA-RNTI) in a PCell common search space (CSS). If the wireless device receives the RAR 903, the RACH process may conclude. The RACH process may conclude, for example, after or in response to the wireless device receiving the RAR 903 from the base station. After the RACH process, the wireless device may transmit an uplink transmission 904. The uplink transmission 904 may comprise uplink packets transmitted via the same SCell used for the preamble 902 transmission.

Timing alignment (e.g., initial timing alignment) for communications between the wireless device and the base station may be performed through a random access procedure, such as described above regarding FIG. 9. The random access procedure may involve a wireless device, such as a UE, transmitting a random access preamble and a base station, such as an eNB, responding with an initial TA command NTA (amount of timing advance) within a random access response window. The start of the random access preamble may be aligned with the start of a corresponding uplink subframe at the wireless device assuming NTA=0. The eNB may estimate the uplink timing from the random access preamble transmitted by the wireless device. The TA command may be derived by the eNB based on the estimation of the difference between the desired UL timing and the actual UL timing. The wireless device may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. If an eNB performs an SCell addition configuration, the related TAG configuration may be configured for the SCell. An eNB may modify the TAG configuration of an SCell by removing (e.g., releasing) the SCell and adding (e.g., configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In some examples, it may not be possible to change the TAG associated with an SCell, but rather, the SCell may need to be removed and a new SCell may need to be added with another TAG. For example, if there is a need to move an SCell from an sTAG to a pTAG, at least one RRC message, such as at least one RRC reconfiguration message, may be sent to the wireless device. The at least one RRC message may be sent to the wireless device to reconfigure TAG configurations, for example, by releasing the SCell and configuring the SCell as a part of the pTAG. If, for example, an SCell is added or configured without a TAG index, the SCell may be explicitly assigned to the pTAG. The PCell may not change its TA group and may be a member of the pTAG.

In LTE Release-10 and Release-11 CA, a PUCCH transmission is only transmitted on a PCell (e.g., a PSCell) to an eNB. In LTE-Release 12 and earlier, a wireless device may transmit PUCCH information on one cell (e.g., a PCell or a PSCell) to a given eNB. As the number of CA capable wireless devices increase, and as the number of aggregated carriers increase, the number of PUCCHs and the PUCCH payload size may increase. Accommodating the PUCCH transmissions on the PCell may lead to a high PUCCH load on the PCell. A PUCCH on an SCell may be used to offload the PUCCH resource from the PCell. More than one PUCCH may be configured. For example, a PUCCH on a PCell may be configured and another PUCCH on an SCell may be configured. One, two, or more cells may be configured with PUCCH resources for transmitting CSI, acknowledgment (ACK), and/or non-acknowledgment (NACK) to a base station. Cells may be grouped into multiple PUCCH groups, and one or more cell within a group may be configured with a PUCCH. In some examples, one SCell may belong to one PUCCH group. SCells with a configured PUCCH transmitted to a base station may be called a PUCCH SCell, and a cell group with a common PUCCH resource transmitted to the same base station may be called a PUCCH group.

A MAC entity may have a configurable timer, for example, timeAlignmentTimer, per TAG. The timeAlignmentTimer may be used to control how long the MAC entity considers the serving cells belonging to the associated TAG to be uplink time aligned. If a Timing Advance Command MAC control element is received, the MAC entity may apply the Timing Advance Command for the indicated TAG; and/or the MAC entity may start or restart the timeAlignmentTimer associated with a TAG that may be indicated by the Timing Advance Command MAC control element. If a Timing Advance Command is received in a Random Access Response message for a serving cell belonging to a TAG, the MAC entity may apply the Timing Advance Command for this TAG and/or start or restart the timeAlignmentTimer associated with this TAG. Additionally or alternatively, if the Random Access Preamble is not selected by the MAC entity, the MAC entity may apply the Timing Advance Command for this TAG and/or start or restart the timeAlignmentTimer associated with this TAG. If the timeAlignmentTimer associated with this TAG is not running, the Timing Advance Command for this TAG may be applied, and the timeAlignmentTimer associated with this TAG may be started. If the contention resolution is not successful, a timeAlignmentTimer associated with this TAG may be stopped. If the contention resolution is successful, the MAC entity may ignore the received Timing Advance Command. The MAC entity may determine whether the contention resolution is successful or whether the contention resolution is not successful.

FIG. 10A and FIG. 10B show examples for interfaces between a 5G core network (e.g., NGC) and base stations (e.g., gNB and eLTE eNB). A base station, such as a gNB 1020, may be interconnected to an NGC 1010 control plane employing an NG-C interface. The base station, for example, the gNB 1020, may also be interconnected to an NGC 1010 user plane (e.g., UPGW) employing an NG-U interface. As another example, a base station, such as an eLTE eNB 1040, may be interconnected to an NGC 1030 control plane employing an NG-C interface. The base station, for example, the eLTE eNB 1040, may also be interconnected to an NGC 1030 user plane (e.g., UPGW) employing an NG-U interface. An NG interface may support a many-to-many relation between 5G core networks and base stations.

FIG. 11A, FIG. 11B, FIG. 11C, FIG. 11D, FIG. 11E, and FIG. 11F are examples for architectures of tight interworking between a 5G RAN and an LTE RAN. The tight interworking may enable a multiple receiver/transmitter (RX/TX) wireless device in an RRC_CONNECTED state to be configured to utilize radio resources provided by two schedulers located in two base stations (e.g., an eLTE eNB and a gNB). The two base stations may be connected via a non-ideal or ideal backhaul over the Xx interface between an LTE eNB and a gNB, or over the Xn interface between an eLTE eNB and a gNB. Base stations involved in tight interworking for a certain wireless device may assume different roles. For example, a base station may act as a master base station or a base station may act as a secondary base station. In tight interworking, a wireless device may be connected to both a master base station and a secondary base station. Mechanisms implemented in tight interworking may be extended to cover more than two base stations.

A master base station may be an LTE eNB 1102A or an LTE eNB 1102B, which may be connected to EPC nodes 1101A or 1101B, respectively. This connection to EPC nodes may be, for example, to an MME via the S1-C interface and/or to an S-GW via the S1-U interface. A secondary base station may be a gNB 1103A or a gNB 1103B, either or both of which may be a non-standalone node having a control plane connection via an Xx-C interface to an LTE eNB (e.g., the LTE eNB 1102A or the LTE eNB 1102B). In the tight interworking architecture of FIG. 11A, a user plane for a gNB (e.g., the gNB 1103A) may be connected to an S-GW (e.g., the EPC 1101A) through an LTE eNB (e.g., the LTE eNB 1102A), via an Xx-U interface between the LTE eNB and the gNB, and via an S1-U interface between the LTE eNB and the S-GW. In the architecture of FIG. 11B, a user plane for a gNB (e.g., the gNB 1103B) may be connected directly to an S-GW (e.g., the EPC 1101B) via an S1-U interface between the gNB and the S-GW.

A master base station may be a gNB 1103C or a gNB 1103D, which may be connected to NGC nodes 1101C or 1101D, respectively. This connection to NGC nodes may be, for example, to a control plane core node via the NG-C interface and/or to a user plane core node via the NG-U interface. A secondary base station may be an eLTE eNB 1102C or an eLTE eNB 1102D, either or both of which may be a non-standalone node having a control plane connection via an Xn-C interface to a gNB (e.g., the gNB 1103C or the gNB 1103D). In the tight interworking architecture of FIG. 11C, a user plane for an eLTE eNB (e.g., the eLTE eNB 1102C) may be connected to a user plane core node (e.g., the NGC 1101C) through a gNB (e.g., the gNB 1103C), via an Xn-U interface between the eLTE eNB and the gNB, and via an NG-U interface between the gNB and the user plane core node. In the architecture of FIG. 11D, a user plane for an eLTE eNB (e.g., the eLTE eNB 1102D) may be connected directly to a user plane core node (e.g., the NGC 1101D) via an NG-U interface between the eLTE eNB and the user plane core node.

A master base station may be an eLTE eNB 1102E or an eLTE eNB 1102F, which may be connected to NGC nodes 1101E or 1101F, respectively. This connection to NGC nodes may be, for example, to a control plane core node via the NG-C interface and/or to a user plane core node via the NG-U interface. A secondary base station may be a gNB 1103E or a gNB 1103F, either or both of which may be a non-standalone node having a control plane connection via an Xn-C interface to an eLTE eNB (e.g., the eLTE eNB 1102E or the eLTE eNB 1102F). In the tight interworking architecture of FIG. 11E, a user plane for a gNB (e.g., the gNB 1103E) may be connected to a user plane core node (e.g., the NGC 1101E) through an eLTE eNB (e.g., the eLTE eNB 1102E), via an Xn-U interface between the eLTE eNB and the gNB, and via an NG-U interface between the eLTE eNB and the user plane core node. In the architecture of FIG. 11F, a user plane for a gNB (e.g., the gNB 1103F) may be connected directly to a user plane core node (e.g., the NGC 1101F) via an NG-U interface between the gNB and the user plane core node.

FIG. 12A, FIG. 12B, and FIG. 12C are examples for radio protocol structures of tight interworking bearers.

An LTE eNB 1201A may be an S1 master base station, and a gNB 1210A may be an S1 secondary base station. An example for a radio protocol architecture for a split bearer and an SCG bearer is shown. The LTE eNB 1201A may be connected to an EPC with a non-standalone gNB 1210A, via an Xx interface between the PDCP 1206A and an NR RLC 1212A. The LTE eNB 1201A may include protocol layers MAC 1202A, RLC 1203A and RLC 1204A, and PDCP 1205A and PDCP 1206A. An MCG bearer type may interface with the PDCP 1205A, and a split bearer type may interface with the PDCP 1206A. The gNB 1210A may include protocol layers NR MAC 1211A, NR RLC 1212A and NR RLC 1213A, and NR PDCP 1214A. An SCG bearer type may interface with the NR PDCP 1214A.

A gNB 1201B may be an NG master base station, and an eLTE eNB 1210B may be an NG secondary base station. An example for a radio protocol architecture for a split bearer and an SCG bearer is shown. The gNB 1201B may be connected to an NGC with a non-standalone eLTE eNB 1210B, via an Xn interface between the NR PDCP 1206B and an RLC 1212B. The gNB 1201B may include protocol layers NR MAC 1202B, NR RLC 1203B and NR RLC 1204B, and NR PDCP 1205B and NR PDCP 1206B. An MCG bearer type may interface with the NR PDCP 1205B, and a split bearer type may interface with the NR PDCP 1206B. The eLTE eNB 1210B may include protocol layers MAC 1211B, RLC 1212B and RLC 1213B, and PDCP 1214B. An SCG bearer type may interface with the PDCP 1214B.

An eLTE eNB 1201C may be an NG master base station, and a gNB 1210C may be an NG secondary base station. An example for a radio protocol architecture for a split bearer and an SCG bearer is shown. The eLTE eNB 1201C may be connected to an NGC with a non-standalone gNB 1210C, via an Xn interface between the PDCP 1206C and an NR RLC 1212C. The eLTE eNB 1201C may include protocol layers MAC 1202C, RLC 1203C and RLC 1204C, and PDCP 1205C and PDCP 1206C. An MCG bearer type may interface with the PDCP 1205C, and a split bearer type may interface with the PDCP 1206C. The gNB 1210C may include protocol layers NR MAC 1211C, NR RLC 1212C and NR RLC 1213C, and NR PDCP 1214C. An SCG bearer type may interface with the NR PDCP 1214C.

In a 5G network, the radio protocol architecture that a particular bearer uses may depend on how the bearer is setup. At least three alternatives may exist, for example, an MCG bearer, an SCG bearer, and a split bearer, such as shown in FIG. 12A, FIG. 12B, and FIG. 12C. The NR RRC may be located in a master base station, and the SRBs may be configured as an MCG bearer type and may use the radio resources of the master base station. Tight interworking may have at least one bearer configured to use radio resources provided by the secondary base station. Tight interworking may or may not be configured or implemented.

The wireless device may be configured with two MAC entities: e.g., one MAC entity for a master base station, and one MAC entity for a secondary base station. In tight interworking, the configured set of serving cells for a wireless device may comprise of two subsets: e.g., the Master Cell Group (MCG) including the serving cells of the master base station, and the Secondary Cell Group (SCG) including the serving cells of the secondary base station.

At least one cell in a SCG may have a configured UL CC and one of them, for example, a PSCell (or the PCell of the SCG, which may also be called a PCell), is configured with PUCCH resources. If the SCG is configured, there may be at least one SCG bearer or one split bearer. If one or more of a physical layer problem or a random access problem is detected on a PSCell, if the maximum number of (NR) RLC retransmissions associated with the SCG has been reached, and/or if an access problem on a PSCell during an SCG addition or during an SCG change is detected, then: an RRC connection re-establishment procedure may not be triggered, UL transmissions towards cells of the SCG may be stopped, a master base station may be informed by the wireless device of a SCG failure type, and/or for a split bearer the DL data transfer over the master base station may be maintained. The RLC AM bearer may be configured for the split bearer. Like the PCell, a PSCell may not be de-activated. A PSCell may be changed with an SCG change, for example, with security key change and a RACH procedure. A direct bearer type change, between a split bearer and an SCG bearer, may not be supported. Simultaneous configuration of an SCG and a split bearer may not be supported.

A master base station and a secondary base station may interact. The master base station may maintain the RRM measurement configuration of the wireless device. The master base station may determine to ask a secondary base station to provide additional resources (e.g., serving cells) for a wireless device. This determination may be based on, for example, received measurement reports, traffic conditions, and/or bearer types. If a request from the master base station is received, a secondary base station may create a container that may result in the configuration of additional serving cells for the wireless device, or the secondary base station may determine that it has no resource available to do so. The master base station may provide at least part of the AS configuration and the wireless device capabilities to the secondary base station, for example, for wireless device capability coordination. The master base station and the secondary base station may exchange information about a wireless device configuration such as by using RRC containers (e.g., inter-node messages) carried in Xn or Xx messages. The secondary base station may initiate a reconfiguration of its existing serving cells (e.g., PUCCH towards the secondary base station). The secondary base station may determine which cell is the PSCell within the SCG. The master base station may not change the content of the RRC configuration provided by the secondary base station. If an SCG is added and/or an SCG SCell is added, the master base station may provide the latest measurement results for the SCG cell(s). Either or both of a master base station and a secondary base station may know the SFN and subframe offset of each other by OAM, (e.g., for the purpose of DRX alignment and identification of a measurement gap). If a new SCG SCell is added, dedicated RRC signaling may be used for sending required system information of the cell, such as for CA, except, for example, for the SFN acquired from an MIB of the PSCell of an SCG.

FIG. 13A and FIG. 13B show examples for gNB deployment. A core 1301 and a core 1310 may interface with other nodes via RAN-CN interfaces. In a non-centralized deployment example, the full protocol stack (e.g., NR RRC, NR PDCP, NR RLC, NR MAC, and NR PHY) may be supported at one node, such as a gNB 1302, a gNB 1303, and/or an eLTE eNB or LTE eNB 1304. These nodes (e.g., the gNB 1302, the gNB 1303, and the eLTE eNB or LTE eNB 1304) may interface with one of more of each other via a respective inter-BS interface. In a centralized deployment example, upper layers of a gNB may be located in a Central Unit (CU) 1311, and lower layers of the gNB may be located in Distributed Units (DU) 1312, 1313, and 1314. The CU-DU interface (e.g., Fs interface) connecting CU 1311 and DUs 1312, 1312, and 1314 may be ideal or non-ideal. The Fs-C may provide a control plane connection over the Fs interface, and the Fs-U may provide a user plane connection over the Fs interface. In the centralized deployment, different functional split options between the CU 1311 and the DUs 1312, 1313, and 1314 may be possible by locating different protocol layers (e.g., RAN functions) in the CU 1311 and in the DU 1312, 1313, and 1314. The functional split may support flexibility to move the RAN functions between the CU 1311 and the DUs 1312, 1313, and 1314 depending on service requirements and/or network environments. The functional split option may change during operation (e.g., after the Fs interface setup procedure), or the functional split option may change only in the Fs setup procedure (e.g., the functional split option may be static during operation after Fs setup procedure).

Figure 14:
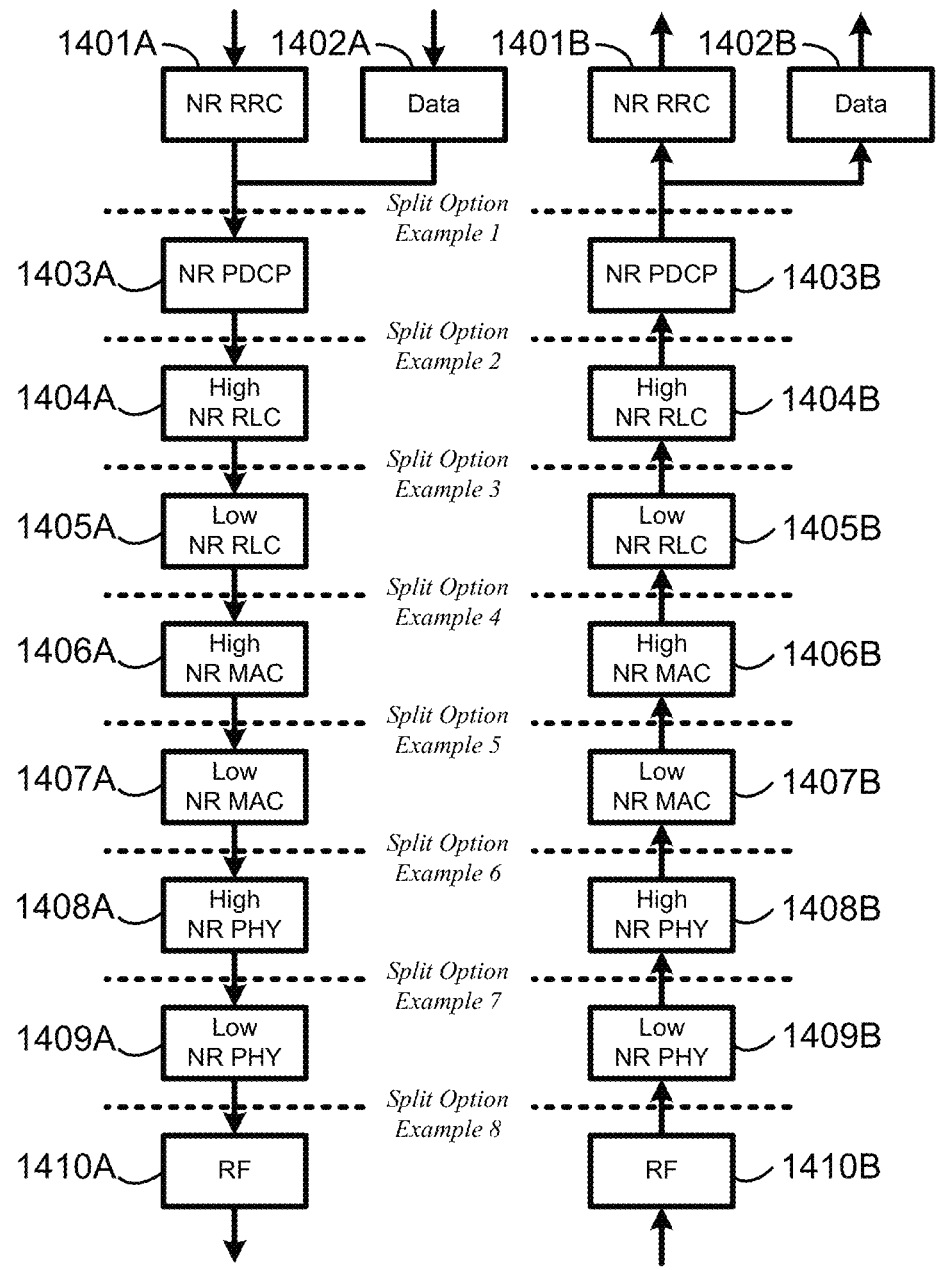
FIG. 14 shows functional split option examples of a centralized gNB deployment.

FIG. 14 shows examples for different functional split options of a centralized gNB deployment. Element numerals that are followed by "A" or "B" designations in FIG. 14 may represent the same elements in different traffic flows, for example, either receiving data (e.g., data 1402A) or sending data (e.g., 1402B). In the split option example 1, an NR RRC 1401 may be in a CU, and an NR PDCP 1403, an NR RLC (e.g., comprising a High NR RLC 1404 and/or a Low NR RLC 1405), an NR MAC (e.g., comprising a High NR MAC 1406 and/or a Low NR MAC 1407), an NR PHY (e.g., comprising a High NR PHY 1408 and/or a LOW NR PHY 1409), and an RF 1410 may be in a DU. In the split option example 2, the NR RRC 1401 and the NR PDCP 1403 may be in a CU, and the NR RLC, the NR MAC, the NR PHY, and the RF 1410 may be in a DU. In the split option example 3, the NR RRC 1401, the NR PDCP 1403, and a partial function of the NR RLC (e.g., the High NR RLC 1404) may be in a CU, and the other partial function of the NR RLC (e.g., the Low NR RLC 1405), the NR MAC, the NR PHY, and the RF 1410 may be in a DU. In the split option example 4, the NR RRC 1401, the NR PDCP 1403, and the NR RLC may be in a CU, and the NR MAC, the NR PHY, and the RF 1410 may be in a DU. In the split option example 5, the NR RRC 1401, the NR PDCP 1403, the NR RLC, and a partial function of the NR MAC (e.g., the High NR MAC 1406) may be in a CU, and the other partial function of the NR MAC (e.g., the Low NR MAC 1407), the NR PHY, and the RF 1410 may be in a DU. In the split option example 6, the NR RRC 1401, the NR PDCP 1403, the NR RLC, and the NR MAC may be in CU, and the NR PHY and the RF 1410 may be in a DU. In the split option example 7, the NR RRC 1401, the NR PDCP 1403, the NR RLC, the NR MAC, and a partial function of the NR PHY (e.g., the High NR PHY 1408) may be in a CU, and the other partial function of the NR PHY (e.g., the Low NR PHY 1409) and the RF 1410 may be in a DU. In the split option example 8, the NR RRC 1401, the NR PDCP 1403, the NR RLC, the NR MAC, and the NR PHY may be in a CU, and the RF 1410 may be in a DU.

The functional split may be configured per CU, per DU, per wireless device, per bearer, per slice, and/or with other granularities. In a per CU split, a CU may have a fixed split, and DUs may be configured to match the split option of the CU. In a per DU split, each DU may be configured with a different split, and a CU may provide different split options for different DUs. In a per wireless device split, a gNB (e.g., a CU and a DU) may provide different split options for different wireless devices. In a per bearer split, different split options may be utilized for different bearer types. In a per slice splice, different split options may be applied for different slices.

A new radio access network (new RAN) may support different network slices, which may allow differentiated treatment customized to support different service requirements with end to end scope. The new RAN may provide a differentiated handling of traffic for different network slices that may be pre-configured, and the new RAN may allow a single RAN node to support multiple slices. The new RAN may support selection of a RAN part for a given network slice, for example, by one or more slice ID(s) or NSSAI(s) provided by a wireless device or provided by an NGC (e.g., an NG CP). The slice ID(s) or NSSAI(s) may identify one or more of pre-configured network slices in a PLMN. For an initial attach, a wireless device may provide a slice ID and/or an NSSAI, and a RAN node (e.g., a gNB) may use the slice ID or the NSSAI for routing an initial NAS signaling to an NGC control plane function (e.g., an NG CP). If a wireless device does not provide any slice ID or NSSAI, a RAN node may send a NAS signaling to a default NGC control plane function. For subsequent accesses, the wireless device may provide a temporary ID for a slice identification, which may be assigned by the NGC control plane function, to enable a RAN node to route the NAS message to a relevant NGC control plane function. The new RAN may support resource isolation between slices. If the RAN resource isolation is implemented, shortage of shared resources in one slice does not cause a break in a service level agreement for another slice.

The amount of data traffic carried over networks is expected to increase for many years to come. The number of users and/or devices is increasing and each user/device accesses an increasing number and variety of services, for example, video delivery, large files, and images. This requires not only high capacity in the network, but also provisioning very high data rates to meet customers' expectations on interactivity and responsiveness. More spectrum may be required for network operators to meet the increasing demand. Considering user expectations of high data rates along with seamless mobility, it is beneficial that more spectrum be made available for deploying macro cells as well as small cells for communication systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, if present, may be an effective complement to licensed spectrum for network operators, for example, to help address the traffic explosion in some examples, such as hotspot areas. Licensed Assisted Access (LAA) offers an alternative for operators to make use of unlicensed spectrum, for example, if managing one radio network, offering new possibilities for optimizing the network's efficiency.

Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

Discontinuous transmission on an unlicensed carrier with limited maximum transmission duration may be enabled.

Some of these functions may be supported by one or more signals to be transmitted from the beginning of a discontinuous LAA downlink transmission. Channel reservation may be enabled by the transmission of signals, by an LAA node, after gaining channel access, for example, via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by wireless devices, time synchronization of wireless devices, and frequency synchronization of wireless devices.

DL LAA design may employ subframe boundary alignment according to LTE-A carrier aggregation timing relationships across serving cells aggregated by CA. This may not indicate that the eNB transmissions may start only at the subframe boundary. LAA may support transmitting PDSCH if not all OFDM symbols are available for transmission in a subframe according to LBT. Delivery of necessary control information for the PDSCH may also be supported.

LBT procedures may be employed for fair and friendly coexistence of LAA with other operators and technologies operating in unlicensed spectrum. LBT procedures on a node attempting to transmit on a carrier in unlicensed spectrum may require the node to perform a clear channel assessment to determine if the channel is free for use. An LBT procedure may involve at least energy detection to determine if the channel is being used. For example, regulatory requirements in some regions, for example, in Europe, specify an energy detection threshold such that if a node receives energy greater than this threshold, the node assumes that the channel is not free. Nodes may follow such regulatory requirements. A node may optionally use a lower threshold for energy detection than that specified by regulatory requirements. LAA may employ a mechanism to adaptively change the energy detection threshold, for example, LAA may employ a mechanism to adaptively lower the energy detection threshold from an upper bound. Adaptation mechanism may not preclude static or semi-static setting of the threshold. A Category 4 LBT mechanism or other type of LBT mechanisms may be implemented.

Various example LBT mechanisms may be implemented. For some signals, in some implementation scenarios, in some situations, and/or in some frequencies, no LBT procedure may performed by the transmitting entity. For example, Category 2 (e.g., LBT without random back-off) may be implemented. The duration of time that the channel is sensed to be idle before the transmitting entity transmits may be deterministic. For example, Category 3 (e.g., LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle, for example, before the transmitting entity transmits on the channel. For example, Category 4 (e.g., LBT with random back-off with a contention window of variable size) may be implemented. The transmitting entity may draw a random number N within a contention window. The size of contention window may be specified by the minimum and maximum value of N. The transmitting entity may vary the size of the contention window if drawing the random number N. The random number N may be used in the LBT procedure to determine the duration of time that the channel is sensed to be idle, for example, before the transmitting entity transmits on the channel.

LAA may employ uplink LBT at the wireless device. The UL LBT scheme may be different from the DL LBT scheme, for example, by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

LAA may use uplink LBT at the wireless device. The UL LBT scheme may be different from the DL LBT scheme, for example, by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

A DL transmission burst may be a continuous transmission from a DL transmitting node, for example, with no transmission immediately before or after from the same node on the same CC. An UL transmission burst from a wireless device perspective may be a continuous transmission from a wireless device, for example, with no transmission immediately before or after from the same wireless device on the same CC. A UL transmission burst may be defined from a wireless device perspective or from an eNB perspective. If an eNB is operating DL and UL LAA over the same unlicensed carrier, DL transmission burst(s) and UL transmission burst(s) on LAA may be scheduled in a TDM manner over the same unlicensed carrier. An instant in time may be part of a DL transmission burst or part of an UL transmission burst.

A base station may configure a wireless device for uplink transmissions without a grant (e.g., grant free uplink transmissions). Resources for uplink transmission without grant may be semi-statically configured and/or reconfigured. A resource configuration may comprise at least: physical resources in a time domain and/or frequency domain, and/or reference signal (RS) parameters. The configuration parameters may comprise at least modulation and coding scheme (MCS), redundancy version, and/or a number of repetitions (K). A wireless device may be configured with multiple K values. One or more RSs may be transmitted with data, for example, for an uplink transmission without grant. The same channel structure as grant-based transmission may be used for uplink transmissions without grant. A common DMRS structure may be used for downlink and uplink, such as for CP-OFDM. K repetitions, including initial transmission may be used. K repetitions for the same transport block may be with or without the same RV and/or with or without the same MCS. K repetitions may be used, for example, for an uplink transmission with and/or without grant. Frequency hopping may be used, for example, between an initial transmission and a retransmission, and/or between retransmissions. A wireless device may continue repetitions for a TB until either an acknowledgement (ACK) is successfully received from a base station or the number of repetitions for the TB reaches K. A wireless device may continue such repetitions for the TB, for example, for uplink transmissions without grant. A wireless device may continue repetitions for a TB (e.g., where the wireless device may be configured with K repetitions for a TB transmission with and/or without grant): until an uplink grant is successfully received for a slot, and/or a mini-slot, for the same TB; an acknowledgement and/or indication of a successful receiving of the TB from a base station; and/or the number of repetitions for the TB reaches K. A wireless device may be identified based on an RS sequence and/or configuration for the wireless device, and/or radio resources configured for uplink transmission. Additionally or alternatively, a wireless device ID may be based on an RS sequence and/or configuration for the wireless device, and/or radio resources configured for uplink transmission.

Time and frequency resources for uplink transmission without grant may be configured in a wireless device-specific manner. A network may configure the same time and/or frequency resource, and/or RS parameters, for multiple wireless devices. A base station may avoid collision with such a network implementation. The base station may identify a wireless device ID, for example, based on physical layer parameters such as time and/or frequency resources, and/or RS (e.g., DMRS) resources and/or parameters. One or both of DFT-S-OFDM and CP-OFDM may be supported, for example, for uplink transmission without grant. Uplink transmission without grant may support one or more HARQ processes. HARQ process ID may be identified, for example, based on resources used for uplink transmission without grant, such as time and/or frequency resources and/or RS parameters for HARQ process ID identification. Such HARQ process ID identification may be used for one or both of transmission with grant and transmission without grant.

A wireless device may be configured with a plurality of parameters for uplink data transmission without grant. The wireless device may be configured with one or more of: a reference symbol, and/or time and/or frequency resources. The wireless device may be configured in a wireless device-specific manner. The time and/or frequency resources configured for a wireless device may or may not collide with those of another wireless device. DFT-S-OFDM and/or CP-OFDM may be supported, such as for uplink transmission without grant. Uplink transmission without grant may support a plurality of HARQ processes. L1 signaling may be used for activation and/or deactivation of uplink transmission without grant. L1 signaling may be used for modification of parameters that may be configured, for example, by RRC signaling. Example parameters may comprise time domain resource allocation (e.g., for one transmission), frequency domain resource allocation (e.g., in terms of RBs or RBGs), wireless device-specific DMRS configuration, MCS/TBS, etc. L1 signaling may be used for switching to and/or from grant-based re-transmission for the same TB. The L1 signaling may be based on wireless device-specific DCI (e.g., uplink grant) and/or a group common DCI. RRC configuration and/or reconfiguration of a set of resource and parameters may comprise transmission interval, physical resources such as time domain resource allocation (e.g., for one transmission), frequency domain resource allocation (e.g., in terms of RBs or RBG(s)), wireless device-specific DMRS configuration, etc. A plurality of physical resources may be configured in the transmission interval. One or more repetitions of a same one or more TBs may be performed (e.g., during the transmission interval) after an initial transmission. A repetition in the one or more repetitions may be performed in the same resource configured for initial transmission. A repetition in the one or more repetitions may be may be in a different resource than the initial transmission. The radio resources configured for initial transmission and repetition may or may not be timely contiguous.

Uplink transmission without grant may be configured and/or activated with a plurality of types. In a first type, UL data transmission without grant may be activated and/or deactivated based on RRC configuration, and/or reconfiguration, without L1 signaling. In a second type, UL data transmission without grant may be based on both RRC configuration and L1 signaling for activation and/or deactivation. In a third type, UL data transmission without grant may be based on RRC configuration and may allow L1 signaling to modify some parameters configured by RRC signaling. For the first type of UL data transmission without grant, the RRC configuration and/or reconfiguration may comprise periodicity and offset of a resource with respect to one or more of: SFN=0, time domain resource allocation, frequency domain resource allocation, wireless device-specific DMRS configuration, MCS and/or TBS, number of repetitions K, power control related parameters, HARQ related parameters, etc. For the second type of UL transmission without grant, some parameters, for example, periodicity and/or power control related parameters, may be RRC configured. For the second type of UL transmission without grant, the parameters that may not be RRC configured and/or required to be updated (e.g., an offset value with respect to a timing reference, time domain resource allocation, frequency domain resource allocation, wireless device-specific DMRS configuration, and/or MCS and/or TBS) may be indicated by L1 signaling. The number of repetitions K may be RRC configured and/or indicated by L1 signaling.

An uplink grant, a group-common DCI, and/or a HARQ feedback indication mechanism used for an uplink transmission without grant may indicate an ACK or NACK implicitly or explicitly, which may reduce a signaling overhead and/or fulfill one or more service requirements (e.g., URLLC). An uplink grant may indicate an ACK for an uplink transmission without grant, for example, after or in response to the uplink transmission without grant. The uplink grant may be a dynamic grant, which may be for the same HARQ process as the uplink transmission without grant. An uplink grant for a new data transmission may implicitly indicate an ACK for an uplink transmission without grant. An uplink grant for the same TB initially transmitted without grant may indicate NACK for an uplink transmission without grant.

A group-common DCI may be used to indicate one or more HARQ feedbacks of one or more wireless devices, such as for uplink transmission without grant. The group common DCI may indicate an ACK. Additionally or alternatively, the group common DCI may indicate a NACK. Additionally or alternatively, the group common DCI may indicate an ACK and/or a NACK.

The wireless device may use a timer, for example, to determine an implicit and/or explicit HARQ feedback (e.g., ACK and/or NACK) that may correspond to an uplink transmission without grant. A timer value may be configured for the wireless device, for example, via RRC signaling. The wireless device may receive one or more RRC message indicating the timer value. The wireless device may start and/or restart the timer, for example, after or in response to an uplink transmission without grant (e.g., one or more TBs corresponding to an uplink transmission without grant). The wireless device may assume or determine an ACK occurrence after or in response to the timer expiring and the wireless device not receiving a NACK (e.g., after K repetitions). The wireless device may assume or determine a NACK occurrence after or in response to the timer expiring and the wireless device not receiving an ACK. The wireless device may assume or determine a NACK occurrence corresponding to an uplink transmission without grant after or in response to receiving a grant (e.g., dynamic grant) for retransmission of the same one or more TBs in a first uplink transmission without grant (e.g., the same HARQ process and with NDI not indicating a switch). The wireless device may assume or determine a NACK occurrence corresponding to an uplink transmission without grant after or in response to receiving a grant (e.g., a dynamic grant) for retransmission of the same one or more TB in a first uplink transmission without grant in a period of time. The period of time may be configured for the wireless device. The wireless device may receive an RRC message indicating the period of time. The period of time may be pre-configured. The period of time may be indicated and/or updated by L1 signaling.

A base station may configure a wireless device with one or more RNTIs, such as for uplink transmission without grant. The base station may configure a RNTI for uplink transmission without grant per configuration, per service, per type (e.g., the first, second, and/or third types), and/or per a wireless device. The base station may configure a wireless device with a first RNTI. The first RNTI may be a group-common RNTI. The base station may transmit downlink control information (DCI) (e.g., a group common DCI) corresponding to the first RNTI. The base station may use the DCI for indicating HARQ feedback (e.g., ACK and/or NACK) that may correspond to one or more uplink transmissions (e.g., one or more TBs corresponding to one or more uplink transmission) without uplink grant (e.g., for semi-persistent scheduling (SPS) and/or grant-free resource configuration) for one or more wireless devices. The DCI may be scrambled, for example, based on the first RNTI. The wireless device may monitor a common search space to detect the DCI corresponding to the first RNTI. The base station may transmit and/or indicate NACK (e.g., using the DCI) corresponding to one or more TBs of the wireless device. The wireless device may assume or determine an ACK occurrence (e.g., implicit ACK) if no NACK is received within a period of time. The base station may transmit and/or indicate an ACK (e.g., using the DCI), and the wireless device may assume or determine a NACK occurrence (e.g., implicit NACK), if no ACK is received within a period of time. The period of time may be configured for the wireless device. The base station may transmit an RRC message indicating the period of time. The period of time may be pre-configured. The wireless device may transmit up to a first number of repetitions of a same one or more TBs corresponding to an uplink transmission without grant. The period of time may or may not be based on the duration that the first number of repetitions (e.g., of the same one or more TBs corresponding to the uplink transmission) is received. The wireless device may monitor for the DCI at least for a portion of the period of time. The wireless device may stop monitoring the DCI, for example, after or in response to receiving the ACK and/or NACK corresponding to the uplink transmission without grant. The DCI may comprise an ACK and/or a NACK for a plurality of wireless devices. The plurality of wireless devices may be configured with the same first RNTI used for transmission of the DCI. The plurality of wireless devices configured with the same first RNTI may monitor the search space, detect the same DCI, and/or identify HARQ feedback corresponding to their transmissions. The DCI may comprise a plurality of HARQ feedbacks (e.g., corresponding to a plurality of TBs) for the same wireless device. The mapping between a HARQ feedback and a corresponding wireless device, and/or the mapping between a HARQ feedback and a TB in a plurality of TBs transmitted by a wireless device, may be based on a rule, implicitly indicated by the DCI, and/or explicitly indicated by the DCI.

Uplink demodulation reference signals (DMRS) may be used for channel estimation and/or coherent demodulation of PUSCH and PUCCH. A base station may configure a wireless device with DMRS configuration parameters. The wireless device may receive one or more RRC messages. The one or more RRC messages may comprise a DMRS-Config IE. The DMRS-Config IE may comprise DMRS configuration parameters. The DMRS-Config configuration may be enhanced and/or the DMRS-Config configuration parameters may be enhanced. A DMRS-Config IE may be represented as follows:

```
DMRS-Config-r11 ::=       CHOICE {
    release                       NULL,
    setup                         SEQUENCE {
                                      scramblingIdentity-r11    INTEGER (0..503),
                                      scramblingIdentity2-r11   INTEGER (0..503)
                                  }
}
DMRS-Config-v1310 ::=                                 SEQUENCE {
                                      dmrs-tableAlt-r13         ENUMERATED {true}
                                      OPTIONAL -- Need OR
}
```

Parameters scramblingIdentity and/or scramblingIdentity2 may indicate a parameter $n^{DMRS,i}_{ID}$. The parameter, dmrs-tableAlt may indicate whether to use an alternative table for DMRS, for example, upon PDSCH transmission.

An uplink (UL) transmission without a dynamic UL grant, which may be referred to as a grant-free (GF) UL transmission or a configured grant transmission, may be supported. Configured grant transmissions may be supported for one or more service types, including, for example, URLLC. A base station may allocate to a wireless device one or more configured grant radio resources. The wireless device may be configured by the base station to use the configured grant radio resources to transmit, via the configured grant radio resources without a dynamic UL grant, one or more data packets. By using configured grant radio resources, without a dynamic UL grant, a wireless device may be able to reduce signaling overhead relative to a grant-based (GB) UL transmission. A service type that may have strict requirements, for example in terms of latency and reliability, such as in URLLC, may be a candidate for which a base station may configure a wireless device with the configured grant transmission. The wireless device configured with the configured grant radio resource may skip a UL transmission via the configured grant radio resource, for example, if the wireless device does not have data to transmit.

Configured grant transmission may support multiple wireless devices to access the same configured grant radio resources (e.g., a GF radio resource pool), which may reduce latency, and reduce signaling overhead, relative a GB UL transmission. A GF radio resource pool may comprise a subset of one or more radio resources from a common radio resource set (e.g., from all uplink shared channel radio resources). A GF radio resource pool may be used to allocate exclusive, or partially overlapped, one or more radio resources for configured grant transmissions in a cell. A GF resource pool may be used to organize frequency and/or time reuse between different cells or parts of a cell (e.g., at a cell-center and/or at a cell-edge).

A collision may occur between configured grant transmissions of two or more wireless devices, for example, if a base station configures multiple wireless devices with the same (or partially overlapped) GF radio resource pool. The base station may configure one or more parameters to assign a wireless device specific demodulation reference signal (DMRS), along with the GF radio resource pool configuration, in order to identify a wireless device ID. One or more parameters may indicate one or more of a root index of a set of Zadoff-Chu (ZC) sequences, a cyclic shift (CS) index, a TDM/FDM pattern index, or an orthogonal cover code (OCC) sequence or index.

A base station may use one or more preamble sequences that may be transmitted together with the PUSCH data, for example, for a wireless device ID identification. One or more preamble sequences may be designed to be reliable enough and to meet a detection requirement of a service, for example, URLLC. A preamble sequence may be uniquely allocated to a wireless device, for example, for wireless devices configured with a GF radio resource pool. A base station may configure different GF radio resources for different sets of wireless devices such that the preamble sequences may be reused in different GF radio resources. The preamble sequences may be mutually orthogonal, for example orthogonality between ZC root sequences with different cyclic shifts, which may provide reliable detection performance. A wireless device may transmit one or more preambles together with the data block in a first step and receive a response in a second step. The data from the data block may be repeated K times depending on a base station configuration. The one or more preambles may not be repeated. The response from the base station may be, for example, a UL grant, or a dedicated ACK and/or NACK that may be transmitted in the form of downlink control information (DCI).

A GF resource pool configuration may or may not be known to one or more wireless devices. A GF resource pool may be coordinated between different cells, for example, for interference coordination. GF resource pools may be semi-statically configured by wireless device-specific RRC signaling (e.g., if the GF resource pools are known to those wireless devices) or by non-wireless device-specific RRC signaling (e.g., via broadcasting a system information block). The RRC signaling for GF radio resource configuration may include one or more parameters indicating one or more of the following: periodicity and offset of a resource with respect to SFN=0, time domain resource allocation, frequency domain resource allocation, wireless device-specific DMRS configuration, a modulation and coding scheme (MCS), a transport block size (TBS), number of repetitions K, a hopping pattern, HARQ related parameters, or power control related parameters. A wireless device may activate the configured grant transmission, that may be configured by the RRC signaling, after or in response to receiving the RRC signaling without an additional signaling.

An L1 activation signaling may be used, for example, with RRC signaling, to configure and/or activate a configured grant (e.g., GF) configuration. RRC signaling may configure one or more parameters of configured grant transmission to the wireless device. L1 activation signaling may activate, or deactivate, the configured grant transmission. L1 activation signaling may be used to activate, configure, adjust, modify, and/or update one or more parameters associated with configured grant transmission.

The L1 activation signaling may be transmitted via a PDCCH in the form of DCI, such as DCI used in UL semi-persistent scheduling (SPS). A base station may assign a radio network temporary identifier (RNTI), for a wireless device, along with configured grant configuration parameters in the RRC signaling. Using the assigned RNTI, the wireless device may monitor the PDCCH to receive L1 activation signaling that may be masked by the RNTI. An uplink grant may be configured via RRC (e.g., for configured grant Type 1) or an uplink grant may be provided via PDCCH signaling (e.g., for configured grant Type 2) which may be addressed to a CS-RNTI.

RRC configuration and/or reconfiguration of configured grant transmission without a dynamic UL grant may comprise one or more of periodicity of a resource or power control related parameters. L1 activation signaling may provide one or more of the following parameters for the configured grant resource: offset associated with the periodicity with respect to a timing reference, time domain resource allocation, frequency domain resource allocation, wireless device-specific DMRS configuration, an MCS and/or TBS value, HARQ related parameters, number of repetitions K, or a hopping pattern.

An MCS may be indicated by the wireless device within grant-free data. A number of MCS levels may be pre-configured by a base station, for example, to avoid blind decoding of MCS indication. K bits may be used to indicate MCS of grant-free data, where K may be as small as possible. The number of resource elements used to transmit MCS indication in a resource group may be semi-statically configured. In a configured grant operation, there may be one common MCS for all wireless devices. The common MCS may be predefined or determined by one or more devices. There may be a tradeoff between a spectrum efficiency and decoding reliability, such that the spectrum efficiency may be reduced, if a low level of MCS is used, and the data transmission reliability may increase. A mapping rule, between multiple time and/or frequency resources for UL grant-free transmission and MCSs, may be determined based on system requirements (e.g., NR requirements). A wireless device may select a MCS based on a DL measurement and associated time and/or frequency resources to transmit UL data. The wireless device may select a MCS, based on the channel status, and increase the resource utilization.

A configured grant transmission may be activated in different ways, for example, via RRC signaling or via L1 activation signaling, if a wireless device is configured with a configured grant transmission. The need for L1 activation signaling may depend on service types, and the dynamic activation (e.g., activation via L1 activation signaling) may not be supported or may be configurable based on service and/or traffic considerations.

A base station may determine whether to configure a wireless device with or without L1 activation signaling. The determination may be based on, for example, traffic pattern, latency requirements, and/or other requirements. By using L1 activation signaling, a wireless device may transmit a data packet with configured time and/or frequency radio resource, for example, if the wireless device receives an L1 activation signaling from the base station. A wireless device may start a UL transmission with a configured GF radio resource at any moment, or in a certain time interval (which may be configured by RRC signaling or pre-defined) after the configuration is completed, for example, if the L1 activation signaling is not configured. A wireless device may activate the configured grant transmission after or in response to receiving the RRC signaling configuring the configured grant transmission.

An activation type (e.g., via RRC signaling or via L1 activation signaling) may be pre-configured. RRC signaling, transmitted from a base station to a wireless device to configure a configured grant transmission, may comprise an indicator that may be used to indicate whether the activation of the configured grant transmission requires an L1 activation signaling. If the indicator requires L1 activation signaling, the wireless device may wait for an L1 activation signaling and activate the configured grant transmission after or in response to receiving the L1 activation signaling. If L1 activation signaling is used, the wireless device may transmit an acknowledgement after or in response to receiving an L1 activation signaling to the base station to provide an indication as to whether the wireless device correctly receives the L1 activation signaling.

The configured grant transmission may be activated after or in response to the RRC signaling configuring the configured grant transmission, for example, if the indicator indicates L1 activation signaling is not required. For the activation of configured grant transmission without the L1 activation signaling, the wireless device may not determine when to start the configured grant transmission. The base station and the wireless device may predefine the start timing, for example, based on a time offset and the transmission time interval (TTI), such as a subframe, slot, or mini-slot, if the wireless device receives the RRC signaling for the configured grant transmission configuration. The RRC configuration may comprise one or more parameters indicating the start timing (e.g., in terms of a subframe, slot, or mini-slot).

RRC signaling may not contain an indicator as to whether the activation required a L1 activation signaling. A wireless device may implicitly know whether the configured grant transmission is activated by RRC signaling or L1 activation signaling, for example, based on a format of RRC configuration. For a configured grant transmission without L1 activation signaling, the RRC signaling for configuring and activating the configured grant transmission may comprise one or more parameters for the configured grant transmission. For a configured grant transmission activated by the L1 activation signaling, an RRC signaling may comprise a different number of parameters that may be less than a number of parameters in the RRC signaling activating the configured grant transmission. The absence of one or more parameters, and/or the number of parameters in the RRC signaling, may be an implicit indicator for a wireless device as to whether to activate the configured grant transmission, via RRC signaling or via L1 activation signaling.

The L1 activation signaling may comprise one or more parameters indicating one or more configured grant configurations, for example, start timing of configured grant transmission, configured grant time and frequency radio resources, DMRS parameters, a modulation and coding scheme (MCS), a transport block size (TBS), number of repetitions K, a hopping pattern, or power control parameters. A downlink control information (DCI) format used for the activation of the configured grant transmission may comprise one or more fields indicating a MCS for the configured grant transmission. The configured grant transmission requiring the L1 activation signaling may be configured with a RRC signaling that may not comprise one or more parameters indicating the MCS for the configured grant transmission. The MCS information may be carried by a L1 signaling which may activate the configured grant transmission. A wireless device may activate the configured grant transmission after or in response to the RRC signaling, without waiting for a L1 signaling, for example, if the wireless device receives a RRC signaling comprising a MCS for a configured grant transmission.

The L1 activation signaling may be configured to control network resource load and utilization, for example, if the service does not require high reliability and latency. For a delay sensitive service, the additional activation signaling may cause additional delay and may lead to potential service interruption and/or unavailability for the period of applying and requesting the activation. A base station may configure the wireless device with a configured grant transmission such that the configured grant transmission may be activated after or in response to the RRC signaling comprising a configured grant radio resource configuration and transmission parameters.

The configured grant radio resource may become over-allocated, which may result in a waste of radio resources, for example, with few wireless devices. L1 signaling may be used to reconfigure the configured grant radio resource or one or more configured grant transmission parameters. By allowing L1 signaling-based reconfiguration, wireless devices may periodically monitor a downlink control channel to detect the L1 signaling, scrambled by a RNTI, that may indicate whether the configured grant radio resources or parameters have changed. This monitoring may increase the power consumption of a wireless device, and the periodicity to check the downlink control signaling may be configurable. The periodicity may be configured to be short, such as every 1 minute or every radio frame, for example, if a radio resource utilization may be more important than a particular power consumption level. The periodicity may be configured to be long, such as every 1 hour, for example, if a power consumption level may be important than a particular monitoring periodicity. The periodicity to check downlink control signaling may be separated from the periodicity of configured grant transmission, for example, in order to shorten the latency. The periodicity of configured grant radio resource may be less than 1 ms, such as 0.125 ms, whereas the periodicity to check downlink control signaling may be greater, such as 1 minute or 1 hour. L1 deactivation signaling may be used for all services in order to release resources as fast as possible, for example, for deactivating the activated configured grant operation.

For the configured grant transmission, a base station may support a K number of repetitions of the same transport block (TB) transmission over the configured grant radio resource pool until one or more conditions are met. A wireless device may continue the repetitions up to K times for the same TB until one or more of the following conditions is met: if an UL grant (or HARQ ACK and/or NACK) is successfully received from the base station before the number of repetitions reaches K, the number of repetitions for the TB reaches K, or other termination condition of repetitions may apply.

The number of repetitions, K, may be a configurable parameter that may be wireless device-specific, and/or cell-specific. A unit of the K-repetition may comprise, for example, a mini-slot, a symbol, or any other period. A base station may configure the number of this repetition and the radio resource in advance, for example, via one or more RRC messages. The base station may transmit L1 activation signaling comprising a parameter indicating the number of repetitions K. The base station may assume a set of initial transmission and the repetition as one amount of the transmission. The base station may not be limited to only initial transmission or only repetition. The set of initial transmission and its one or more repetitions may comprise an extended TTI. The repetitions may not be necessarily contiguous in time. If the repetitions are contiguous in time, it may allow coherent combining. If the repetitions are not contiguous in time, it may allow time diversity.

A base station may fail to detect a plurality of wireless devices' data, for example, if the configured grant transmission of the plurality of wireless devices collides in the same GF radio resource pool. If two wireless devices retransmit the data without UL grants, the wireless devices may collide again. Hopping may be used to solve such a collision problem, for example, if radio resources are shared by multiple wireless devices. The hopping may randomize the collision relationship between wireless devices within a certain time interval that may avoid persistent collision. The hopping may bring a diversity gain on the frequency domain. A wireless device-specific hopping pattern may be pre-configured or may be indicated, for example, by RRC signaling or L1 activation signaling. The wireless device-specific hopping pattern may be generated based on a known wireless device-specific ID, for example, a wireless device-specific DMRS index and/or RNTI.

The hopping pattern may be determined from one or more factors, such as the number of resource units (RUs), the maximum number of wireless devices sharing the same RU, the recently used RU index, the recent hopping index or the current slot index, the information indicating recently used sequence, hopping pattern, or hopping rule. A sequence such as referenced above may be a DMRS, a spreading sequence, or a preamble sequence that may be wireless device-specific.

The repetitions parameter K may be configured by one or more RRC messages or L1 activation signaling. A wireless device configured with the repetitions parameter K may transmit a transport block (TB) K times. The wireless device may transmit the TB K times with the same redundancy version (RV) or the wireless device may transmit the TB K times with different RVs between the repetitions. The RV determination for K repetitions may comprise the initial transmission.

The RV determination may be fixed to a single value, fixed to a pre-defined RV pattern comprising a plurality of RVs, configured by one or more RRC messages with a single value, or configured by one or more RRC messages with a RV pattern comprising a plurality of RVs, for example, if the configured grant transmission is activated by one or more RRC messages. The RV determination may be fixed to a single value, fixed to a pre-defined RV pattern comprising a plurality of RVs, configured by the one or more RRC messages with a single value, configured by one or more RRC messages with a RV pattern comprising a plurality of RVs, or configured by the L1 activation signaling with a single value, or a RV pattern comprising a plurality of RVs, for example, if the configured grant transmission is (fully or partially) configured by one or more RRC messages and activated by L1 activation signaling.

A base station may switch between configured grant and dynamic grant UL transmissions, for example, to balance resource utilization and delay and/or reliability requirements of associated services. The configured grant transmissions may be based on a semi-static resource configuration that may be beneficial to reduce latency. Such a pre-defined resource configuration may be difficult to satisfy all potential services or packet sizes. The overhead may be large, and the packet size for a service, such as URLLC, may be variable. If a wireless device's data packet collides with other wireless device's packets in the configured grant transmission, a re-attempt to access configured grant radio resources may not achieve the service requirements and switching from configured grant to dynamic grant UL transmissions may be beneficial.

The initial transmission on the pre-configured configured grant radio resources may include wireless device identification (ID), for example, to support the switching between configured grant and dynamic grant UL transmissions. Wireless device identification may comprise explicit wireless device ID information (e.g., C-RNTI) or implicit wireless device information such as a DMRS cyclic shift (assuming use of ZC sequences) specific signature. The wireless device may include buffer status reporting (BSR) with the initial data transmission, for example, to inform a base station of whether the wireless device has remaining data to transmit. A base station may switch a type of scheduling for the wireless device from configured grant to dynamic grant UL transmissions, for example, if the base station successfully decodes data transmitted by a wireless device and determines (e.g. from a BSR report) that the wireless device has remaining data to transmit, and/or if the base station fails to decode data transmitted by the wireless device but successfully detects the wireless device ID from the uniquely assigned sequence (e.g., preamble and/or DMRS). The UL grant for subsequent data transmissions may be with CRC scrambled by the wireless device's RNTI (which may be determined, for example, by explicit signaling in the initial transmission or implicitly by the DMRS cyclic shift).

A termination condition, of one or more termination conditions, for the K-repetitions may be a reception of a DCI comprising an UL grant which schedules an UL transmission and/or retransmission for the same TB. A base station may assign dedicated resources for retransmission, for example, in order to ensure that the TB is delivered within the latency budget. Scheduling switching from configured grant to dynamic grant operation may comprise such assignment of dedicated resources for retransmission. A wireless device may be required to link the received grant with the transmitted TB, for example, to identify which TB is to be retransmitted, such as if there are multiple ongoing transmission processes at the wireless device. The wireless device and the base station may have the same notion of TB (and/or RV) counting.

The TB counting for the configured grant operation may not be possible, for example, if a base station may not detect one or more TBs, such as due to collisions. To make an association between a DCI with a TB, there may be one or more options. The wireless device may directly associate the DCI with a TB that is being transmitted, for example, if there is no other transmission process at the wireless device side. A wireless device may determine that the DCI is for a particular TB by applying an implicit linkage that may assume only one TB is transmitted in one transmission interval, for example, if there are at least two different TBs. If the interval between detected wireless device transmission and a grant is fixed, the interval may determine which TB may be retransmitted. If the timing between a detected transmission and a retransmission grant is not preconfigured, an explicit indication of the retransmitted TB may be carried by DCI. If a wireless device detects that a grant for one TB overlaps with a transmission of another ongoing TB, the wireless device may assume precedence of the grant relative to the grant-free retransmissions. If a grant is received for a new TB (e.g., for aperiodic CSI reporting) and if the grant overlaps with the configured grant transmissions, the configured grant transmissions may be dropped in the resources. Additionally or alternatively, a prioritization rule whether to transmit a triggered report or configured grant data may be used, for example, depending on priority of the associated services. For services such as URLLC services, the CSI reporting may be dropped.

A dedicated, pre-assigned channel may be used for early termination. A physical HARQ indicator channel (PHICH) may be used as an acknowledge indicator. The PHICH for a wireless device may be determined based on the physical resource block (PRB) and cyclic shift of the DMRS corresponding to the wireless device's PUSCH transmission. Similar design principle may be used for a configured grant transmission. The early termination based on a PHICH-like channel may improve the control channel capacity and system capacity. If a base station has successfully received a TB, the base station may obtain the corresponding information about the transmission of the TB, such as the wireless device ID, the resource used for carrying this transmission, and/or the DMRS used for this transmission. The physical resources may be shared among multiple wireless devices that may have their own unique identifiers (e.g., DMRS) used in the configured grant radio resource pool. If the base station has successfully received a TB, a unique PHICH may be determined, for example, even for configured grant transmission.

A sequence based signal may be used for early termination of K-repetition. The sequence based signal may be transmitted, via one or more pre-assigned channels, to inform the wireless device to terminate the repetition of transmission. The signal may be transmitted if a base station successfully decodes a TB. The wireless device may perform a simple signal detection for the presence or absence to decide whether to continue the repetitions.

A base station may switch from configured grant to dynamic grant UL transmissions, for example, to improve a configured grant radio resource shortage. One or more wireless devices having delay requirements that are not strict (e.g., relative to URLLC requirements) may use the configured grant radio resource to transmit a data packet. The base station may measure a level of congestion of the configured grant radio resource shared by a plurality of wireless devices based on statistics, for example, resource utilization, load, and/or a number of wireless devices sharing the configured grant radio resource and having set up a threshold policy to dynamically balance load or resource utilization of the configured grant radio resource. If the resource usage statistic of the configured grant radio resource exceeds a threshold, which may be predefined, switching some wireless devices from the configured grant radio resource to the dynamic grant UL radio resource may provide benefits such as decreased resource collision.

A base station may switch from GF to GB UL transmissions. The base station may switch to GB UL transmissions, for example, in order to improve a GF radio resource shortage. One or more wireless devices with delay requirements that are not strict (e.g., relative to URLLC requirements) may use the GF radio resource to transmit one or more data packets. A base station may measure a level of congestion of the GF UL radio resource shared by a plurality of wireless devices. The base station may measure the level of congestion, for example, based on statistics such as resource utilization, load, and/or a number of wireless device sharing the GF UL radio resource. The base station may set up a threshold policy, for example, to dynamically balance load and/or resource utilization of the GF UL radio resource. It may be beneficial to switch some wireless devices from the GF UL radio resource to the GB UL radio resource, for example, if the resource usage statistic of the GF UL radio resource exceeds a predefined threshold. Switching some wireless devices from the GF UL radio resource to the GB UL radio resource may result in decreasing resource collision.

A wireless device configured for operation with wireless resources (e.g., bandwidth parts (BWPs)) of a serving cell may be configured by higher layers for the serving cell. The wireless device may be configured for a set of BWPs for receptions by the wireless device (e.g., DL BWP set) and/or or a set of BWPs for transmissions by the wireless device (e.g., UL BWP set). For a DL BWP, an UL BWP in a set of DL BWPs, or an UL BWPs, the wireless device may be configured with at least one of following for the serving cell: a subcarrier spacing for DL and/or UL provided by a higher layer parameter, a cyclic prefix for DL and/or UL provided by a higher layer parameter, a number of contiguous PRBs for DL and/or UL provided by a higher layer parameter, an offset of the first PRB for DL and/or UL in the number of contiguous PRBs relative to the first PRB by a higher layer, and/or Q control resource sets (e.g., if the BWP is a DL BWP). Higher layer signaling may configure a wireless device with Q control resource sets, for example, for each serving cell. For a control resource set q, such that $0 \leq q < Q$, the configuration may comprise one or more of following: a first OFDM symbol provided by one or more higher layer parameters, a number of consecutive OFDM symbols provided by one or more higher layer parameters, a set of resource blocks provided by one or more higher layer parameters, a CCE-to-REG mapping provided by one or more higher layer parameters, a REG bundle size (e.g., for interleaved CCE-to-REG mapping provided by one or more higher layer parameters), and/or antenna port quasi-collocation provided by a higher layer parameter.

A control resource set may comprise a set of CCEs numbered from 0 to $N_{CCE,q}-1$, where $N_{CCE,q}$ may be the number of CCEs in control resource set q. Sets of PDCCH candidates that a wireless device monitors may be defined in terms of PDCCH wireless device-specific search spaces. A PDCCH wireless device-specific search space at CCE aggregation level $L \in \{1, 2, 4, 8\}$ may be defined by a set of PDCCH candidates for CCE aggregation level L. A wireless device may be configured (e.g., for a DCI format), per serving cell by one or more higher layer parameters, for a number of PDCCH candidates per CCE aggregation level L.

A wireless device may monitor (e.g., in non-DRX mode operation) one or more PDCCH candidate in control resource set q according to a periodicity of $W_{PDCCH,q}$ symbols. The symbols may be configured by one or more higher layer parameters for control resource set q. The carrier indicator field value may correspond to cif-InSchedulingCell, for example, if a wireless device is configured with a higher layer parameter (e.g., cif-InSchedulingCell). For the serving cell on which a wireless device may monitor one or more PDCCH candidate in a wireless device-specific search space, the wireless device may monitor the one or more PDCCH candidates without carrier indicator field (e.g., if the wireless device is not configured with a carrier indicator field). For the serving cell on which a wireless device may monitor one or more PDCCH candidates in a wireless device-specific search space, the wireless device may monitor the one or more PDCCH candidates with carrier indicator field (e.g., if a wireless device is configured with a carrier indicator field). A wireless device may not monitor one or more PDCCH candidates on a secondary cell, for example, if the wireless device is configured to monitor one or more PDCCH candidates with carrier indicator field corresponding to that secondary cell in another serving cell. For the serving cell on which the wireless device may monitor one or more PDCCH candidates, the wireless device may monitor the one or more PDCCH candidates at least for the same serving cell.

A wireless device may receive PDCCH and/or PDSCH in a DL BWP according to a configured subcarrier spacing and CP length for the DL BWP. A wireless device may transmit PUCCH and/or PUSCH in an UL BWP according to a configured subcarrier spacing and CP length for the UL BWP.

A wireless device may be configured, by one or more higher layer parameters, for a DL BWP from a configured DL BWP set for DL receptions. A wireless device may be configured, by one or more higher layer parameters, for an UL BWP from a configured UL BWP set for UL transmissions. A DL BWP index field value may indicate a DL BWP (such as from the configured DL BWP set) for DL receptions, for example, if the DL BWP index field is configured in a DCI format scheduling PDSCH reception to a wireless device. An UL-BWP index field value may indicate the UL BWP (such as from the configured UL BWP set) for UL transmissions, for example, if the UL-BWP index field is configured in a DCI format scheduling PUSCH transmission from a wireless device.

A wireless device may determine that the center frequency for the DL BWP is or should be the same as the center frequency for the UL BWP, such as for TDD. The wireless device may not monitor PDCCH, for example, if the wireless device performs measurements over a bandwidth that is not within the DL BWP for the wireless device.

A wireless device may identify the bandwidth and/or frequency of an initial active DL BWP, such as for an initial active DL BWP. The wireless device may identify the bandwidth and/or frequency after or in response to receiving the NR-PBCH. A bandwidth of an initial active DL BWP may be confined within the wireless device minimum bandwidth for the given frequency band. The bandwidth may be indicated in PBCH, such as for flexible DL information scheduling. Some bandwidth candidates may be predefined. A number of bits (e.g., x bits) may be used for a bandwidth indication.

A frequency location of an initial active DL BWP may be derived from the bandwidth and SS block (e.g., a center frequency of the initial active DL BWP). The edge of the SS block PRB and data PRB boundary may not be aligned. An SS block may have a frequency offset, for example, if the edge of the SS block PRB and data PRB are not aligned. Predefining the frequency location of an SS block and an initial active DL BWP may reduce the PBCH payload size such that additional bits may not be needed for an indication of a frequency location of an initial active DL BWP. The bandwidth and frequency location may be informed in RMSI, for example, for the paired UL BWP.

A base station may configure a set of BWPs for a wireless device by RRC signaling. The wireless device may transmit or receive in an active BWP from the configured BWPs in a given time instance. An activation and/or a deactivation of DL bandwidth part may be based on a timer for a wireless device. The wireless device may switch its active DL bandwidth part to a default DL bandwidth part, for example, if a timer expires. If the wireless device has not received scheduling DCI for a time period (e.g., X ms, or after expiry of a timer), the wireless device may switch to the default DL BWP.

A new timer (e.g., BWPDeactivationTimer) may be defined to deactivate the original BWP and/or switch to the default BWP. The new timer (e.g., BWPDeactivationTimer) may be started if the original BWP is activated by the activation and/or deactivation DCI. If PDCCH on the original BWP is received, a wireless device may restart the timer (e.g., BWPDeactivationTimer) associated with the original BWP. If the timer (e.g., BWPDeactivationTimer) expires, a wireless device may deactivate the original BWP, switch to the default BWP, stop the timer for the original BWP, and/or flush (or not flush) all HARQ buffers associated with the original BWP.

A base station and a wireless device may have a different understanding of the starting of the timer, for example, if the wireless device misses one or more scheduling grants. The wireless device may be triggered to switch to the default BWP, but the base station may schedule the wireless device in the previous active BWP. The base station may restrict the location of the CORESET of BWP2 to be within BWP1 (e.g., the narrow band BWP1 may be the default BWP), for example, if the default BWP is nested within other BWPs. The wireless device may receive an indication (e.g., CORESET) and switch back to BWP2, for example, if the wireless device previously mistakenly switched to the default BWP.

Restricting the location of the indication (e.g., CORESET) may not solve a miss switching problem, for example, if the default BWP and the other BWPs are not overlapped in frequency domain. The base station may maintain a timer for a wireless device. If the timer expires (e.g., if there is no data scheduled for the wireless device for a time period such as Y ms), and/or if the base station has not received feedback from the wireless device for a time period (such as Y' ms), the wireless device may switch to the default BWP. The wireless device may switch to the default BWP to send a paging signal and/or to re-schedule the wireless device in the default BWP.

A base station may not fix the default bandwidth part to be the same as an initial active bandwidth part. The initial active DL BWP may be the SS block bandwidth which is common to wireless devices in the cell. The traffic load may be very heavy, for example, if many wireless devices fall back to a small bandwidth for data transmission. Configuring the wireless devices with different default BWPs may help to balance the load in the system bandwidth.

There may be no initial active BWP on an SCell, for example, if the initial access is performed on the PCell. An DL BWP and/or UL BWP that is initially activated based on the SCell being activated may be configured or reconfigured by RRC signaling. The default BWP of the SCell may also be configured and/or reconfigured by RRC signaling. The default BWP may be configured or reconfigured by the RRC signaling, and/or the default BWP may be one of the configured BWPs of the wireless device, which may provide a unified design for both PCell and SCell.

The base station may configure a wireless device-specific default DL BWP other than an initial active BWP. The base station may configure the wireless device-specific default DL BWP, for example, after RRC connection, which may be performed for the purpose of load balancing. The default BWP may support connected mode operations other than operations supported by initial active BWP. Other connected mode operations may comprise, for example, fall back and/or connected mode paging. The default BWP may comprise a common search space, such as at least the search space needed for monitoring the pre-emption indications. The default DL and UL BWPs may be independently configured to the wireless device, such as for FDD.

The initial active DL BWP and/or UL BWP may be set as default DL BWP and/or UL BWP, respectively. A wireless device may return to default DL BWP and/or UL BWP. For example, if a wireless device does not receive control for a long time (e.g., based on a timer expiration or a time duration reaching a threshold), the wireless device may fall back to a default BWP (e.g., default DL BWP and/or default UL BWP).

A base station may configure a wireless device with multiple BWPs. The multiple BWPs may share at least one CORESET including a default BWP. CORESET for RMSI may be shared for all configured BWPs. The wireless device may receive control information via the common CORESET, for example, without going back to another BWP or a default BWP. The common CORESET may schedule data within only a default BWP, which may minimize the ambiguity of resource allocation, for example, if a frequency region of a default BWP may belong to all or more than one of the configured BWPs.

A semi-static pattern of BWP switching to default BWP may be performed, for example, if the configured BWP is associated with a different numerology from a default BWP. Switching to a default BWP may be performed, for example, to check RMSI at least periodically. Switching to a default BWP may be necessary particularly if BWPs use different numerologies.

Reconfiguration of a default BWP from an initial BWP may be performed, such as for RRC connected wireless devices. A default BWP may be the same as an initial BWP, such as for RRC IDLE wireless devices. Additionally or alternatively, a wireless device (e.g., RRC IDLE wireless device) may fall back to an initial BWP regardless of a default BWP. If a wireless device performs a measurement based on SS block, reconfiguration of a default BWP outside of an initial BWP may become very inefficient, for example, due to frequent measurement gaps. If a default BWP is reconfigured to outside of an initial BWP, the following conditions may be satisfied: a wireless device may be in a CONNECTED mode, and/or a wireless device may not be configured with an SS block based measurement for both serving cell and neighbor cells.

A DL BWP other than the initial active DL BWP may be configured as the default DL BWP for a wireless device. Reconfiguring the default DL BWP may be performed based on load balancing and/or different numerologies used for an active DL BWP and an initial active DL BWP. A default BWP on a PCell may be an initial active DL BWP for a transmission of RMSI. The transmission of RMSI may comprise one or more of an RMSI CORESET with a CSS, and/or a wireless device-specific search space (e.g., USS). The initial active BWP and/or default BWP may remain an active BWP for a user after a wireless device becomes RRC connected.

Downlink and uplink BWPs may be independently activated, such as for a paired spectrum. Downlink and uplink bandwidth parts may be jointly activated, such as for an unpaired spectrum. In bandwidth adaptation (e.g., where the bandwidth of the active downlink BWP may be changed), a joint activation of a new downlink BWP and a new uplink BWP may be performed (e.g., for an unpaired spectrum). A new DL/UL BWP pair may be activated such that the bandwidth of the uplink BWPs may be the same (e.g., there may not be a change of an uplink BWP).

There may be an association of DL BWP and UL BWP in RRC configuration. For example, a wireless device may not retune the center frequency of a channel bandwidth (BW) between DL and UL, such as for TDD. If the RF is shared between DL and UL (e.g., in TDD), a wireless device may not retune the RF BW for every alternating DL-to-UL and UL-to-DL switching.

Applying an association between a DL BWP and an UL BWP may enable an activation and/or deactivation command to switch both DL and UL BWPs. Such switching may comprise switching a DL BWP together with switching an UL BWP. If an association is not applied between a DL BWP and an UL BWP, separate BWP switching commands may be necessary.

A DL BWP and an UL BWP may be configured separately for the wireless device. Pairing of the DL BWP and the UL BWP may impose constraints on the configured BWPs (e.g., the paired DL BWP and UL BWP may be activated simultaneously or near simultaneously such as within a threshold time period). A base station may indicate a DL BWP and an UL BWP to a wireless device for activation, for example, in a FDD system. A base station may indicate to a wireless device a DL BWP and an UL BWP with the same center frequency for activation, for example, in a TDD system. No pairing and/or association of the DL BWP and UL BWP may be mandatory, even for TDD system, for example, if the activation and/or deactivation of the BWP for the wireless device is instructed by the base station. Pairing and/or association of the DL BWP and UL BWP may be determined by a base station.

An association between a DL carrier and an UL carrier within a serving cell may be performed by carrier association. A wireless device may not be expected to retune the center frequency of a channel BW between DL and UL, such as for a TDD system. An association between a DL BWP and an UL BWP may be required for a wireless device. An association may be performed by grouping DL BWP configurations with same center frequency as one set of DL BWPs and grouping UL BWP configurations with same center frequency as one set of UL BWPs. The set of DL BWPs may be associated with the set of UL BWPs sharing the same center frequency. There may be no association between a DL BWP and an UL BWP, for example, if the association between a DL carrier and an UL carrier within a serving cell may performed by carrier association, such as for an FDD serving cell.

A wireless device may identify a BWP identity from a DCI, which may simplify an indication process. The total number of bits for a BWP identity may depend on the number of bits that may be used within a scheduling DCI (and/or a switching DCI), and/or the wireless device minimum BW. The number of BWPs may be determined based on the wireless device supported minimum BW and/or the network maximum BW. The maximum number of BWPs may be determined based on the network maximum BW and/or the wireless device minimum BW. For example, if 400 MHz is the network maximum BW and 50 MHz is the wireless device minimum BW, 8 BWPs may be configured to the wireless device such that 3 bits may be required within the DCI to indicate the BWP. Such a split of the network BW (e.g., depending on the wireless device minimum BW) may be useful for creating one or more default BWPs from the network side by distributing wireless devices across the entire network BW (e.g., for load balancing purposes).

At least two DL and two UL BWPs may be supported by a wireless device for a BWP adaption. The total number of BWPs supported by a wireless device may be given by 2≤number of DL/UL BWP≤floor (network maximum BW/wireless device minimum DL/UL BW), where floor(x) may be a floor function that returns the greatest integer being less than or equal to x. For example, a maximum number of configured BWPs may be four for DL and UL, respectively, or a maximum number of configured BWPs for UL may be two. Any other number of BWPs, for example, greater than or equal to 2 and less than or equal to a floor, may be supported by a wireless device.

Different sets of BWPs may be configured for different DCI formats and/or scheduling types, respectively. BWPs may be configured for non-slot-based scheduling (e.g., for larger BWPs) or for slot-based scheduling (e.g., for smaller BWPs). If different DCI formats are defined for slot-based scheduling and non-slot-based scheduling, different BWPs may be configured for different DCI formats. Different BWP configurations may provide flexibility between different scheduling types without increasing DCI overhead. A 2-bit field may be used to indicate a BWP among four BWPs for a DCI format. For example, four DL BWPs or two or four UL BWPs may be configured for each DCI format. The same or different BWPs may be configured for different DCI formats.

A required maximum number of configured BWPs (which may exclude the initial BWP) may depend on the flexibility needed for a BWP functionality. It may be sufficient to be able to configure one DL BWP and one UL BWP (or a single DL/UL BWP pair for an unpaired spectrum), which may correspond to minimal support of bandlimited devices. There may be a need to configure at least two DL BWPs and at least a single uplink BWP for a paired spectrum (or two DL/UL BWP pairs for an unpaired spectrum), such as to support bandwidth adaptation. There may be a need to configure one or more DL (or UL) BWPs that jointly cover different parts of the downlink (or uplink) carrier, such as to support dynamic load balancing between different parts of the spectrum. Two BWPs may be sufficient, for example, for dynamic load balancing. In addition to the two bandwidth parts, two other bandwidth parts may be needed, such as for bandwidth adaptation. A maximum number of configured BWPs may be four DL BWPs and two UL BWPs for a paired spectrum. A maximum number of configured BWPs may be four DL/UL BWP pairs for an unpaired spectrum.

A wireless device may monitor for RMSI and broadcasted OSI, which may be transmitted by a base station within a common search space (CSS) on the PCell. RACH response and paging control monitoring on the PCell may be transmitted within the CSS. A wireless device may not monitor the common search space, for example, if the wireless device is allowed to be on an active BWP configured with a wireless device-specific search space (USSS or USS).

At least one of configured DL bandwidth parts may comprise at least one CORESET with a CSS type, such as for a PCell. To monitor RMSI and broadcast OSI, the wireless device may periodically switch to the BWP containing the CSS. The wireless device may periodically switch to the BWP containing the CSS for RACH response and paging control monitoring on the PCell.

BWP switching to monitor the CSS may result in increasing overhead, for example, if the BWP switching occurs frequently. The overhead due to the CSS monitoring may depend on an overlapping in frequency between any two BWPs. In a nested BWP configuration (e.g., where one BWP may be a subset of another BWP), the same CORESET configuration may be used across the BWPs. A default BWP may comprise the CSS, and another BWP may comprise the CSS, for example, if the default BWP is a subset of another BWP. The BWPs may be partially overlapping. A CSS may be across a first BWP and a second BWP, for example, if the overlapping region is sufficient. Two non-overlapping BWP configurations may exist.

There may be one or more benefits from configuring the same CORESET containing the CSS across BWPs. For example, the RMSI and broadcast OSI monitoring may be performed without necessitating BWP switching, RACH response and paging control monitoring on the PCell may be performed without switching, and/or robustness for BWP switching may improve. A base station and a wireless device may be out-of-sync as to which BWP is currently active and the DL control channel may still work, for example, if CORESET configuration is the same across BWPs. One or more constraints on BWP configuration may be acceptable. A BWP may provide power saving, such that various configurations, including a nested configuration, may be very versatile for different applications. For BWP configurations that are non-overlapping in frequency, a wireless device may not have specific requirements to monitor RMSI and broadcast OSI in the CSS.

Group-common search space (GCSS) may be supported (e.g., in NR). The GCSS may be used in addition to or as an alternative to CSS for certain information. A base station may configure GCSS within a BWP for a wireless device. Information such as RACH response and paging control may be transmitted on GCSS. The wireless device may monitor GCSS, for example, instead of switching to the BWP containing the CSS for such information. A base station may transmit information on GCSS, for example, for a pre-emption indication and other group-based commands on a serving cell. A wireless device may monitor the GCSS for the information, including for example, for the SCell which may not have CSS.

A CORESET may be configured without using a BWP. The CORESET may be configured based on a BWP, which may reduce signaling overhead. A first CORESET for a wireless device during an initial access may be configured based on a default BWP. A CORESET for monitoring PDCCH for RAR and paging may be configured based on a DL BWP. The CORESET for monitoring group common (GC)-PDCCH for SFI may be configured based on a DL BWP. The CORESET for monitoring GC-DCI for a pre-emption indication may be configured based on a DL BWP. A BWP index may be indicated in the CORESET configuration. A default BWP index may not be indicated in the CORESET configuration.

A contention-based random access (CBRA) RACH procedure may be supported via an initial active DL BWP and/or an initial active UL BWP, for example, if the wireless device identity is unknown to the base station. The contention-free random access (CFRA) RACH procedure may be supported via the USS configured in an active DL BWP for the wireless device. An additional CSS for RACH purposes may not need to be configured per BWP, such as for the CFRA RACH procedure supported via the USS configured in an active DL BWP for the wireless device. Idle mode paging may be supported via an initial active DL BWP. Connected mode paging may be supported via a default BWP. No additional configurations for the BWP for paging purposes may be needed for paging. A configured BWP (e.g., on a serving cell) may have the CSS configured for monitoring pre-emption indications for a pre-emption.

A group-common search space may be associated with at least one CORESET configured for the same DL BWP (e.g., for a configured DL BWP). The wireless device may or may not autonomously switch to a default BWP (e.g., where a group-common search space may be available) to monitor for a DCI, for example, depending on the monitoring periodicity of different group-common control information types. A group-common search space may be configured in the same CORESET, for example, if there is at least one CORESET configured on a DL BWP.

A center frequency of an activated DL BWP may or may not be changed. If the center frequency of the activated DL BWP and the deactivated DL BWP is not aligned, the active UL BWP may be switched implicitly (e.g., for TDD).

BWPs with different numerologies may be overlapped. Rate matching for CSI-RS and/or SRS of another BWP in the overlapped region may be performed, which may achieve dynamic resource allocation of different numerologies in a FDM and/or a TDM manner. For a CSI measurement within one BWP, if the CSI-RS and/or SRS collides with data and/or an RS in another BWP, the collision region in another BWP may be rate matched. CSI information over the two or more BWPs may be determined by a base station based on wireless device reporting. Dynamic resource allocation with different numerologies in a FDM manner may be achieved by base station scheduling.

PUCCH resources may be configured in a configured UL BWP, in a default UL BWP, and/or in both a configured UL BWP and a default UL BWP. If the PUCCH resources are configured in the default UL BWP, a wireless device may retune to the default UL BWP for transmitting an SR. The PUCCH resources may be configured per a default BWP or per a BWP other than the default BWP. The wireless device may transmit an SR in the current active BWP without retuning. If a configured SCell is activated for a wireless device, a DL BWP may be associated with an UL BWP at least for the purpose of PUCCH transmission, and/or a default DL BWP may be activated. If the wireless device is configured for UL transmission in the same serving cell, a default UL BWP may be activated.

At least one of configured DL BWPs may comprise one CORESET with common search space (CSS), for example, at least in a primary component carrier. The CSS may be needed at least for RACH response (e.g., a msg2) and/or a pre-emption indication. One or more of configured DL bandwidth parts for a PCell may comprise a CORESET with the CSS type for RMSI and/or OSI, for example, if there is no periodic gap for RACH response monitoring on the PCell. A configured DL bandwidth part for a PCell may comprise one CORESET with the CSS type for RACH response and paging control for a system information update. A configured DL bandwidth part for a serving cell may comprise a CORESET with the CSS type for a pre-emption indication and/or other group-based commands. One or more of configured DL bandwidth parts for a PCell may comprise a CORESET with a CSS type for RMSI, OSI, and/or RACH response and paging control for a system information update, for example, if a periodic gap for RAHC response monitoring is present on the PCell. A configured DL bandwidth part for a serving cell may comprise a CORESET with a CSS type for a pre-emption indication and/or other group-based commands.

BWPs may be configured with respect to common reference point (e.g., PRB 0) on a component carrier. The BWPs may be configured using TYPE1 RA as a set of contiguous PRBs, with PRB granularity for the START and LENGTH. The minimum length may be determined by the minimum supported size of a CORESET. A CSS may be configured on a non-initial BWP, such as for RAR and paging.

To monitor common channel or group common channel for a connected wireless device (e.g., RRC CONNECTED UE), an initial DL BWP may comprise a control channel for RMSI, OSI, and/or paging. The wireless device may switch a BWP to monitor such a control channel. A configured DL BWP may comprise a control channel (e.g., for a Msg2). A configured DL BWP may comprise a control channel for a SFI. A configured DL BWP may comprise a pre-emption indication and/or other group common indicators such as for power control.

A DCI may explicitly indicate activation and/or deactivation of a BWP. A DCI without data assignment may comprise an indication to activate and/or deactivate BWP. A wireless device may receive a first indication via a first DCI to activate and/or deactivate a BWP. A second DCI with a data assignment may be transmitted by the base station, for example, for a wireless device to start receiving data. The wireless device may receive the first DCI in a target CORESET within a target BWP. A base station scheduler may make conservative scheduling decisions, for example, until the base station receives CSI feedback.

A DCI without scheduling for active BWP switching may be transmitted, for example, to measure the CSI before scheduling. A DCI with scheduling for active BWP switching may comprise setting the resource allocation field to zero, such that no data may be scheduled. Other fields in the DCI may comprise one or more CSI and/or SRS request fields.

Single scheduling a DCI to trigger active BWP switching may provide dynamic BWP adaptation for wireless device power saving during active state. Wireless device power saving during active state may occur for an ON duration, and/or if an inactivity timer is running and/or if C-DRX is configured. A wireless device may consume a significant amount of power monitoring PDCCH, without decoding any grant, for example if a C-DRX is enabled. To reduce the power consumption during PDCCH monitoring, two BWPs may be configured: a narrower BWP for PDCCH monitoring, and a wider BWP for scheduled data. The wireless device may switch back-and-forth between the narrower BWP and the wider BWP, depending on the burstiness of the traffic. The wireless device may revisit a BWP that it has previously used. Combining a BWP switching indication and a scheduling grant may provide an advantage of low latency and/or reduced signaling overhead for BWP switching.

An SCell activation and/or deactivation may or may not trigger a corresponding action for its configured BWP. A dedicated BWP activation and/or deactivation DCI may impact a DCI format. A scheduling DCI with a dummy grant may be used. The dummy grant may be constructed by invalidating one or some of the fields, such as the resource allocation field. A fallback scheduling DCI format (which may contain a smaller payload) may be used, which may improve the robustness for BWP DCI signaling without incurring extra work by introducing a new DCI format.

A DCI with data assignment may comprise an indication to activate and/or deactivate a BWP along with a data assignment. A wireless device may receive a combined data allocation and BWP activation and/or deactivation message. A DCI format may comprise a field to indicate BWP activation and/or deactivation and/or a field indicating an UL grant and/or a DL grant. The wireless device may start receiving data with a single DCI, such as the DCI format described above. The DCI may indicate one or more target resources of a target BWP. A base station scheduler may have insufficient information about the CSI in the target BW and may make conservative scheduling decisions.

The DCI may be transmitted on a current active BWP, and scheduling information may be for a new BWP, for example, for the DCI with data assignment. There may be a single active BWP. There may be one DCI in a slot for scheduling the current BWP or scheduling another BWP. The same CORESET may be used for the DCI scheduling of the current BWP and the DCI scheduling of another BWP. The DCI payload size for the DCI scheduling current BWP and the scheduling DCI for BWP switching may be the same, which may reduce the number of blind decoding attempts.

A BWP group may be configured by a base station, in which a numerology in one group may be the same, which may support using the scheduling DCI for BWP switching. The BWP switching for the BWP group may be configured, such that BIF may be present in the CORESETs for one or more BWPs in the group. Scheduling DCI for BWP switching may be configured per BWP group, in which an active BWP in the group may be switched to any other BWP in the group.

A DCI comprising a scheduling assignment and/or grant may not comprise an active-BWP indicator. A scheduling DCI may switch a wireless devices active BWP to the transmission direction for which the scheduling is valid (e.g., for a paired spectrum). A scheduling DCI may switch the wireless devices active DL/UL BWP pair regardless of the transmission direction for which the scheduling is valid (e.g., for an unpaired spectrum). A downlink scheduling assignment and/or grant with no assignment may occur, which may allow for a switching of an active BWP without scheduling downlink and/or uplink transmissions.

A timer-based activation and/or deactivation BWP may be supported. A timer for activation and/or deactivation of DL BWP may reduce signaling overhead and may allow wireless device power savings. The activation and/or deactivation of a DL BWP may be based on an inactivity timer, which may be referred to as a BWP inactive (or inactivity) timer. A wireless device may start and/or reset a timer upon reception of a DCI. The timer may expire, for example, if the wireless device is not scheduled for the duration of the timer. The wireless device may activate and/or deactivate the appropriate BWP based on the expiry of the timer. The wireless device may, for example, activate the default BWP and/or deactivate the source BWP.

A BWP inactive timer may be beneficial for power saving for a wireless device. A wireless device may reduce power, for example, by switching to a default BWP with a smaller bandwidth. A wireless device may use a BWP inactive timer, for example, for a fallback if missing a DCI based activation and/or deactivation signaling, such as by switching from one BWP to another BWP. Triggering conditions of the BWP inactive timer may follow triggering conditions for the DRX timer in LTE or any other system. An on-duration of the BWP inactive timer may be configured and/or the timer may start, for example, if a wireless device-specific PDCCH is successfully decoded indicating a new transmission during the on-duration. The timer may restart, for example, if a wireless device-specific PDCCH is successfully decoded indicating a new transmission. The timer may stop, for example, if the wireless device is scheduled to switch to the default DL BWP. The BWP inactive timer may start, for example, if the wireless device switches to a new DL BWP. The timer may restart, for example, if a wireless device-specific PDCCH is successfully decoded, wherein the wireless device-specific PDCCH may be associated with a new transmission, a retransmission, SPS activation and/or deactivation, or another purpose.

A wireless device may switch to a default BWP, for example, if the wireless device does not receive any control and/or data from the network during the running of the BWP inactive timer. The timer may be reset, for example, upon reception of any control and/or data. The timer may be triggered, for example, if wireless device receives a DCI to switch its active DL BWP from the default BWP to another BWP. The timer may be reset, for example, if a wireless device receives a DCI to schedule PDSCH(s) in the BWP other than the default BWP.

A DL BWP inactive timer may be defined separately from a UL BWP inactive timer. Timers for the DL BWP and UL BWP may be set independently and/or jointly. For the separate timers (e.g., if there is DL data and UL timer expires), UL BWP may not be deactivated since PUCCH configuration may be affected if both DL BWP and UL BWP are activated. For the uplink, if there is UL feedback signal related to DL transmission, the timer may be reset. The UL timer may not be set if there is DL data. If there is UL data and the DL timer expires, there may be no issue if the DL BWP is deactivated since UL grant is transmitted in the default DL BWP. A BWP inactivity-timer may allow fallback to default BWP on a PCell and/or SCell.

A timer-based activation and/or deactivation of BWP may be similar to a wireless device DRX timer. There may not be a separate inactivity timer for BWP activation and/or deactivation for the wireless device DRX timer. A wireless device DRX inactivity timer may trigger BWP activation and/or deactivation. There may be separate inactivity timers for BWP activation and/or deactivation for the wireless device DRX timer. For example, the DRX timers may be defined in a MAC layer, and the BWP timer may be defined in a physical layer. A wireless device may stay in a wider BWP for as long as the inactivity timer is running, for example, if the same DRX inactivity timer is used for BWP activation and/or deactivation. The DRX inactivity timer may be set to a large value of 100-200 milliseconds for a C-DRX cycle of 320 milliseconds, which may be larger than the ON duration (e.g., 10 milliseconds). Setting the DRX inactivity timer in the above manner may provide power savings, for example, based on a narrower BWP not being achievable. To realize wireless device power saving promised by BWP switching, a new timer may be defined and it may be configured to be smaller than the DRX inactivity timer. From the point of view of DRX operation, BWP switching may allow wireless device to operate at different power levels during the active state, effectively providing intermediate operating points between the ON and OFF states.

With a DCI explicit activation and/or deactivation of BWP, a wireless device and a base station may not be synchronized with respect to which BWP is activated and/or deactivated. The base station scheduler may not have CSI information related to a target BWP for channel-sensitive scheduling. The base station may be limited to conservative scheduling for one or more first several scheduling occasions. The base station may rely on periodic or aperiodic CSI-RS and associated CQI report(s) to perform channel-sensitive scheduling. Relying on periodic or aperiodic CSI-RS and associated CQI report(s) may delay channel-sensitive scheduling and/or lead to signaling overhead, such as if aperiodic CQI is requested. To mitigate a delay in acquiring synchronization and channel state information, a wireless device may transmit an acknowledgement upon receiving an activation and/or deactivation of a BWP. A CSI report based on the provided CSI-RS resource may be transmitted after activation of a BWP and may be used as acknowledgment of activation and/or deactivation.

A base station may provide a sounding reference signal for a target BWP after a wireless device tunes to a new BWP. The wireless device may report the CSI, which may be used as an acknowledgement by the base station to confirm that the wireless device receives an explicit DCI command and activates and/or deactivates the appropriate BWPs. For an explicit activation and/or deactivation via DCI with data assignment, a first data assignment may be carried out without a CSI for the target BWP.

A guard period may be defined to take RF retuning and related operations into account. A wireless device may neither transmit nor receive signals in the guard period. A base station may need to know the length of the guard period. For example, the length of the guard period may be reported to the base station as a wireless device capability. The length of the guard period may be based on the numerologies of the BWPs and the length of the slot. The length of the guard period for RF retuning may be reported as a wireless device capability. The wireless device may report the guard period as an absolute time and/or in symbols.

The base station may maintain the time domain position of guard period in alignment between the base station and the wireless device, for example, if the base station knows the length of the guard period. The guard period for RF retuning may be predefined for time pattern triggered BWP switching. The BWP switching and/or guard period may be triggered by DCI and/or a timer. For BWP switching following a time pattern, the position of the guard period may be defined. The guard period may not affect the symbols carrying CSS, for example, if the wireless device is configured to switch periodically to a default BWP for CSS monitoring.

A single DCI may switch the wireless device's active BWP from one to another within a given serving cell. The active BWP may be switched to a second BWP of the same link direction, for example an UL BWP or a DL BWP. A separate field may be used in the scheduling DCI to indicate the index of the BWP for activation such that wireless device may determine the current DL/UL BWP according to a detected DL/UL grant without requiring any other control information. The multiple scheduling DCIs transmitted in this duration may comprise the indication to the same BWP, for example, if the BWP change does not happen during a certain time duration. During the transit time wherein potential ambiguity may happen, base station may send scheduling grants in the current BWP or together in the other BWPs containing the same target BWP index, such that wireless device may obtain the target BWP index by detecting the scheduling DCI in either one of the BWPs. The duplicated scheduling DCI may be transmitted an arbitrary number of times (e.g., K) times. A wireless device may switch to the target BWP and start to receive or transmit (UL) in the target BWP according to the BWP indication field, for example, if the wireless device receives one of the K times transmissions.

Switching between BWPs may introduce time gaps, for example, if wireless device is unable to receive one or more messages due to re-tuning. Breaks of several time slots may severely affect the TCP ramp up as the wireless device may not be able to transmit and receive during those slots, affecting obtained RTT and data rate. A break in reception may make wireless device out of reach from network point of view reducing network interest to utilize short inactivity timer. If BWP switching takes significant time and a wireless device requires new reference symbols to update AGC, channel estimation, etc., active BWP switching may not be adopted in the wireless device. In some configurations, BWP switching may be performed where the BWP center frequency remains the same if switching between BWPs.

A frequency location of a wireless device's RF bandwidth may be indicated by base station. The RF bandwidth of the wireless device may be smaller than the carrier bandwidth for considering the wireless device RF bandwidth capability. The supported RF bandwidth for a wireless device is usually a set of discrete values (e.g., 10 MHz, 20 MHz, 50 MHz, etc.). For energy saving purpose, the wireless device RF bandwidth may be determined as the minimum available bandwidth supporting the bandwidth of the BWP. The granularity of BWP bandwidth may be PRB level, which may be decoupled with wireless device RF bandwidth. As a result, the wireless device RF bandwidth may be larger than the BWP bandwidth. The wireless device may receive signals outside the carrier bandwidth, especially if the configured BWP is configured near the edge of the carrier bandwidth. Inter-system interference or the interference from an adjacent cell outside the carrier bandwidth may affect the receiving performance of the BWP. To keep the wireless device RF bandwidth in the carrier bandwidth, the frequency location of the wireless device RF bandwidth may be indicated by base station.

A gap duration may be determined based on a measurement duration and a retuning gap. The retuning gap may vary. If a wireless device does not need to switch its center, the retuning may be relatively short, such as 20 µs. A wireless device may indicate the necessary retuning gap for a measurement configuration, for example, if the network may not know whether the wireless device needs to switch its center or not to perform measurement. The returning gap may depend on the current active BWP that may be dynamically switched via switching mechanism. Wireless devices may need to indicate the returning gap dynamically.

The measurement gap may be indirectly created, for example, if the network may configure a certain measurement gap. The measurement gap may comprise the smallest retuning latency. The smallest returning latency may be determined, for example, if a small retuning gap may be utilized and/or if both measurement bandwidth and active BWP is included within the wireless device maximum RF capability and the center frequency of the current active BWP may be not changed. The wireless device may skip receiving and/or transmitting, for example, if a wireless device needs more gap than the configured.

A different measurement gap and retuning gap may be utilized for RRM and CSI. For CSI measurement, if periodic CSI measurement outside of active BWP may be configured, a wireless device may need to perform its measurement periodically per measurement configuration. For RRM, it may be up to wireless device implementation where to perform the measurement as long as it satisfies the measurement requirements. The worst case retuning latency for a measurement may be used. As the retuning latency may be different between intra-band and inter-band retuning, separate measurement gap configurations between intra-band and inter-band measurement may be considered.

A respective DCI format may comprise an explicit identifier to distinguish them, for example, for multiple DCI formats with the same DCI size of a same RNTI. The same DCI size may come from zero-padding bits in at least a wireless device-specific search space.

In BWP switching, a DCI in the current BWP may need to indicate resource allocation in the next BWP that the wireless device may be expected to switch. The resource allocation may be based on the wireless device-specific PRB indexing, which may be per BWP. A range of the PRB indices may change as the BWP changes. The DCI to be transmitted in the current BWP may be based on the PRB indexing for the current BWP. The DCI may need to indicate the RA in the new BWP, which may cause a resource conflict. To resolve the conflict without significantly increasing wireless devices blind detection overhead, the DCI size and bit fields may not change per BWP for a given DCI type.

As the range of the PRB indices may change as the BWP changes, one or more employed bits among the total bit field for RA may be dependent on the employed BWP. A wireless device may use the indicated BWP ID that the resource allocation may be intended to identify the resource allocation bit field.

The DCI size of the BWP may be based on a normal DCI detection without BWP retuning and/or on a DCI detection during the BWP retuning. A DCI format may be independent of the BW of the active DL/UL BWP, which may be called as fallback DCI. At least one of DCI format for DL may be configured to have the same size for a wireless device for one or more configured DL BWPs of a serving cell. At least one of the DCI formats for UL may be configured to have the same size for a wireless device for one or more configured UL BWPs of a serving cell. A BWP-dependent DCI format may be monitored at the same time (e.g. a normal DCI) for both active DL BWP and active UL BWP. A wireless device may monitor both DCI formats at the same time. A base station may assign the fallback DCI format to avoid ambiguity during a transition period in the BWP activation and/or deactivation.

If a wireless device is configured with multiple DL or UL BWPs in a serving cell, an inactive DL and/or UL BWP may be activated by a DCI scheduling a DL assignment or UL grant in the BWP. As the wireless device may be monitoring the PDCCH on the currently active DL BWP, the DCI may comprise an indication to a target BWP that the wireless device may switch to for PDSCH reception or UL transmission. A BWP indication may be inserted in the wireless device-specific DCI format. The bit width of this field may depend on the maximum possible and/or presently configured number of DL and/or UL BWPs. The BWP indication field may be a fixed size based on the maximum number of configured BWPs.

A DCI format size may match the BW of the BWP in which the PDCCH may be received. To avoid an increase in the number of blind decodes, the wireless device may identify the RA field based on the scheduled BWP. For a transition from a small BWP to a larger BWP, the wireless device may identify the RA field as being the LSBs of the required RA field for scheduling the larger BWP.

The same DCI size for scheduling different BWPs may be defied by keeping the same size of resource allocation fields for one or more configured BWPs. A base station may be aware of a wireless device switching BWPs based on a reception of ACK/NACK from the wireless device. The base station may not be aware of a wireless device switching BWPs, for example, if the base station does not receive at least one response from the wireless device. To avoid such a mismatch between base station and wireless device, a fallback mechanism may be used. The base station may transmit the scheduling DCI for previous BWPs and for newly activated BWP since the wireless device may receive the DCI on either BWP, for example, if there is no response from the wireless device. The base station may confirm the completion of the active BWP switching, for example, after or in response to the base station receiving a response from the wireless device. The base station may not transmit multiple DCIs, for example, if the same DCI size for scheduling different BWPs may be considered and CORESET configuration may be the same for different BWPs. DCI format(s) may be configured user-specifically per cell rather than per BWP. The wireless device may start to monitor pre-configured search-space on the CORESET, for example, if a wireless device synchronizes to a new BWP.

The size of DCI format in different BWPs may vary and may change at least due to different size of RA bitmap on different BWPs. The size of DCI format configured in a cell for a wireless device may be dependent on scheduled BWPs. If the DCI formats may be configured per cell, the corresponding header size in DCI may be relatively small.

The monitored DCI format size on a search-space of a CORESET may be configurable with sufficiently fine granularity and/or the granularity may be predefined. The monitored DCI format size with sufficient granularity may be beneficial, for example, if a base station may freely set the monitoring DCI format size on the search-spaces of a CORESET. The DCI format size may be set such that it may accommodate the largest actual DCI format size variant among one or more BWPs configured in a serving cell.

For a wireless device-specific serving cell, one or more DL BWPs and one or more UL BWPs may be configured by a dedicated RRC for a wireless device. This may be done as part of the RRC connection establishment procedure for a PCell. For an SCell, this may be done via RRC configuration indicating the SCell parameters.

A default DL and/or a default UL BWP may be activated since there may be at least one DL and/or UL BWP that may be monitored by the wireless device depending on the properties of the SCell (DL only, UL only, or both), for example, if a wireless device receives an SCell activation command. The BWP may be activated upon receiving an SCell activation command. The BWP may be informed to the wireless device via the RRC configuration that configured the BWP on this serving cell. For an SCell, RRC signaling for SCell configuration/reconfiguration may be used to indicate which DL BWP and/or UL BWP may be activated if the SCell activation command is received by the wireless device. The indicated BWP may be the initially active DL and/or UL BWP on the SCell. The SCell activation command may activate DL and/or UL BWP.

For an SCell, RRC signaling for the SCell configuration/reconfiguration may be used for indicating a default DL BWP on the SCell. The default DL BWP may be used for fallback purposes. The default DL BWP may be same or different from the initially activated DL and/or UL BWP indicated to wireless device as part of the SCell configuration. A default UL BWP may be configured to a wireless device for transmitting PUCCH for SR, for example, if the PUCCH resources are not configured in every BWP for SR.

An SCell may be for DL only. For a DL only SCell, a wireless device may keep monitoring an initial DL BWP (e.g., initial active or default) until the wireless device receives SCell deactivation command. An SCell may be for UL only. For the UL only SCell, the wireless device may transmit on the indicated UL BWP, for example, if a wireless device receives a grant. The wireless device may not maintain an active UL BWP if wireless device does not receive a grant. A failure to maintain the active UL BWP due to a grant not being received may not deactivate the SCell. An SCell may be for UL and DL. For a UL and DL SCell, a wireless device may keep monitoring an initial DL BWP (e.g., initial active or default) until the wireless device receives an SCell deactivation command. The UL BWP may be used if there may be a relevant grant or an SR transmission.

A BWP deactivation may not result in a SCell deactivation. The active DL and/or UL BWPs may be considered deactivated, for example, if the wireless device receives the SCell deactivation command.

A wireless device may be expected to perform RACH procedure on an SCell during activation. Activation of UL BWP may be needed for the RACH procedure. At an SCell activation, DL only (only active DL BWP) and/or DL/UL (both DL/UL active BWP) may be configured. A wireless device may select default UL BWP based on measurement or the network configures which one in its activation.

One or more BWPs may be semi-statically configured via wireless device-specific RRC signaling. If a wireless device maintains RRC connection with a primary component carrier (CC), the BWP in a secondary CC may be configured via RRC signaling in the primary CC. One or more BWPs may be semi-statically configured to a wireless device via RRC signaling in a PCell. A DCI transmitted in an SCell may indicate a BWP among the one or more configured BWP and grant detailed resource based on the indicated BWP. For cross-CC scheduling, a DCI transmitted in a PCell may indicate a BWP among the one or more configured BWPs, and grants detailed resource based on the indicated BWP.

A DL BWP may be initially activated for configuring CORESET for monitoring the first PDCCH in the SCell, for example, if an SCell may be activated. The DL BWP may serve as a default DL BWP in the SCell. For the wireless device performing initial access via a SS block in PCell, the default DL BWP in an SCell may not be derived from SS block for initial access. The default DL BWP in an SCell may be configured by RRC signaling in the PCell.

An indication indicating which DL BWP and/or which UL BWP are active may be in the RRC signaling for SCell configuration and/or reconfiguration, for example, if an SCell is activated. The RRC signaling for SCell configuration/reconfiguration may be used for indicating which DL BWP and/or which UL BWP are initially activated if the SCell may be activated. An indication indicating which DL BWP and/or which UL BWP are active may be in the SCell activation signaling, for example, if an SCell is activated. SCell activation signaling may be used for indicating which DL BWP and/or which UL BWP are initially activated if the SCell may be activated.

For PCells and SCells, initial default BWPs for DL and UL (e.g., for RMSI reception and PRACH transmission) may be valid until at least one BWP is configured for the DL and UL via RRC wireless device-specific signaling respectively. The initial default DL/UL bandwidth parts may become invalid and new default DL/UL bandwidth parts may take effect. The SCell configuration may comprise default DL/UL bandwidth parts.

An initial BWP on a PCell may be defined by a master information block (MIB). An initial BWP and default BWP may be separately configurable for the SCell. An initial BWP may be the widest configured BWP of the SCell. A wireless device may retune to a default BWP that may be the narrow BWP. The SCell may be active and may be ready to be opened if an additional data burst arrives.

A BWP on SCell may be activated by means of cross-cell scheduling DCI. The cross-cell scheduling may be configured for a wireless device. The base station may activate a BWP on the SCell by indicating CIF and BWPI in the scheduling DCI.

A wireless device and/or base station may perform synchronization tracking within an active DL BWP without a SS block. A tracking reference signal (TRS) and/or the DL BWP configuration may be configured. A DL BWP with a SS block or TRS may be configured as a reference for synchronization tracking.

SS-block based RRM measurements may be decoupled within the BWP framework. Measurement configurations for each RRM and CSI feedback may be independently configured from the BWP configurations. CSI and SRS measurements/transmissions may be performed within the BWP framework.

For a modulation coding scheme (MCS) assignment of the first one or more DL data packets after active DL BWP switching, the network may assign robust MCS to a wireless device for the first one or more DL data packets based on RRM measurement reporting. For a MCS assignment of the first one or more DL data packets after active DL BWP switching, the network may signal to a wireless device by active DL BWP switching DCI to trigger aperiodic CSI measurement/reporting to speed up link adaptation convergence. For a wireless device, periodic CSI measurement outside the active BWP in a serving cell may not supported. For a wireless device, RRM measurement outside active BWP in a serving cell may be supported. For a wireless device, RRM measurement outside configured BWPs in a serving cell may be supported. RRM measurements may be performed on a SSB and/or CSI-RS. The RRM/RLM measurements may be independent of BWPs.

A wireless device may not be configured with aperiodic CSI reports for non-active DL BWPs. The CSI measurement may be obtained after the BW opening and the wide-band CQI of the previous BWP may be used as starting point for the other BWP on the component carrier.

A wireless device may perform CSI measurements on the BWP before scheduling. Before scheduling on a new BWP, a base station may intend to find the channel quality on the potential new BWPs before scheduling the user on that BWP. The wireless device may switch to a different BWP and measure channel quality on the BWP and then transmit the CSI report. There may be no scheduling needed.

Resource allocation for data transmission for a wireless device not capable of supporting the carrier bandwidth may be derived based on a two-step frequency-domain assignment process. A first step may indicate a bandwidth part, and a second step may indicate one or more physical resource blocks (PRBs) within the bandwidth part.

One or multiple bandwidth part configurations for each component carrier may be semi-statically signaled to a wireless device. A BWP may comprise a group of contiguous PRBs, wherein one or more reserved resources may be configured within the bandwidth part. The bandwidth of a bandwidth part may be equal to or be smaller than the maximal bandwidth capability supported by a wireless device. The bandwidth of a bandwidth part may be at least as large as the SS block bandwidth. The bandwidth part may or may not contain the SS block. The configuration of a BWP may comprise at least one of following properties: Numerology, Frequency location (e.g. center frequency), or Bandwidth (e.g. number of PRBs).

A bandwidth part may be associated with one or more numerologies, wherein the one or more numerologies may comprise sub-carrier spacing, CP type, and/or slot duration indicators. A wireless device may expect at least one DL BWP and at least one UL BWP being active among a set of configured BWPs for a given time. A wireless device may receive/transmit within active DL/UL bandwidth part(s) using the associated numerology, for example, at least PDSCH and/or PDCCH for DL and PUCCH and/or PUSCH for UL, or a combination thereof.

Multiple BWPs with same or different numerologies may be active for a wireless device simultaneously. The active multiple bandwidth parts may not imply that it may be required for wireless device to support different numerologies at the same instance. The active DL/UL bandwidth part may not span a frequency range larger than the DL/UL bandwidth capability of the wireless device in a component carrier.

A wireless network may support single and multiple SS block transmissions in wideband CC in the frequency domain. For non-CA wireless device with a smaller BW capability and potentially for CA wireless devices, a wireless network may support a measurement gap for RRM measurement and other purposes (e.g., path loss measurement for UL power control) using SS blocks. There may be no SS blocks in the active BWPs. A wireless device may be notified of the presence/parameters of the SS block(s) and parameters necessary for RRM measurement via at least one of following: RMSI, other system information, and/or RRC signaling A maximum bandwidth for CORESET for RMSI scheduling and PDSCH carrying RMSI may be equal to or smaller than a DL bandwidth of a wireless network that one or more wireless devices may support in a frequency range. For at least for one RACH preamble format, the bandwidth may be equal to or smaller than a UL bandwidth of a wireless network that one or more wireless devices may support in a frequency range. Other RACH preamble formats with larger bandwidth than a certain bandwidth of the wireless network that one or more wireless devices may support.

CORESET for RMSI scheduling and PDSCH for RMSI may be confined within the BW of one PBCH. CORESET for RMSI scheduling may be confined within the BW of one PBCH and PDSCH for RMSI may not be confined within the BW of one PBCH. CORESET for RMSI scheduling and PDSCH for RMSI may not be confined within the BW of one PBCH.

There may be one active DL BWP for a given time instant. A configuration of a DL bandwidth part may comprise at least one CORESET. PDSCH and corresponding PDCCH (PDCCH carrying scheduling assignment for the PDSCH) may be transmitted within the same BWP if PDSCH transmission starts no later than an arbitrary number (K) symbols after the end of the PDCCH transmission. PDCCH and PDSCH may be transmitted in different BWPs, for example, if PDSCH transmission starting more than K symbols after the end of the corresponding PDCCH. The value of K may depend on at least numerology or reported wireless device retuning time. For the indication of active DL/UL bandwidth part(s) to a wireless device, DCI (directly and/or indirectly), MAC CE, Time pattern (e.g. DRX like) and/or combinations thereof may be considered.

A wireless network may support switching between partial bands for SRS transmissions in a CC. The RF retuning requirement for partial band switching may be considered, for example, if a wireless device is not capable of simultaneous transmission in partial bands in a CC. The partial band may indicate a bandwidth part.

Common PRB indexing may be used at least for DL BWP configuration in RRC connected state. A reference point may be PRB 0, which may be common to one or more wireless devices sharing a wideband CC from network perspective, regardless of the wireless devices being NB, CA, or WB wireless devices. An offset from PRB 0 to the lowest PRB of the SS block accessed by a wireless device may be configured by high layer signaling, for example, via RMSI and/or wireless device-specific signaling. A common PRB indexing may be for maximum number of PRBs for a given numerology, wherein the common PRB indexing may be for RS generation for wireless device-specific PDSCH and/or may be for UL.

There may be an initial active DL/UL bandwidth part pair for a wireless device until the wireless device is explicitly configured and/or reconfigured with one or more BWPs during or after a RRC connection may be established. The initial active DL/UL bandwidth part may be confined within the wireless device minimum bandwidth for a given frequency band. A wireless network may support activation and/or deactivation of DL and UL BWP by explicit indication. A MAC CE-based approach may be used for the activation and/or deactivation of DL and UL BWP. A wireless network may support an activation and/or deactivation of DL bandwidth part by means of timer for a wireless device to switch its active DL bandwidth part to a default DL bandwidth part. A default DL bandwidth part may be the initial active DL bandwidth part defined above. The default DL bandwidth part may be reconfigured by the network.

A measurement or transmission SRS outside of the active BWP for a wireless device may constitute a measurement gap. The wireless device may not monitor CORESET during the measurement gap.

A SRS transmission in an active UL BWP may use the same numerology as configured for the BWP. A wireless network may support wireless device specific configured bandwidth based on tree-like SRS bandwidth sets. Parameters used for configuring bandwidth allocation, such as CSRS and BSRS, may be reused in a wireless device specific manner. A wireless network may support to sound substantially all UL PRBs in a BWP.

Frequency hopping for a PUCCH may occur within an active UL BWP for the wireless device. There may be multiple active BWPs, and the active BWP may refer to BWP associated with the numerology of PUCCH For paired spectrum, a base station may configure DL and UL BWPs separately and independently for a wireless device-specific serving cell for a wireless device. For active BWP switching using at least scheduling DCI, a DCI for DL may be used for DL active BWP switching and a DCI for UL may be used for UL active BWP switching. A wireless network may support a single DCI switching DL and UL BWP jointly.

For unpaired spectrum, a base station may jointly configure a DL BWP and an UL BWP as a pair. The DL and UL BWPs of a DL/UL BWP pair may share the same center frequency but may be of different bandwidths for a wireless device-specific serving cell for a wireless device. For active BWP switching using at least scheduling DCI, a DCI for either DL or UL may be used for switching from one DL/UL BWP pair to another pair, particularly where both DL and UL are activated to a wireless device in the corresponding unpaired spectrum. There may not be a restriction on DL BWP and UL BWP pairing. For a wireless device, a configured DL (or UL) BWP may overlap in frequency domain with another configured DL (or UL) BWP in a serving cell.

For a serving cell, a maximal number of DL/UL BWP configurations may be for paired spectrum, for example, 4 DL BWPs and 4 UL BWPs. A maximal number of DL/UL BWP configurations may be for unpaired spectrum, for example, 4 DL/UL BWP pairs. A maximal number of DL/UL BWP configurations may be for SUL, for example, 4 UL BWPs.

A wireless network may support a dedicated timer for timer-based active DL BWP switching to the default DL BWP for paired spectrum. A wireless device may start the timer if it switches its active DL BWP to a DL BWP other than the default DL BWP. A wireless device may restart the timer to the initial value if it successfully decodes a DCI to schedule PDSCH in its active DL BWP. A wireless device may switch its active DL BWP to the default DL BWP if the timer expires.

A wireless network may support a dedicated timer for timer-based active DL/UL BWP pair switching to the default DL/UL BWP pair for unpaired spectrum. A wireless device may start the timer, for example, if it switches its active DL/UL BWP pair to a DL/UL BWP pair other than the default DL/UL BWP pair. A wireless device may restart the timer to the initial value, for example, if it successfully decodes a DCI to schedule PDSCH in its active DL/UL BWP pair. A wireless device may switch its active DL/UL BWP pair to the default DL/UL BWP pair, for example, if the timer expires.

RRC signaling for SCell configuration and/or reconfiguration may indicate a first active DL BWP and/or a first active UL BWP if the SCell may be activated. A wireless network may support an SCell activation signaling that does not contain any information related to the first active DL/UL BWP. An active DL BWP and/or UL BWP may be deactivated if the SCell may be deactivated. The SCell may be deactivated by an SCell deactivation timer.

A wireless device may be configured with at least a timer for timer-based active DL BWP (or DL/UL BWP pair) switching and/or a default DL BWP (or a DL/UL BWP pair) that may be used if the timer may be expired. The default DL BWP may be different from the first active DL BWP. A default DL BWP (or DL/UL BWP pair) may be configured/reconfigured to a wireless device for a PCell. The default DL BWP may be an initial active DL BWP if no default DL BWP is configured. In a serving cell where PUCCH may be configured, a configured UL BWP may comprise PUCCH resources.

A common search space for at least RACH procedure may be configured in one or more BWPs for a wireless device in a PCell. A common search space for group-common PDCCH (e.g. SFI, pre-emption indication, etc.) may be configured in one or more BWPs for a wireless device in a serving cell.

A DL and/or UL BWP may be configured to a wireless device by resource allocation Type 1 with one PRB granularity of starting frequency location and one PRB granularity of bandwidth size, wherein the granularity may not imply that a wireless device may adapt its RF channel bandwidth accordingly.

A DCI format size itself may not be a part of RRC configuration irrespective of BWP activation and deactivation in a serving cell. The DCI format size may depend on different operations and/or configurations of different information fields in the DCI.

An initial active DL BWP may be defined as frequency location and bandwidth of RMSI CORESET and numerology of RMSI. The PDSCH delivering RMSI may be confined within the initial active DL BWP. A wireless device may be configured with PRB bundling size(s) per BWP.

A wireless network may support configuring CSI-RS resource on BWP with a transmission BW equal to or smaller than the BWP. A wireless network may support at least the CSI-RS spanning contiguous RBs in the granularity of an arbitrary number (X) RBs, for example, if the CSI-RS BW is smaller than the BWP. If CSI-RS BW is smaller than the corresponding BWP, it may be at least larger than X RBs. The value of X may be the same or different for beam management and CSI acquisition. The value of X may or may not be numerology-dependent.

For frequency division duplex (FDD), a base station may configure separate sets of BWP configurations for DL and/or UL per component carrier. A numerology of DL BWP configuration may be applied to at least PDCCH, PDSCH, and/or corresponding DMRS. A numerology of UL BWP configuration may be applied to at least PUCCH, PUSCH, and/or corresponding DMRS. For time division duplex (TDD), base station may configure separate sets of BWP configurations for DL and/or UL per component carrier. A numerology of DL BWP configuration may be applied to at least PDCCH, PDSCH, and/or corresponding DMRS. A numerology of UL BWP configuration may be applied to at least PUCCH, PUSCH, and/or corresponding DMRS. A wireless device may not retune the center frequency of channel BW between DL and UL, for example, if different active DL and UL BWPs are configured.

One or more scheduling request (SR) configurations may be configured for a BWP of a cell for a wireless device. A wireless device may use SR resources configured by the SR configurations in a BWP to indicate to the base station the numerology/TTI/service type of a logical channel (LCH) or logical channel group (LCG) that triggered the SR. The maximum number of SR configurations may be the maximum number of logical channels/logical channel groups.

There may be at most one active DL BWP and at most one active UL BWP at a given time for a serving cell. A BWP of a cell may be configured with a specific numerology and/or TTI. For a logical channel and/or logical channel group that triggers a SR transmission while the wireless device operates in one active BWP, the corresponding SR may remain triggered based on BWP switching.

The logical channel and/or logical channel group to SR configuration mapping may be configured and/or reconfigured based on switching of the active BWP. The RRC dedicated signaling may configure and/or reconfigure the logical channel and/or logical channel group to SR configuration mapping on the new active BWP if the active BWP is switched.

A mapping between a logical channel and/or logical channel group and SR configuration may be configured if a BWP is configured. The RRC may pre-configure mapping between logical channels and/or logical channel groups to SR configurations for the configured BWPs. Based on switching of the active BWP, a wireless device may use the RRC configured mapping relationship for the new BWP. A RRC may configure the mapping between logical channel and SR configurations for the BWP. The sr-ProhibitTimer and SR_COUNTER corresponding to a SR configuration may continue and the value of the sr-ProhibitTimer and the value of the SR_COUNTER may be their values before the BWP switching.

A plurality of logical channel/logical channel group to SR configuration mappings may be configured in a serving cell. A logical channel/logical channel group may be mapped to at most one SR configuration per BWP. A logical channel/logical channel group mapped onto multiple SR configurations in a serving cell may have one SR configuration active at a time, such as that of the active BWP. A plurality of logical channel/logical channel group to SR-configuration mappings may be supported in carrier aggregation (CA). A logical channel/logical channel group may be mapped to one (or more) SR configuration(s) in each of PCell and PUCCH-SCell. A logical channel/logical channel group configured to be mapped to one (or more) SR configuration(s) in each of both PCell and PUCCH-SCell may have two active SR configurations (one on PCell and one on PUCCH-SCell) at a time for CA. The SR resource is received first may be used.

A base station may configure one SR resource per BWP for the same logical channel/logical channel group. If a SR for one logical channel/logical channel group is pending, a wireless device may transmit a SR with the SR configuration in another BWP after BWP switching. The sr-ProhibitTimer and SR_COUNTER for the SR corresponding to the logical channel/logical channel group may continue based on BWP switching. The wireless device may transmit the SR in another SR configuration corresponding to the logical channel/logical channel group in another BWP after BWP switching if a SR for one logical channel/logical channel group may be pending, If multiple SRs for logical channels/logical channel groups mapped to different SR configurations are triggered, the wireless device may transmit one SR corresponding to the highest priority logical channel/logical channel group. The wireless device may transmit multiple SRs with different SR configurations. SRs triggered at the same time (e.g., in the same NR-UNIT) by different logical channels/logical channel groups mapped to different SR configurations may be merged into a single SR corresponding to the SR triggered by the highest priority logical channel/logical channel group.

If an SR of a first SR configuration is triggered by a first logical channel/logical channel group while an SR procedure triggered by a lower priority logical channel/logical channel group may be on-going on another SR configuration, the later SR may be allowed to trigger another SR procedure on its own SR configuration independently of the other SR procedure. A wireless device may be allowed to send independently triggered SRs for logical channels/logical channel groups mapped to different SR configurations. A wireless device may be allowed to send triggered SRs for LCHs corresponding to different SR configurations independently.

The dsr-TransMax may be independently configured per SR configuration. The SR_COUNTER may be maintained for each SR configuration independently. A common SR_COUNTER may be maintained for all the SR configurations per BWP.

PUCCH resources may be configured per BWP. The PUCCH resources in the currently active BWP may be used for UCI transmission. PUCCH resources may be configured per BWP. PUCCH resources may be utilized in a BWP not currently active for UCI transmission. PUCCH resources may be configured in a default BWP and BWP switching may be necessary for PUCCH transmission. A wireless device may be allowed to send SR1 in BWP1 even though BWP1 may be no longer active. The network may reconfigure (e.g., pre-configure) the SR resources so that both SR1 and SR2 may be supported in the active BWP. An anchor BWP may be used for SR configuration. In an example, the wireless device may send SR2 as a fallback.

A logical channel/logical channel group mapped to a SR configuration in an active BWP may also be mapped to the SR configuration in another BWP to imply same or different information, such as numerology and/or TTI and priority. A MAC entity can be configured with a plurality of SR configurations within the same BWP. The plurality of the SR configurations may be on the same BWP, on different BWPs, or on different carriers. The numerology of the SR transmission may differ from the numerology that the logical channel/logical channel group that triggered the SR may be mapped to.

The PUCCH resources for transmission of the SR may be on different BWPs or different carriers for a LCH mapped to multiple SR configurations. The selection of which configured SR configuration within the active BWP to transmit one SR may be up to wireless device implementation if multiple SRs are triggered. A single BWP can support multiple SR configurations. Multiple sr-ProhibitTimers (e.g., each for one SR configuration) may be running at the same time. A drs-TransMax may be independently configured per SR configuration. A SR_COUNTER may be maintained for each SR configuration independently. A single logical channel/logical channel group may be mapped to zero or one SR configurations. A PUCCH resource configuration may be associated with a UL BWP. One or more logical channels may be mapped to none or one SR configuration per BWP in CA.

A BWP may consist of a group of contiguous PRBs in the frequency domain. The parameters for each BWP configuration may include numerology, frequency location, bandwidth size (e.g., in terms of PRBs), CORESET. CORESET may be required for each BWP configuration, such as for a single active DL bandwidth part for a given time instant. One or more BWPs may be configured for each component carrier, for example, if the wireless device is in RRC connected mode.

The configured downlink assignment may be initialized (e.g., if not active) or re-initialized (e.g., if already active) using PDCCH if a new BWP may be activated. For uplink SPS, the wireless device may have to initialize and/or re-initialize the configured uplink grant if switching from one BWP to anther BWP. If a new BWP is activated, the configured uplink grant may be initialized (e.g., if not already active) or re-initialized (e.g., if already active) using PDCCH.

For type 1 uplink data transmission without grant, there may be no L1 signaling to initialize or re-initialize the configured grant. The wireless device may not determine that the type 1 configured uplink grant may be active if the BWP may be switched, for example, even if the wireless device is already active in the previous BWP. The type 1 configured uplink grant may be re-configured using RRC dedicated signaling for switching the BWP. The type 1 configured uplink grant may be re-configured using dedicated RRC signaling if a new BWP is activated.

If SPS is configured on the resources of a BWP and the BWP is subsequently deactivated, the SPS grants or assignments may not continue. All configured downlink assignments and configured uplink grants using resources of this BWP may be cleared, for example, if a BWP is deactivated. The MAC entity may clear the configured downlink assignment or/and uplink grants upon receiving activation and/or deactivation of BWP.

The units of drx-RetransmissionTimer and drx-ULRetransmissionTimer may be OFDM symbol corresponding to the numerology of the active BWP. If a wireless device is monitoring an active DL BWP for a long time without activity, the wireless device may move to a default BWP in order to save power. A BWP inactivity timer may be introduced to switch from an active BWP to the default BWP. Autonomous switching to a DL default BWP may consider both DL BWP inactivity timers and/or DRX timers, such as HARQ RTT and DRX retransmission timers. A DL BWP inactivity timer may be configured per MAC entity. A wireless device may be configured to monitor PDCCH in a default BWP, for example, if a wireless device uses a long DRX cycle.

A power headroom report (PHR) may not be triggered due to the switching of BWP. The support of multiple numerologies/BWPs may not impact PHR triggers. A PHR may be triggered upon BWP activation. A prohibit timer may start upon PHR triggering due to BWP switching. A PHR may not be triggered due to BWP switching while the prohibit timer may be running. A PHR may be reported per activated and/or deactivated BWP.

Packet Data Convergence Protocol (PDCP) duplication may be in an activated state while the wireless device receives the BWP deactivation command. The PDCP duplication may not be deactivated, for example, if the BWP on which the PDCP duplication is operated on is deactivated. The PDCP entity may stop sending the data to the deactivated RLC buffer, for example, even if the PDCP duplication may not be deactivated.

RRC signaling may configure a BWP to be activated, for example, if the SCell is activated. Activation and/or deactivation MAC CE may be used to activate both the SCell and the configured BWP. A HARQ entity can serve different BWP within one carrier.

For a wireless device-specific serving cell, one or more DL BWPs and one or more UL BWPs may be configured by dedicated RRC for a wireless device. A single scheduling DCI may switch the wireless device's active BWP from one to another. An active DL BWP may be deactivated by means of timer for a wireless device to switch its active DL bandwidth part to a default DL bandwidth part. A narrower BWP may be used for DL control monitoring and a wider BWP may be used for scheduled data. Small data may be allowed in the narrower BWP without triggering BWP switching.

For a wireless device with a RRC connected mode, RRC signaling may support to configure one or more BWPs (for both DL BWP and UL BWP) for a serving cell (PCell, PSCell). RRC signaling may support to configure zero or more BWPs, for both DL BWP and UL BWP, for a serving cell SCell having at least 1 DL BWP. For a wireless device, the PCell, PSCell, and each SCell may have a single associated SSB in frequency. A cell defining SS block may be changed by synchronous reconfiguration for PCell/PSCell and SCell release/add for the SCell. For example, a SS block frequency that needs to be measured by the wireless device may be configured as individual measurement object, such as having one measurement object corresponds to a single SS block frequency. The cell defining SS block may be considered as the time reference of the serving cell and for RRM serving cell measurements based on SSB irrespective of which BWP may be activated. One or more RRC timers and counters related to RLM may not be reset, for example, if the active BWP may be changed.

A SR configuration may comprise a collection of sets of PUCCH resources across different BWPs and cells, wherein per cell, at any given time there may be at most one usable PUCCH resource per LCH. One single LTE-like set of SR PUCCH resources may be configured per LCH per BWP and one BWP may be active at a time.

BWP switching and cell activation and/or deactivation may not interfere with the operation of the counter and timer. The wireless device may or may not stop using configured downlink assignments and/or configured uplink grants using resources of the BWP, for example, if a BWP may be deactivated. The wireless device may suspend the configured grants of the or clear it. The wireless device may not suspend and/or clear the configured grants. A new timer (e.g., a BWP inactivity timer) may be used to switch from an active BWP to a default BWP after a certain inactive time. The BWP inactivity timer may be independent from the DRX timers.

A wireless device may not transmit on UL-SCH on the BWP that may A BWP may be in active during a period of time, for example, if a BWP inactivity timer is running for the BWP. A base station may send a control message to a wireless device to configure a first timer value of a BWP inactivity timer. The first timer value may determine how long a BWP inactivity timer runs, for example, a period of time that a BWP inactivity timer runs. The BWP inactivity timer may be implemented as a count-down timer from a first timer value down to zero. The BWP inactivity timer may be implemented as a count-up timer from zero up to a first timer value down. The BWP inactivity timer may be implemented as a down-counter from a first timer value down to zero. The BWP inactivity timer may be implemented as a count-up counter from zero up to a first timer value down. A wireless device may restart a BWP inactivity timer (e.g., UL BWP and/or DL BWP inactivity timers) if the wireless device receives (and/or decodes) a DCI to schedule PDSCH(s) in its active BWP (e.g., its active UL BWP, its active DL BWP, and/or UL/DL BWP pair).

A wireless device may not transmit on UL-SCH on the BWP that may be deactivated. The wireless device may not monitor the PDCCH on the BWP that may be deactivated. The wireless device may not transmit PUCCH on the BWP that may be deactivated. The wireless device may not transmit on PRACH on the BWP that may be deactivated. The wireless device may not flush HARQ buffers if performing BWP switching.

A wireless device-specific DCI may result in increasing signaling overhead. Signaling overhead may result, for example, due to a base station having to coordinate scheduling of a plurality of DCIs for switching one or more BWPs for a plurality of wireless devices. Coordinating a plurality of DCIs may result in complicated processing at the base station and/or in a delay to schedule the plurality of DCIs for the plurality of wireless device. Wireless devices may incur inefficiencies using wireless device-specific DCI. For example, a plurality of wireless devices may have the same first active DL BWP and/or UL BWP, such as if an active DL BWP and/or UL BWP is switched from the same first active DL BWP and/or UL BWP to a second DL BWP and/or UL BWP for the plurality of wireless devices. A wireless device-specific DCI for such switching may require a base station to transmit one or more DCIs to the plurality of wireless devices with duplicated (or almost the same) information, which may be inefficient. A wireless device-specific DCI may increase signaling overhead and/or may decrease spectral efficiency.

A base station may use a group-common DCI that may decrease signaling overhead and/or increase spectral efficiency. The base station may indicate a switching of bandwidth parts for a plurality of wireless devices using a single group-common DCI. The group-common DCI may be based on, for example, an index, wireless device identifiers, or a combination of both. The base station may determine a size of the group-common DCI. The base station may measure utilization of resources in a cell by a plurality of devices. Based on resource utilization, the base station may determine whether bandwidth part switching should be performed by one or more wireless devices to improve resource utilization. A group-common DCI may be used to indicate activation, deactivation, and/or switching of an active DL/UL BWP (e.g., an active DL BWP and/or an active UL BWP) and/or a default DL/UL BWP (e.g., a default DL BWP and/or a default UL BWP) for one or more wireless devices. A set of DL/UL BWPs to which a wireless device may tune, move, and/or stay in a cell may not be wireless device-specific. The set of BWPs may be cell-specific and/or may be at least common for a plurality of wireless devices. One or more wireless devices may switch a DL BWP and/or an UL BWP within a same set of BWPs in a cell. A base station may send, to a plurality of wireless devices having a same set of BWPs, one or more messages indicating via a group-common DCI the activating, deactivating, selecting, and/or switching of a DL BWP and/or an UL BWP.

A base station may send, to a wireless device, at least one message comprising configuration parameters for a plurality of bandwidth parts of a cell. The at least one message may comprise one or more RRC messages. The at least one message may further comprise an index associated with the wireless device and/or an identifier associated with the wireless device. The index may comprise a number and/or a value associated with a wireless device. The index may comprise a number and/or a value that is associated with only the wireless device, such that the index may differ from each of a plurality of other indices each associated with one of a plurality of other wireless devices. For example a first index may be associated with a first wireless device, a second index may be associated with a second wireless device, and/or a $k^{th}$ index may be associated with a $k^{th}$ wireless device, wherein k may be any integer greater than 1. The index may comprise a number and/or a value that is associated with a group of wireless devices, such that the index may differ from each of a plurality of other indices each associated with one group of a plurality of groups of other wireless devices. For example a first index may be associated with a first group of wireless devices, a second index may be associated with a second group of wireless devices, and/or a $k^{th}$ index may be associated with a $k^{th}$ group of wireless devices, wherein k may be any integer greater than 1. The index may comprise any index, including, for example, any index referenced herein. The index may comprise an indication of the wireless device and/or an indication of a group of wireless device. The index may comprise an indication associated with the wireless device and/or an indication associated with a group of wireless devices. The index may comprise an identifier of the wireless device. The index may comprise an identifier associated with the wireless device. The identifier associated with the wireless device may comprise a wireless device ID, RNTI, etc., that may comprise a unique identifier of the wireless device. The identifier may comprise any identifier, including for example, any identifier referenced herein. The configuration parameters may indicate one or more of: a first subcarrier spacing of a first bandwidth part, a first cyclic prefix of the first bandwidth part, a first number of first contiguous physical resource blocks of the first bandwidth part, and/or a first offset of a first physical radio resource block of the first contiguous physical radio resource blocks. The configuration parameters may indicate one or more of: a second subcarrier spacing of a second bandwidth part, a second cyclic prefix of the second bandwidth part, a second number of second contiguous physical resource blocks of the second bandwidth part, and/or a second offset of a second physical radio resource block of the second contiguous physical radio resource blocks. The configuration parameters may comprise a timer value of a second bandwidth part inactivity timer for the second bandwidth part. The configuration parameters may further comprise parameters of a configured grant of the first bandwidth part. The at least one message may comprise an indication of a default bandwidth part. The at least one message may further comprise a radio network identifier (e.g., RNTI).

The base station may send, to the wireless device via a control channel of a first bandwidth part, downlink control information (DCI) comprising a plurality of bandwidth part identifiers. Additionally or alternatively, the DCI may comprise a bandwidth part identifier and a plurality of indicators. The bandwidth part identifier may comprise a field indicating whether a bandwidth part is an active uplink bandwidth part, an active downlink bandwidth part, a default uplink bandwidth part, and/or a default downlink bandwidth part. Additionally or alternatively, the DCI may comprise a plurality of bandwidth part fields, each comprising a wireless device identifier and a bandwidth part identifier. The plurality of indicators may comprise a plurality of wireless device identifiers. The at least one message may further comprise an indication of a size of the DCI. The size of the DCI may be fixed (e.g., predefined) or variable. The DCI may be scrambled by the radio network identifier. The plurality of bandwidth part identifiers may comprise a first bandwidth part identifier indicating a first bandwidth part and/or a second bandwidth part identifier indicating a second bandwidth part. One or more of the first bandwidth part identifier and/or the second bandwidth part identifier may indicate a third bandwidth part paired with the second bandwidth part.

The wireless device may monitor a downlink control channel for one or more messages from the base station. The wireless device may receive, from the base station, the at least one message comprising a DCI. The wireless device may determine (e.g., detect) the at least one message based at least on a size of the DCI that may be predefined and/or that may be informed by the base station, for example, via one or more radio resource control messages. Based on a determination of the size of the DCI, the wireless device may reduce power consumption and decoding complexity for detecting and/or decoding the DCI. The wireless device may receive, from the base station, the DCI. The wireless device may determine, based on the index, a position of a first bandwidth part identifier in the DCI and/or a position of a first indicator in the DCI. Additionally or alternatively, the wireless device may determine, based on the identifier for the wireless device, a first bandwidth part field in the DCI. The wireless device may switch from the first bandwidth part to a second bandwidth part indicated by: the first bandwidth part identifier and/or the first bandwidth part field. Additionally or alternatively, the wireless device may switch, based on the first indicator, from the first bandwidth part to the second bandwidth part indicated by the bandwidth part identifier. The wireless device may switch from the first bandwidth part to the second bandwidth part based on a determination that the first bandwidth part is different from the second bandwidth part. If the first bandwidth part is the same as the second bandwidth part, the wireless device may not switch from the first bandwidth part to the second bandwidth part. The wireless device may reselect the first bandwidth part based on a determination that the second bandwidth part is the same as the first bandwidth part. The wireless device may stay in the first bandwidth part by ignoring the DCI, for example, based on a determination that the second bandwidth part is the same as the first bandwidth part. If the first bandwidth part is different from the second bandwidth part, the wireless device may switch from the first bandwidth part to the second bandwidth part. The wireless device may start, based on the timer value and after or in response to switching from the first bandwidth part to the second bandwidth part, the second bandwidth part inactivity timer. The wireless device may switch, after or in response to an expiry of the second bandwidth part inactivity timer, from the second bandwidth part to the default bandwidth part. Switching a bandwidth part by the wireless device may comprise the wireless device deactivating the first bandwidth part and/or activating the second bandwidth part. The switching may comprise a default bandwidth part switching from the first bandwidth part to the second bandwidth part. The switching may comprise an active bandwidth part switching from the first bandwidth part to the second bandwidth part. After or in response to the switching, the wireless device may clear a configured grant and/or release resources associated with the configured grant, for example, if the first bandwidth part comprises the configured grant.

A group-common DCI may comprise one or more fields indicating one or more of the following: whether the group-common DCI is for an activation and/or deactivation of a DL BWP, a target active DL BWP (e.g., a new active DL BWP), a source active DL BWP (e.g., a current active DL BWP), a target default DL BWP (e.g., a new default DL BWP), a source default DL BWP (e.g., a current default DL BWP), a DL assignment associated with the target active BWP, and/or an UL grant associated with the target active BWP. Additionally or alternatively, the group-common DCI may comprise one or more fields indicating one or more of the following: whether the group-common DCI is for an activation and/or deactivation of an UL BWP, a target active UL BWP (e.g., a new active UL BWP), a source active UL BWP (e.g., a current active UL BWP), a target default UL BWP (e.g., a new default UL BWP), a source default UL BWP (e.g., a current default UL BWP), an UL assignment associated with the target active BWP, and/or an UL grant associated with the target active BWP.

The group-common DCI may be scrambled. The group-common DCI may be scrambled by an RNTI, such that the RNTI may be allocated, assigned, and/or transmitted via one or more wireless device-specific RRC signaling and/or messages. A base station may transmit, to a wireless device, the one or more wireless device-specific RRC signaling and/or messages that may comprise the RNTI. The RNTI may be shared by a plurality of wireless devices.

A size of the group-common DCI may be fixed and/or semi-statically updated via one or more RRC signaling and/or messages, which may reduce processing complexity for DCI decoding by the wireless device. The one or more RRC signaling and/or messages may be wireless device-specific. A wireless device may search a group-common DCI from a common search space in a PDCCH with a plurality of possible sizes (e.g., brute force searching), for example, if a size of the group-common DCI is unknown to the wireless device. Using a group-common DCI with a predetermined size, and/or indicating the size of a group-common DCI to the wireless device before the wireless device is to detect the group-common DCI, may reduce processing overhead for detecting and/or decoding the group-common DCI by the wireless device side. For example, the predetermined size may reduce a size of searching space for the DCI detection in the PDCCH. The size of the group-common DCI may be predetermined and/or indicated to a wireless device before the wireless device receives the group-common DCI. The size of the group-common DCI may be configured for a wireless device via L1 signaling (e.g., via a DCI) before the wireless device starts to monitor a PDCCH (e.g., a CORESET in a current active DL BWP) for the group-common DCI. The size of the group-common DCI may be updated via L1 signaling (e.g., via a DCI) before the wireless device starts to monitor a PDCCH (e.g., a CORESET in a current active DL BWP) for the group-common DCI. A group-common DCI may comprise one or more dummy fields (e.g., zero padding) to maintain and/or to adjust a size of a group-common DCI.

A format of the group-common DCI may be fixed and/or semi-statically updated, for example, via one or more RRC signaling and/or messages. The group-common DCI may comprise an indicator and/or identifier (e.g., which may indicate a size and/or a size adjustment), such that a wireless device may identify a format of the group-common DCI based on the indicator and/or identifier. A group-common DCI may comprise one or more dummy fields (e.g., zero padding).

A base station may use an index-based group-common DCI. The index-based group-common DCI may be used to indicate an activation, deactivation, and/or switching of an active DL, UL, and/or DL/UL pair BWP, and/or a default DL, UL, and/or DL/UL pair BWP, for one or more wireless devices. The index-based group-common DCI may comprise one or more fields indicating one or more of: a target BWP and/or an indicator, wherein at least one indicator may be associated with at least one of the one or more wireless devices and may indicate whether a target BWP is a new active BWP for the wireless device. The target BWP may be indicated in the one or more fields as an index of a new active DL BWP, UL BWP, and/or DL/UL pair BWP. One or more indices of DL BWP, UL BWP, and/or DL/UL pair BWPs may be configured via one or more RRC signaling and/or messages that may be wireless device-specific and/or cell-specific (e.g., via broadcasting system information such as RMSI). The index of the new active DL BWP, UL BWP, and/or DL/UL pair BWP may be one of the one or more indices. A wireless device may identify (e.g., based on an index) an associated indicator from the one or more indicators. A base station may configure the wireless device with the index via one or more RRC signaling and/or messages. The index may indicate which indicator is associated with the wireless device (e.g., a position and/or location of the associated indicator among the one or more indicators). For example, if a wireless device is configured with index k, the $k^{th}$ indicator of the one or more indicators may be associated with the wireless device. The indicator may indicate whether the target BWP (e.g., indicated in the one or more fields), is applied to a wireless device associated with the indicator. The indicator may be one or more bits. For example, one value (e.g., a value of 1) in the indicator may indicate that the wireless device switches an active BWP to the target BWP (e.g., selects and/or reselects the target BWP as an active BWP), and another value (e.g., a value of 0) may indicate that the target BWP is not applied to the wireless device.

Figure 15:
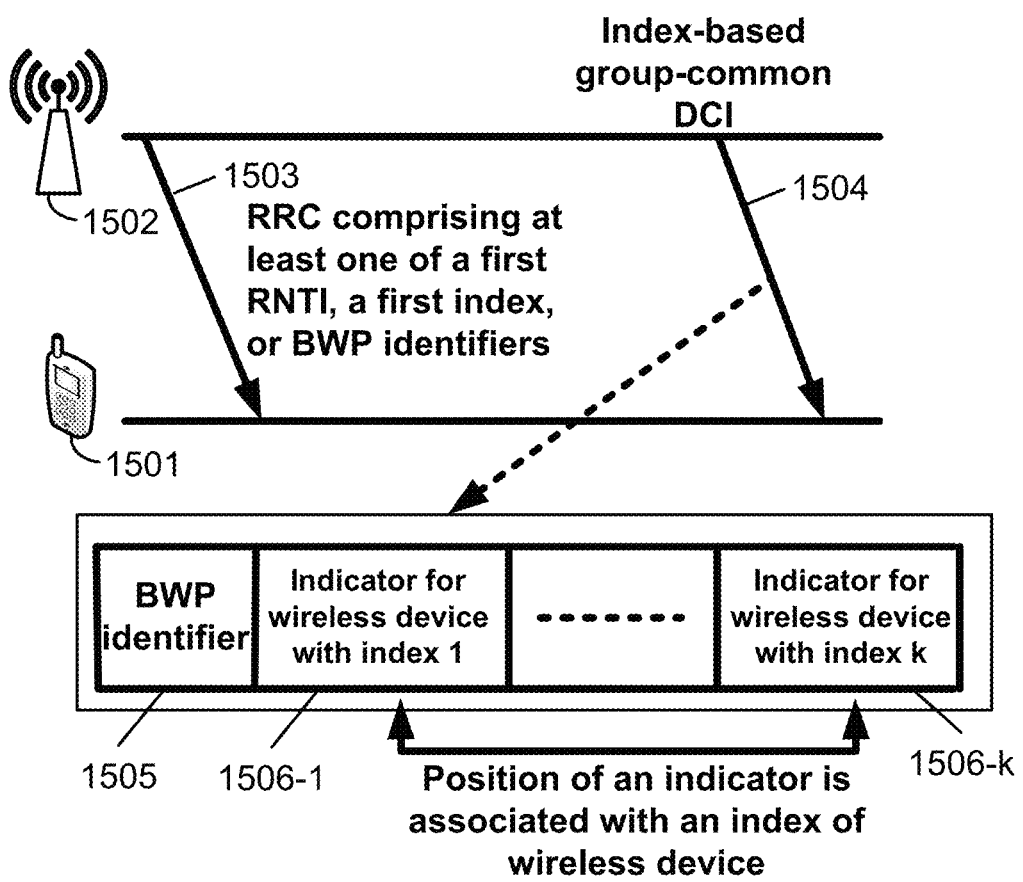
FIG. 15 shows an example of an index-based group common downlink control information (DCI).

FIG. 15 shows an example of an index-based group common DCI. A wireless device 1501 may receive, from a base station 1502, one or more RRC messages 1503 comprising at least one of a first RNTI, a first index, and/or one or more BWP identifiers associated with one or more BWPs in a cell configured for the wireless device. An active and/or a default DL, UL, and/or DL/UL pair BWP may be one of the one or more BWPs indicated by the one or more BWP identifiers. The wireless device 1501 may receive, from the base station 1502, an index-based group common DCI 1504. The index-based group common DCI 1504 may be scrambled, for example, by the first RNTI. A size of the index-based group common DCI 1504 may be fixed and/or indicated via one or more RRC messages. The index-based group common DCI 1504 may comprise one or more dummy fields, variables, and/or bits (e.g., zero padding) that may be used by the base station 1502 to match a size of the index-based group common DCI 1504. The index-based group common DCI 1504 may comprise one of the one or more identifiers (e.g., BWP identifier 1505) and one or more indicators (e.g., indicators 1506-1 to 1506-$k$). The wireless device 1501 may identify an indicator (e.g., 1506-1 to 1506-$k$) associated with the wireless device 1501 based on the first index. The wireless device 1501 may determine, based on a value of its associated indicator, whether to switch an active BWP to a target BWP associated with the one of the one or more identifiers (e.g., BWP identifier 1505).

A first wireless device (e.g., the wireless device 1501) may receive a first index-based group-common DCI (e.g., the index-based group common DCI 1504). The first index-based group-common DCI may comprise a field indicating a first target BWP (e.g., BWP identifier 1505) and at least a first indicator (e.g., indicator 1506-1 to 1506-$k$) associated with the first wireless device. The first wireless device may identify the first indicator (e.g., indicator 1506-1 to 1506-$k$) based on a first index configured via a wireless device-specific RRC message. Based on a value of the first indicator, the first wireless device may switch, select, and/or reselect an active BWP to the first target BWP. The first wireless device may restart a first BWP inactive timer associated with the active BWP, for example, after or in response to receiving the first index-based group-common DCI. The first wireless device may restart the first BWP inactive timer associated with the active BWP, for example, if the first target BWP is applied to the first wireless device.

The wireless device 1501 may receive, from the base station 1502, one or more RRC messages comprising one or more parameters for indicating at least one of following: one or more bandwidth parts (BWPs) for the cell; an indicator indicating one of the one or more BWPs as a default BWP for the cell; an information element (IE) indicating a group-common downlink control information (DCI) size and/or format for the cell; an index of the wireless device 1501; and/or an RNTI. The wireless device 1501 may attempt a detection of a PDCCH with a group-common DCI 1504 at least based on a size indicated by the IE. The group-common DCI 1504 may comprise one or more of the following: a BWP identifier associated with one of the one or more BWPs; and/or one or more indicators. The wireless device 1501 may determine whether to switch a BWP to a first BWP associated the at least one BWP identifier (e.g., 1505 in FIG. 15), for example, based on a first indicator associated with the wireless device 1501. A position of the first indicator may be indicated at least based on the index of the wireless device 1501. The group-common DCI 1504 may be scrambled by at least the RNTI. The BWP may be one of following: an active UL BWP; an active DL BWP; an active UL/DL pair BWP; a default UL BWP; a default DL BWP; and/or a default UL/DL pair BWP.

A base station may use a group-common DCI comprising one or more BWP identifiers. One of the one or more BWP identifiers may be associated with a wireless device and may indicate a target BWP (e.g., a new default DL, UL, or DL/UL pair BWP, or a new active DL, UL, or DL/UL pair BWP) for the wireless device. One or more indices of DL, UL, and/or DL/UL pair BWPs may be configured via one or more RRC messages that may be wireless device-specific and/or cell-specific (e.g., via broadcasting system information such as RMSI). The one of the one or more BWP identifiers may be one of the one or more indices of a DL BWP, an UL BWP, and/or DL/UL pair BWPs. The wireless device may determine, based on an index, a BWP identifier (from the one or more BWP identifiers) that may be associated with the wireless device. The base station may configure the wireless device with the index via one or more RRC messages. The index may indicate which BWP identifier is associated with the wireless device (e.g., a position and/or location of the associated BWP identifier among the one or more BWP identifiers). For example, if a wireless device is configured with index k, the $k^{th}$ BWP identifier of the one or more BWP identifiers may be associated with the wireless device. The BWP identifier may be 1, 2, or 3 bits for a cell with 2, 4, or 8 BWP candidates, respectively. In a received group-common DCI comprising one or more BWP identifiers, a BWP identifier associated with the wireless device may indicate a current active BWP. The wireless device may reselect the current active BWP as an active BWP (e.g., the wireless device may not to switch a current active BWP). The wireless device may restart a BWP inactive timer, for example, if the current active BWP is not a default BWP, and/or the wireless device may reselect the current active BWP as an active BWP. The wireless device may not start and/or restart a BWP inactive timer, for example, if the current active BWP is not a default BWP. In a received group-common DCI comprising one or more BWP identifiers, for example, a BWP identifier associated with the wireless device may indicate a first BWP different from a current active BWP. The wireless device may switch a current active BWP to the first BWP. The wireless device may restart a BWP inactive timer, for example, if the first BWP is not a default BWP.

Figure 16:
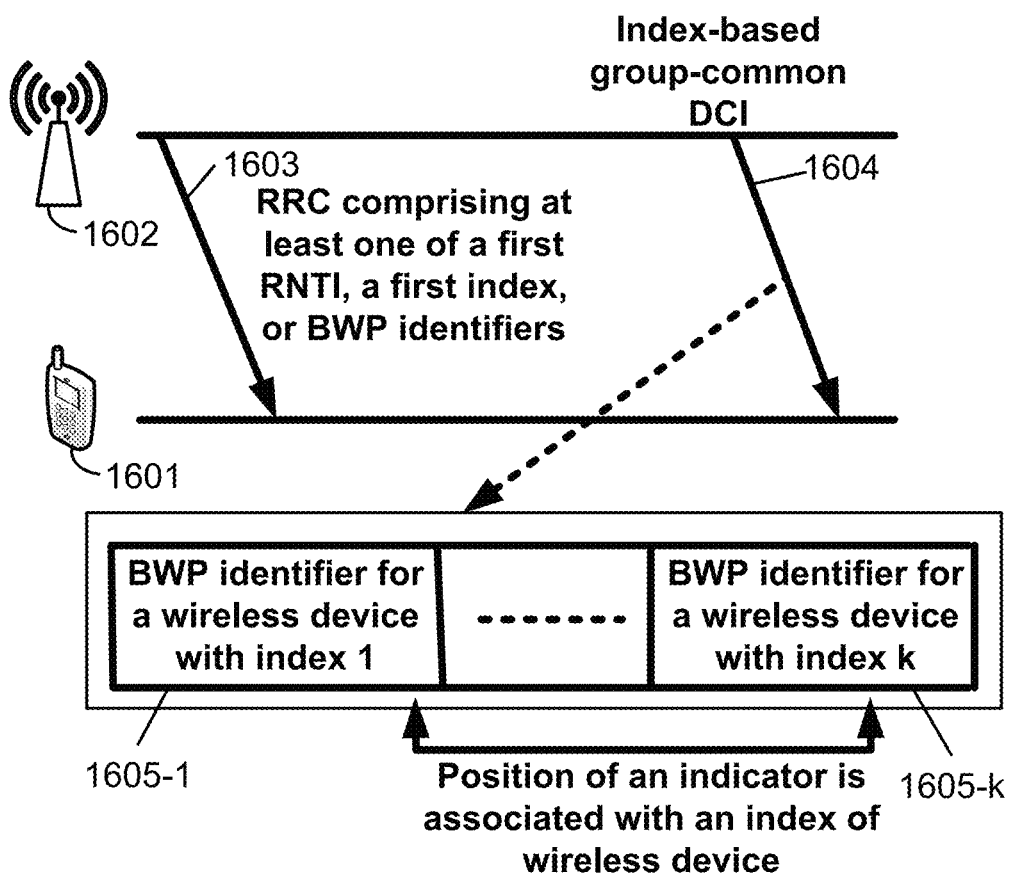
FIG. 16 shows an example of a group common DCI comprising one or more of a plurality of bandwidth part identifiers.

FIG. 16 shows an example of a group common DCI comprising one or more of a plurality of BWP identifiers. A wireless device 1601 may receive, from a base station 1602, one or more RRC messages 1603 comprising one or more of: a first RNTI, a first index, and/or one or more identifiers associated with one or more BWPs configured in a cell. An active and/or a default DL, UL, and/or DL/UL pair BWP may be one of the one or more BWPs. The wireless device 1601 may receive, from the base station 1602, a group common DCI 1604 comprising one or more BWP identifiers (e.g., 1605-1 to 1605-$k$). The group common DCI 1604 may be scrambled, for example, by the first RNTI. A size of the group common DCI 1604 may be fixed and/or determined via one or more DCI and/or RRC messages. The group common DCI 1604 may comprise one or more dummy fields, variables, and/or bits (e.g., zero padding) that may be used by the base station 1602 to match a size of the group common DCI 1604. The group common DCI 1604 may comprise one or more BWP identifiers (e.g., 1605-1 to 1605-$k$) indicating one or more target active or default (DL, UL, or DL/UL pair) BWPs for one or more wireless devices. The wireless device 1601 may identify a BWP identifier (e.g., BWP identifier 1605-1 to 1605-$k$) associated with the wireless device 1601 based on the first index. The wireless device 1601 may determine whether to switch an active BWP to a target BWP associated with an identified BWP identifier corresponding to the wireless device 1601 in the group common DCI 1604, for example, if or based on whether a current active BWP is different from the target BWP.

The wireless device 1601 may receive, from the base station 1602, one or more RRC messages comprising one or more parameters for indicating at least one of following: one or more bandwidth parts (BWPs) for the cell; an BWP identifier indicating one of the one or more BWPs as a default BWP for the cell; an information element (IE)

indicating a group-common downlink control information (DCI) size and/or format for the cell; an index of the wireless device 1601; and/or an RNTI. The wireless device 1601 may attempt, at least based on a size associated with the IE, a detection of a PDCCH with a group-common DCI 1604. The group-common DCI 1604 may comprise one or more BWP identifiers 1605-1 to 16-5-k, wherein the wireless device 1601 may identify a first BWP identifier from the one or more BWP identifiers at least based on the index of the wireless device 1601. The wireless device 1601 may switch a BWP to a first BWP indicated by the first BWP identifier, for example, if the BWP is different from the first BWP. The group-common DCI 1604 may be scrambled by at least the RNTI. The first BWP identifier may be associated with one of the one or more BWPs. The BWP may be one of the following: an active UL BWP; an active DL BWP; an active UL/DL pair BWP; a default UL BWP; a default DL BWP; or a default UL/DL pair BWP.

A base station may use a group-common DCI to indicate activation, deactivation, and/or switching of an active DL, UL, and/or DL/UL pair BWP, and/or a default DL, UL, and/or DL/UL pair BWP, for one or more wireless devices. The group-common DCI may comprise at least one field indicating a target BWP and one or more wireless device identifiers, wherein one of the one or more wireless device identifiers may be associated with one of the one or more wireless devices. The target BWP may be indicated in the at least one field as an index of a new active DL BWP, UL BWP, and/or DL/UL pair BWP. One or more indices of DL BWP, UL BWP, and/or DL/UL pair BWP may be configured via one or more RRC messages that may be wireless device-specific and/or cell-specific (e.g., via broadcasting system information such as RMSI). The index may be one of the one or more indices. A wireless device may determine, based on a presence or an absence of a wireless device identifier, associated with the wireless device, in the group-common DCI, whether or not the target BWP indicated in the at least one field is applied to the wireless device. The base station may configure the wireless device with the wireless device identifier via one or more RRC messages. The wireless device identifier may be a C-RNTI assigned, configured, and/or allocated to the wireless device. The wireless device identifier may be associated with the C-RNTI (e.g., a truncated C-RNTI). The wireless device identifier may be separately assigned, configured, and/or allocated to the wireless device by the base station via at least one wireless device-specific RRC message. The target BWP may indicate a current active BWP, for example, if the wireless device receives a group-common DCI comprising at least one field indicating a target BWP and/or one or more wireless device identifiers. The wireless device may reselect the current active BWP as an active BWP (e.g., may not to switch a current active BWP), for example, if the group-common DCI comprises a wireless device identifier associated with the wireless device. The wireless device may restart a BWP inactive timer, for example, if the current active BWP is not a default BWP. The wireless device may not restart a BWP inactive timer, for example, if the current active BWP is not a default BWP. The target BWP may indicate a first BWP different from a current active BWP, for example, if the wireless device receives a group-common DCI comprising at least one field indicating a target BWP and/or one or more wireless device identifiers comprising a wireless device identifier corresponding to the wireless device. The wireless device may switch a current active BWP to the first BWP, for example, if the group-common DCI comprises a wireless device identifier associated with the wireless device. The wireless device may restart a BWP inactive timer, for example, if the first BWP is not a default BWP. The wireless device may ignore, abandon, and/or discard the group-common DCI, for example, if the wireless device receives a group-common DCI comprising at least one field indicating a target BWP and/or one or more wireless device identifiers that are not associated with or indicating the wireless device.

Figure 17:
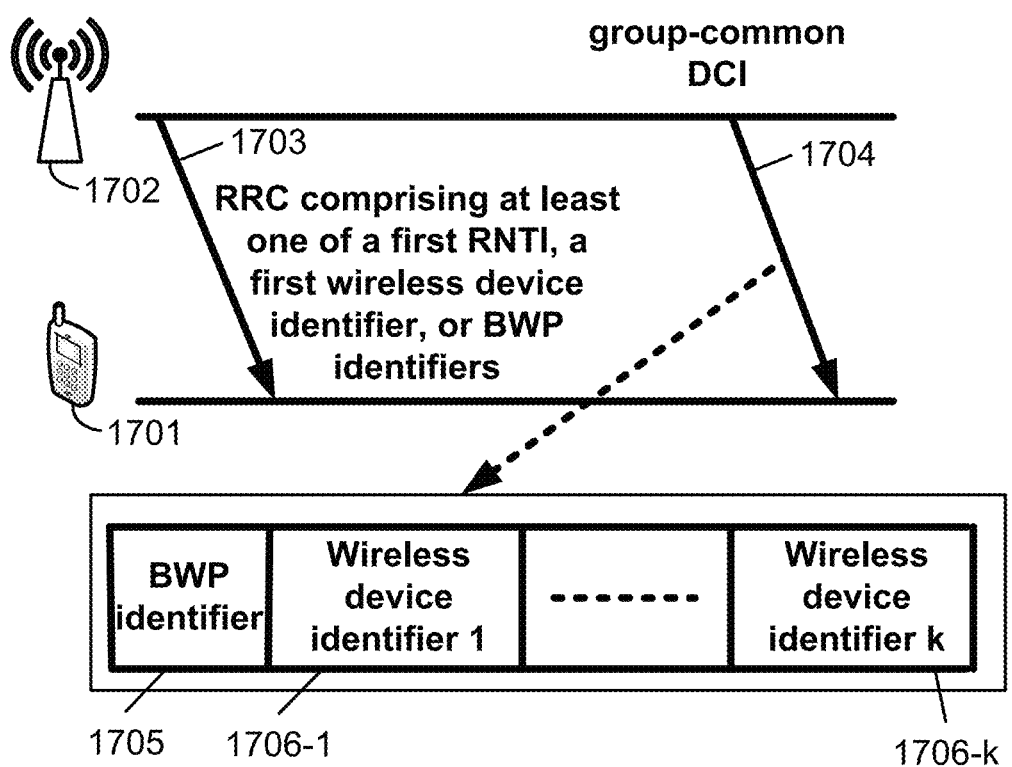
FIG. 17 shows an example of a group common DCI comprising a bandwidth part identifier and one or more wireless device identifiers.

FIG. 17 shows an example of a group common DCI comprising a BWP identifier and one or more wireless device identifiers. A wireless device 1701 may receive, from a base station 1702, one or more RRC messages 1703 comprising one or more of a first RNTI, a first wireless device identifier, and/or one or more identifiers associated with one or more BWPs in a cell configured with the wireless device 1701. An active and/or a default DL, UL, and/or DL/UL pair BWP may be one of the one or more BWPs. The wireless device 1701 may receive, from the base station 1702, a group common DCI 1704. The group common DCI 1704 may be scrambled, for example, by the first RNTI. A size of the group common DCI 1704 may be fixed and/or determined via one or more DCI and/or RRC messages. The group common DCI 1704 may comprise one or more dummy fields, variables, and/or bits (e.g., zero padding) that may be used by the base station 1702 to match a size of the group common DCI 1704. The group common DCI 1704 may comprise at least one field indicating a target BWP (e.g., BWP identifier 1705) and one or more wireless device identifiers (e.g., 1706-1 to 1706-k). The wireless device 1701 may switch, select, and/or reselect an active BWP to the target BWP, for example, if the one or more wireless device identifiers comprise the first wireless device identifier associated with the wireless device 1701.

A base station may use a group-common DCI that may comprise a fixed size to indicate activation, deactivation, and/or switching of an active DL BWP, UL BWP, and/or DL/UL pair BWP, and/or a default DL BWP, UL BWP, and/or DL/UL pair BWP, for one or more wireless devices. The group-common DCI may comprise at least one BWP field, wherein the at least one BWP field may comprise at least one field indicating a target BWP and a wireless device identifier. The wireless device may be one of the one or more wireless devices. The target BWP may be indicated in the at least one field as an index of a new active DL BWP, UL BWP, or DL/UL pair BWP. For example, one or more indices of DL BWP, UL BWP, and/or DL/UL pair BWP may be configured with the wireless device by the base station via one or more RRC messages that may be wireless device-specific and/or cell-specific (e.g., via broadcasting system information such as RMSI). The index may be one of the one or more indices. A wireless device may determine, based on a presence or an absence of a wireless device identifier, associated with the wireless device, in the group-common DCI, whether or not the target BWP indicated in the at least one field is applied to the wireless device. The base station may configure the wireless device with the wireless device identifier via one or more RRC messages. The wireless device identifier may be a C-RNTI assigned, configured, and/or allocated to the wireless device. The wireless device identifier may be associated with the C-RNTI (e.g., a truncated C-RNTI. The wireless device identifier may be separately assigned, configured, and/or allocated to the wireless device by the base station via at least one wireless device-specific RRC message. The wireless device may attempt to detect at least one BWP field from the one or more BWP fields based on a wireless device identifier associated with the wireless device, for example, if the wireless device receives a group-common DCI comprising one or more BWP fields. The wireless device may identify the wireless device identifier from the group-common DCI, for example, if a size of a BWP field may be fixed. The wireless device may ignore, abandon, and/or discard the group-common DCI, for example, if the group-common DCI does not comprise the wireless device identifier. The wireless device may switch an active BWP to a target BWP (wherein the group-common DCI may comprise at least one BWP filed comprising the wireless device identifier and the target BWP), for example, if the group-common DCI comprises the wireless device identifier. The target BWP may indicate a current active BWP. The wireless device may reselect the current active BWP as an active BWP (e.g., the wireless device may not to switch a current active BWP). The wireless device may restart a BWP inactive timer, for example, if the current active BWP is not a default BWP. The wireless device may not restart a BWP inactive timer, for example, if the current active BWP is not a default BWP. The wireless device may switch the current active BWP to the first target BWP (wherein the group-common DCI may comprise at least one BWP filed comprising the wireless device identifier and the first target BWP), for example, if the group-common DCI comprises the wireless device identifier and a first target BWP is different from a current active BWP. The wireless device may restart a BWP inactive timer, for example, if the first target BWP is not a default BWP.

Figure 18:
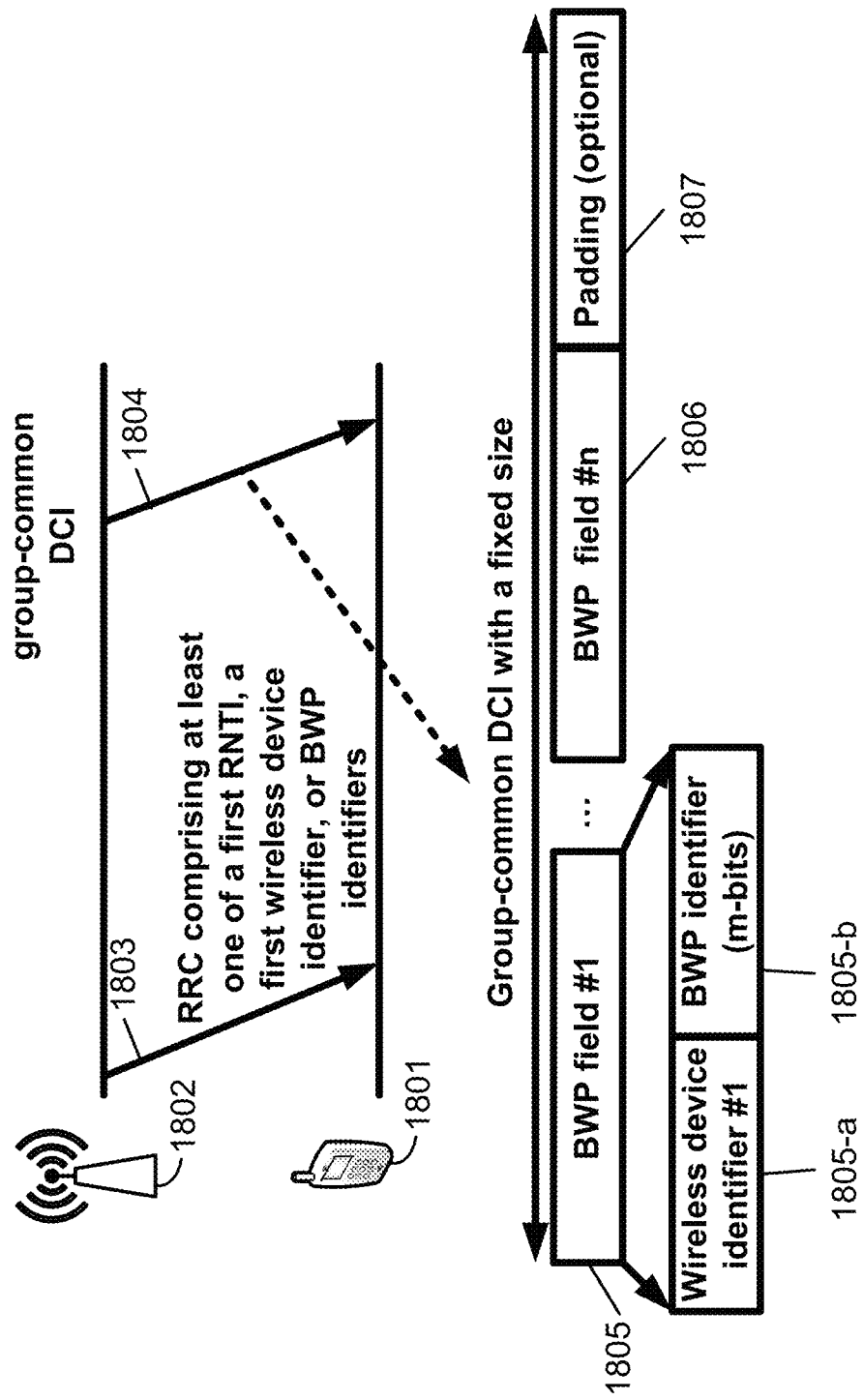
FIG. 18 shows an example of a group common DCI comprising one or more bandwidth part fields.

FIG. 18 shows an example of a group common DCI comprising one or more of a plurality of BWP fields. A wireless device 1801 may receive, from a base station 1802, one or more RRC messages 1803 comprising one or more of: a first RNTI, a first wireless device identifier, and/or one or more identifiers associated with one or more BWPs configured in a cell. An active and/or a default DL, UL, and/or DL/UL pair BWP may be one of the one or more BWPs. The wireless device 1801 may receive, from the base station 1802, a group common DCI 1804. The group common DCI 1804 may be scrambled, for example, by the first RNTI. A size of the group common DCI may be fixed and/or determined based on a size indicator transmitted via one or more DCI and/or RRC messages. The group common DCI 1804 may comprise one or more dummy fields, variables, and/or bits (e.g., zero padding 1807) that may be used by a base station to match a size of the group common DCI 1804. The group common DCI 1804 may comprise at least one BWP field (e.g., 1805 and/or 1806) that may comprise a wireless device identifier (e.g., 1805-a) and a BWP identifier (e.g., 1805-b) that may indicate one of the one or more BWPs configured for a first wireless device (e.g., the wireless device 1801) associated with the wireless device identifier (e.g., 1805-a). A BWP identifier may comprise m-bits. The BWP identifier 1805-b may be unique to the wireless device associated with the wireless device identifier 1805-a. Each BWP field (e.g., 1805 and 1806) may comprise a wireless device identifier and a BWP identifier that is unique to a wireless device. The wireless device 1801 may switch, select, and/or reselect an active BWP to the target BWP indicated by the BWP identifier, for example, if the first wireless device associated with the wireless device identifier is matched with, corresponds to, and/or is the same as the wireless device.

The wireless device 1801 may receive, from the base station 1802, one or more RRC messages comprising grant-free configuration parameters for indicating at least one of following: one or more bandwidth parts (BWPs); an indicator indicating one of the one or more BWPs as a default BWP; an information element (IE) indicating a group-common downlink control information (DCI) size and/or format; a first identifier of the wireless device 1801; and/or an RNTI. The wireless device 1801 may attempt a detection of a PDCCH with a group-common DCI at least based on a size associated with the one of the at least one IE. The group-common DCI 1804 may comprise at least one BWP identifier (e.g., 1805-b) associated with one of the one or more BWPs. The wireless device 1801 may determine, based on a presence or an absence of the first identifier in the group-common DC 18041, whether to switch a BWP to a first BWP associated with the at least one BWP identifier. The group-common DCI may be scrambled by at least the RNTI. The BWP may be one or more of following: an active UL BWP; an active DL BWP; an active UL/DL pair BWP; a default UL BWP; a default DL BWP; and/or a default UL/DL pair BWP.

Figure 19:
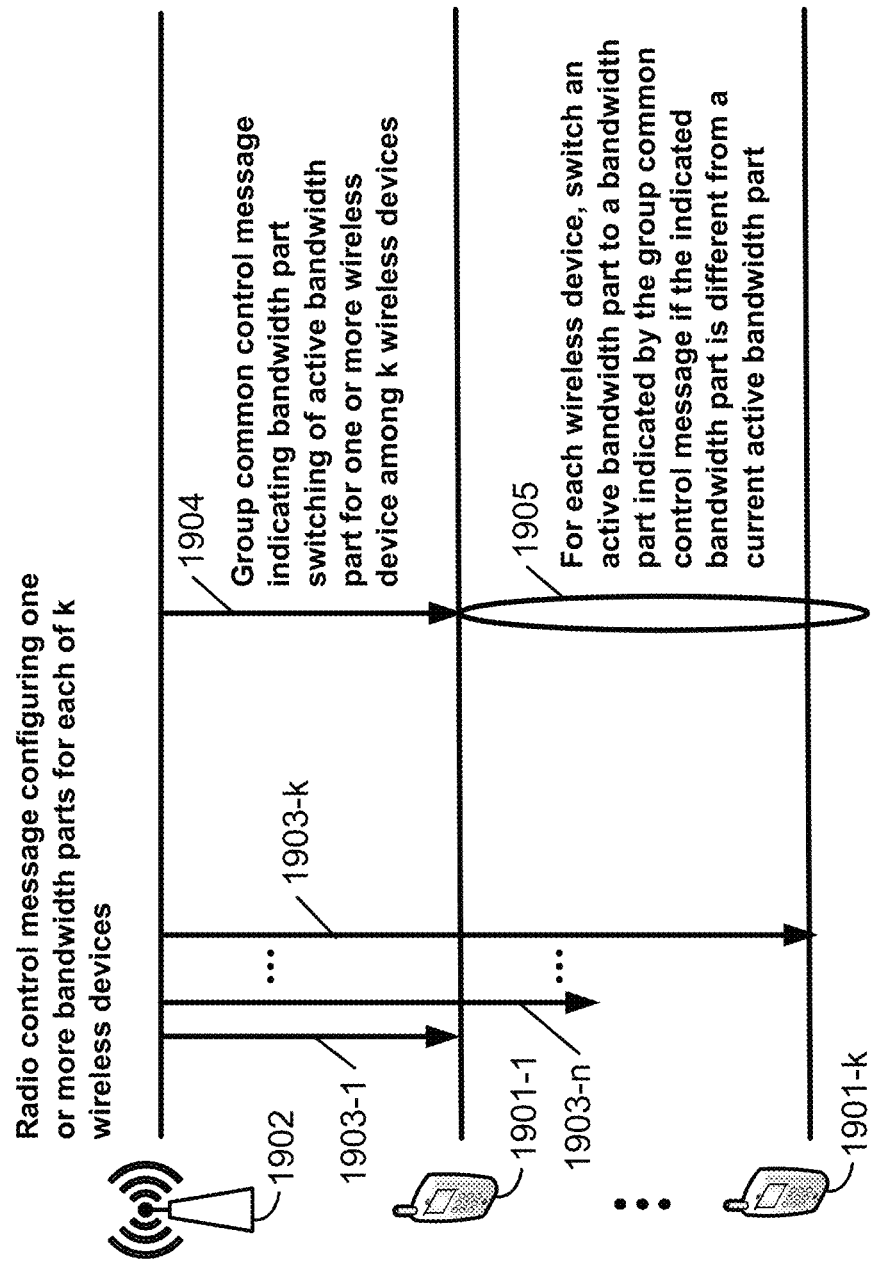
FIG. 19 shows an example for a group common control message.

FIG. 19 shows an example for a group common control message. One or more first messages may be sent for configuration of one or more BWPs for one or more wireless devices. One or more second messages may be sent for switching to an active BWP indicated by a group common control message. A base station 1902 may send, to one or more wireless devices 1901-1, 1901-n, to 1901-k, where n is any integer greater than 1, and k is any integer greater than or equal to n, one or more control messages. The base station 1902 may send one or more first RRC messages 1903-1 to the wireless device 1901-1. The base station 1902 may send one or more second RRC messages 1903-n to the wireless device 1901-n. The base station 1902 may send one or more third RRC messages 1903-k to the wireless device 1901-k. The one or more first RRC messages 1901-1, the one or more second RRC messages 1901-n, and the one or more third RRC messages 1901-k may comprise parameters for indicating a radio network temporary identifier used for detecting and/or decoding a group common control message 1904. The one or more first RRC messages 1901-1, the one or more second RRC messages 1901-n, and the one or more third RRC messages 1901-k may comprise parameters for configuring one or more BWPs for each of a respective k wireless devices. Each of a the respective k wireless devices may have the same or different BWP configurations. The base station 1902 may send, to the one or more wireless devices 1901-1, 1901-n, and/or 1901-k, a group common control message 1904. The group common control message 1904 may be scrambled by the radio network temporary identifier. The group common control message 1904 may comprise an indication for switching of an active BWP for the one or more wireless devices 1901-1, 1901-n, and/or 1901-k. Based on the indication for switching of an active BWP, the one or more wireless devices 1901-1, 1901-n, and/or 1901-k may switch an active BWP to a BWP indicated by the group common control message 1904. The BWP may be indicated in one or more ways. For example, the group common control message 1904 may comprise a BWP identifier of an active BWP that may be applied to one or more wireless devices among k wireless devices. The group common control message 1904 may comprise one or more BWP identifiers corresponding to one or more active BWPs, each of the one or more BWP identifiers may be associated with one of k wireless devices. A wireless device may identify a BWP identifier corresponding to the wireless device based on a position indicator configured with the wireless device. A wireless device may identify a BWP identifier corresponding the wireless device based on a wireless device identifier configured with the wireless device. The one or more wireless devices 1901-1, 1901-n, and/or 1901-k may switch an active BWP, for example, only if the BWP indicated in the group common control message 1904 is different from a current active BWP for the respective wireless device of the one or more wireless devices 1901-1, 1901-*n*, and/or 1901-*k*.

Figure 20:
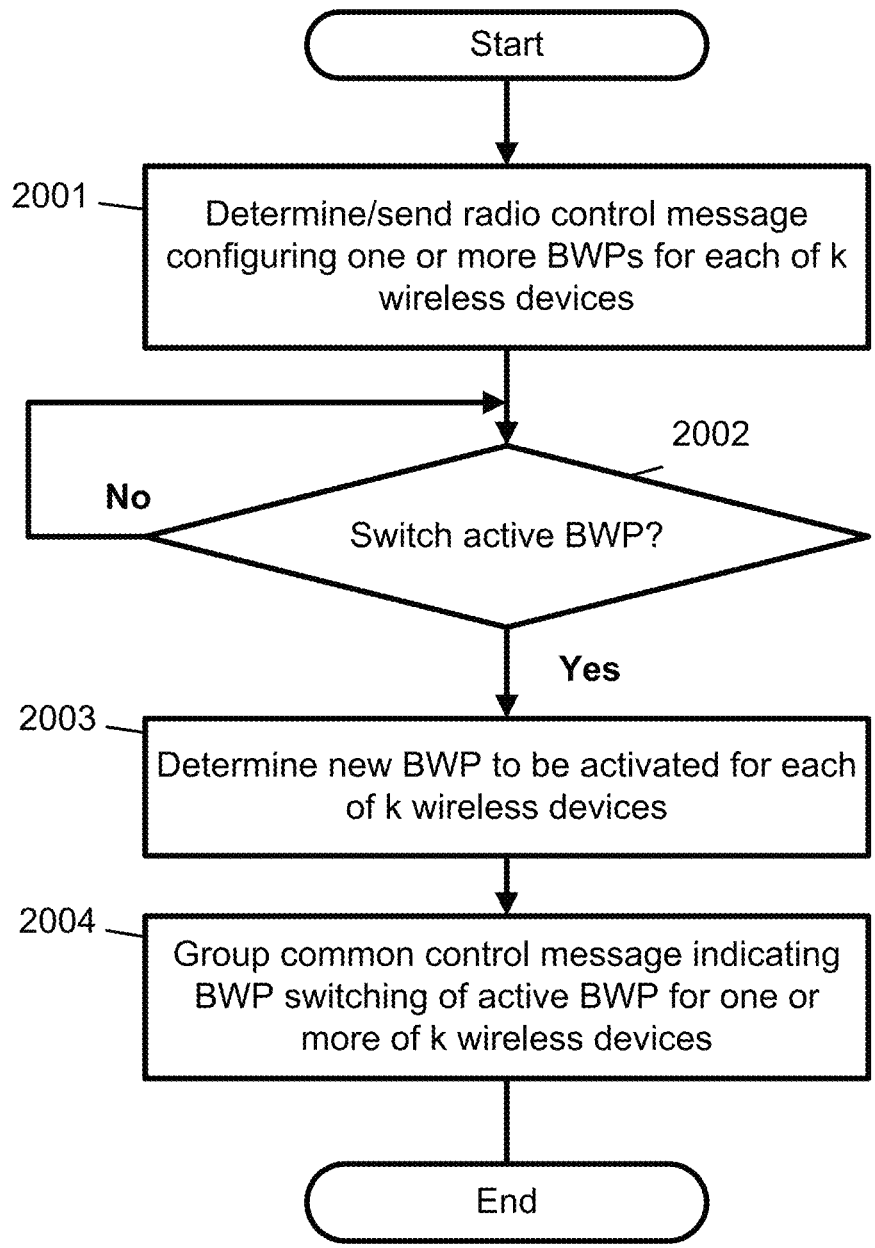
FIG. 20 shows an example of a group common control procedure for bandwidth part switching that may be performed by a base station.

FIG. 20 shows an example of a group common control procedure for BWP switching that may be performed by a base station. At step 2001, a base station may determine one or more BWPs for one or more of k wireless devices, where k may be any positive integer corresponding to a number of wireless devices in a cell served by the base station. The base station may send, to the one or more of k wireless devices, one or more radio control messages comprising configuration parameters for one or more BWPs for any number of the k wireless devices. At step 2002, the base station may determine to switch an active BWP for any number of the k wireless devices. This determination may be based on, for example, radio conditions in the cell or in neighboring cells. If a determination is not made to switch an active BWP, step 2002 may be repeated, for example, after a duration of time or upon the base station receiving an indication to switch an active BWP. If a determination is made to switch an active BWP, the process may continue to step 2003. At step 2003, the base station may determine one or more new BWPs to be activated for any of the k wireless devices. This determination may be based on, for example, radio resource usages of the k wireless devices. At step 2004, the base station may determine a group common control message indicating a BWP switching of an active BWP for one or more of the k wireless devices. The base station may send the group common control message to one or more of the k wireless devices.

Figure 21:
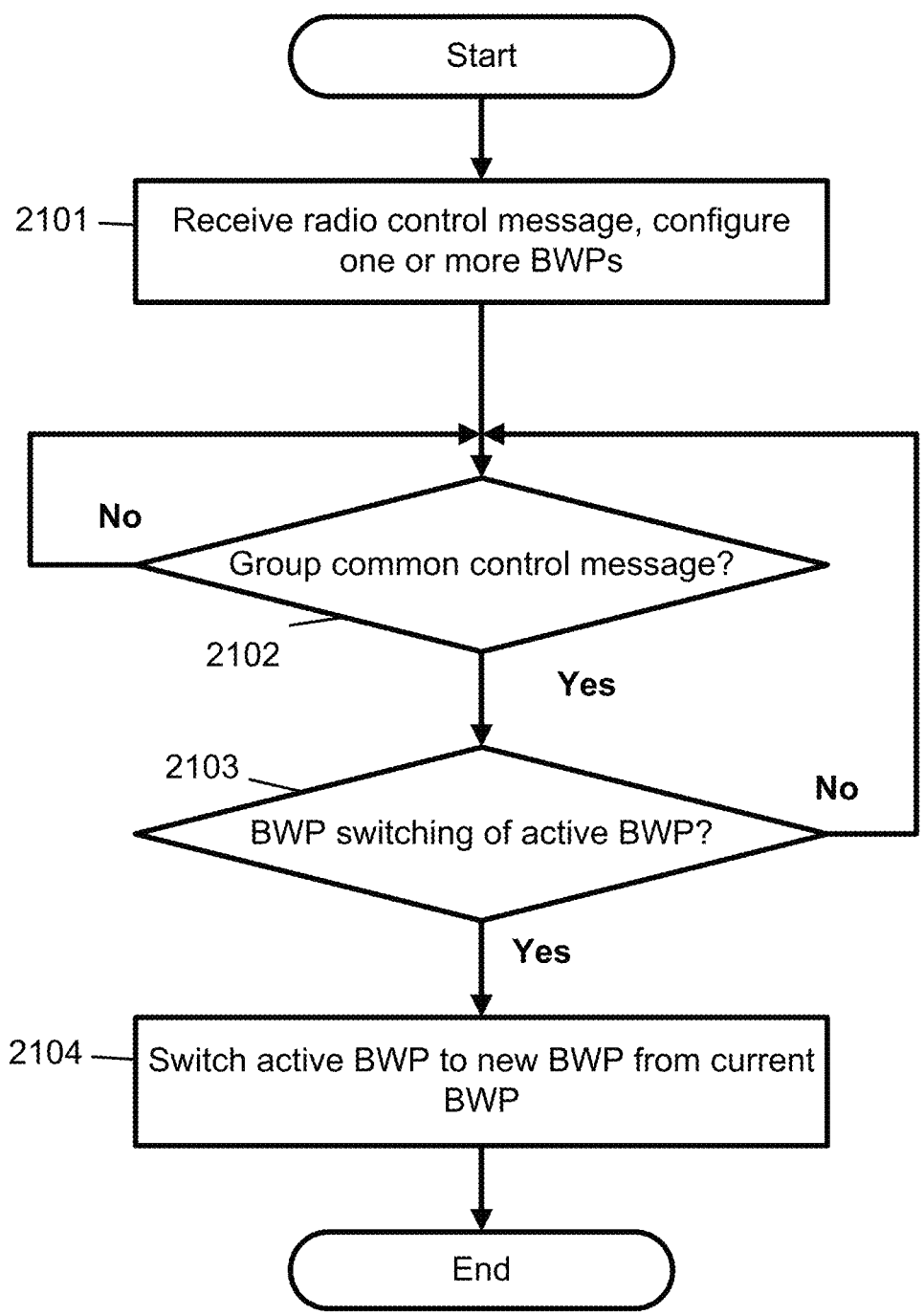
FIG. 21 shows an example of a group common control procedure for bandwidth part switching that may be performed by a wireless device.

FIG. 21 shows an example of a group common control procedure for BWP switching that may be performed by a wireless device. At step 2101, a wireless device may receive, from a base station, one or more radio control messages comprising configuration parameters for one or more BWPs. The wireless device may determine, based on the one or more radio control messages, an active BWP from one or more BWPs. At step 2102, the wireless device may determine whether a group common control message has been received. This determination may be based on an identifier in DCI. If a determination is made that a group common control message has not been received, step 2102 may be repeated, for example, after a duration of time or upon the wireless device receiving an indication of a group common control message. If a determination is made that a group common control message has been received, the process may continue to step 2103. At step 2103, the wireless device may determine whether to switch an active BWP. This determination may be based on whether an indication of a BWP in the group common control message is different from the active BWP for the wireless device. If a determination is made not to switch an active BWP, the process may return to step 2102. If a determination is made to switch an active BWP, the wireless device may proceed to step 2104. At step 2104, the wireless device may switch an active BWP to a new BWP from a current BWP. After the wireless device switches an active BWP, the process may repeat or end.

Figure 22:
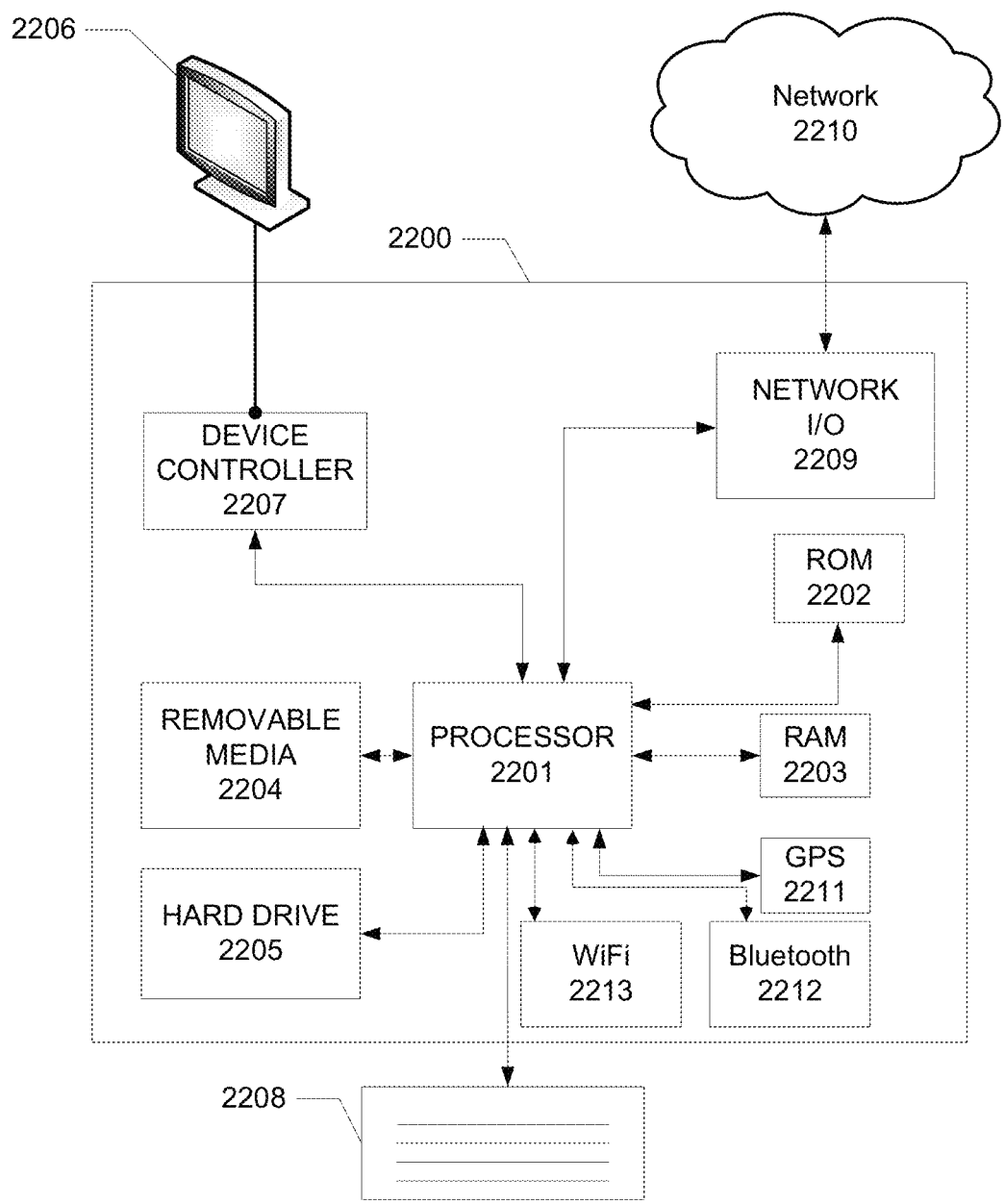
FIG. 22 shows example elements of a computing device that may be used to implement any of the various devices described herein.

FIG. 22 shows general hardware elements that may be used to implement any of the various computing devices discussed herein, including, for example, the base station 401, the wireless device 406, or any other base station, wireless device, or computing device described herein. The computing device 2200 may include one or more processors 2201, which may execute instructions stored in the random access memory (RAM) 2203, the removable media 2204 (such as a Universal Serial Bus (USB) drive, compact disk (CD) or digital versatile disk (DVD), or floppy disk drive), or any other desired storage medium. Instructions may also be stored in an attached (or internal) hard drive 2205. The computing device 2200 may also include a security processor (not shown), which may execute instructions of one or more computer programs to monitor the processes executing on the processor 2201 and any process that requests access to any hardware and/or software components of the computing device 2200 (e.g., ROM 2202, RAM 2203, the removable media 2204, the hard drive 2205, the device controller 2207, a network interface 2209, a GPS 2211, a Bluetooth interface 2212, a WiFi interface 2213, etc.). The computing device 2200 may include one or more output devices, such as the display 2206 (e.g., a screen, a display device, a monitor, a television, etc.), and may include one or more output device controllers 2207, such as a video processor. There may also be one or more user input devices 2208, such as a remote control, keyboard, mouse, touch screen, microphone, etc. The computing device 2200 may also include one or more network interfaces, such as a network interface 2209, which may be a wired interface, a wireless interface, or a combination of the two. The network interface 2209 may provide an interface for the computing device 2200 to communicate with a network 2210 (e.g., a RAN, or any other network). The network interface 2209 may include a modem (e.g., a cable modem), and the external network 2210 may include communication links, an external network, an in-home network, a provider's wireless, coaxial, fiber, or hybrid fiber/coaxial distribution system (e.g., a DOCSIS network), or any other desired network. Additionally, the computing device 2200 may include a location-detecting device, such as a global positioning system (GPS) microprocessor 2211, which may be configured to receive and process global positioning signals and determine, with possible assistance from an external server and antenna, a geographic position of the computing device 2200.

The example in FIG. 22 is a hardware configuration, although the components shown may be implemented as software as well. Modifications may be made to add, remove, combine, divide, etc. components of the computing device 2200 as desired. Additionally, the components may be implemented using basic computing devices and components, and the same components (e.g., processor 2201, ROM storage 2202, display 2206, etc.) may be used to implement any of the other computing devices and components described herein. For example, the various components described herein may be implemented using computing devices having components such as a processor executing computer-executable instructions stored on a computer-readable medium, as shown in FIG. 22. Some or all of the entities described herein may be software based, and may co-exist in a common physical platform (e.g., a requesting entity may be a separate software process and program from a dependent entity, both of which may be executed as software on a common computing device).

One or more features of the disclosure may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features of the disclosure, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a UE, a base station, and the like) to enable operation of multi-carrier communications described herein. The device, or one or more devices such as in a system, may include one or more processors, memory, interfaces, and/or the like. Other examples may comprise communication networks comprising devices such as base stations, wireless devices or user equipment (UE), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   receiving, by a wireless device from a base station, one or more messages comprising an indication of a field, among a plurality of fields in downlink control information (DCI), that the wireless device should use for bandwidth part switching;
   receiving, via a control channel of a first bandwidth part, the DCI comprising the plurality of fields, wherein each field of the plurality of fields indicates a bandwidth part for a different wireless device; and
   switching from the first bandwidth part to a second bandwidth part indicated by the field.

2. The method of claim 1, wherein the switching comprises deactivating the first bandwidth part.

3. The method of claim 1, wherein the switching comprises activating the second bandwidth part.

4. The method of claim 1, further comprising:
   receiving, via a second control channel of the second bandwidth part, second DCI comprising a second plurality of fields; and
   reselecting, based on a determination that a field associated with the wireless device indicates the second bandwidth part, the second bandwidth part.

5. The method of claim 1, wherein the one or more messages further comprise a timer value for a second bandwidth part inactivity timer associated with the second bandwidth part, and wherein the method further comprises:
   starting, based on the timer value and based on the switching, the second bandwidth part inactivity timer.

6. The method of claim 5, wherein the one or more messages further comprises an indication of a default bandwidth part, and wherein the method further comprises:
   switching, based on an expiry of the second bandwidth part inactivity timer, from the second bandwidth part to the default bandwidth part.

7. The method of claim 1, wherein the one or more messages further comprises an indication a configured grant of the first bandwidth part, and wherein the method further comprises clearing the configured grant after the switching.

8. The method of claim 1, wherein the one or more messages further comprises a radio network identifier.

9. The method of claim 8, wherein the DCI is scrambled by the radio network identifier.

10. The method of claim 1, wherein the indication of the field comprises an index associated with the wireless device, wherein the method further comprises determining, based on the index, a position of the field in the DCI.

11. The method of claim 10, wherein the index differs from each of a plurality of other indices each associated with one of a plurality of other wireless devices.

12. The method of claim 1, wherein the indication of the field comprises a wireless device-specific identifier associated with the wireless device, wherein the method further comprises determining, based on a wireless device identifier in the DCI indicating the wireless device-specific identifier, the field.

13. A wireless device comprising:
one or more processors; and
memory storing instructions that, when executed by the one or more processors, cause the wireless device to:
receive, from a base station, one or more messages comprising an indication of a field, among a plurality of fields in downlink control information (DCI), that the wireless device should use for bandwidth part switching;
receive, via a control channel of a first bandwidth part, the DCI comprising the plurality of fields, wherein each field of the plurality of fields indicates a bandwidth part for a different wireless device; and
switch from the first bandwidth part to a second bandwidth part indicated by the field.

14. The wireless device of claim 13, wherein the instructions, when executed by the one or more processors, cause the wireless device to deactivate, based on switching from the first bandwidth part to the second bandwidth part, the first bandwidth part.

15. The wireless device of claim 13, wherein the instructions, when executed by the one or more processors, cause the wireless device to activate, prior to switching from the first bandwidth part to the second bandwidth part, the second bandwidth part.

16. The wireless device of claim 13, wherein the instructions, when executed by the one or more processors, cause the wireless device to:
receive, via a second control channel of the second bandwidth part, second DCI comprising a second plurality of fields; and
reselect, based on a determination that a field associated with the wireless device indicates the second bandwidth part, the second bandwidth part.

17. The wireless device of claim 13, wherein the one or more messages further comprise a timer value for a second bandwidth part inactivity timer associated with the second bandwidth part, and wherein the instructions, when executed by the one or more processors, cause the wireless device to:
start, based on the timer value and based on switching from the first bandwidth part to the second bandwidth part, the second bandwidth part inactivity timer.

18. The wireless device of claim 17, wherein the one or more messages further comprises an indication of a default bandwidth part, and wherein the instructions, when executed by the one or more processors, cause the wireless device to:
switch, based on an expiry of the second bandwidth part inactivity timer, from the second bandwidth part to the default bandwidth part.

19. The wireless device of claim 13, wherein the one or more messages further comprises an indication a configured grant of the first bandwidth part, and wherein the instructions, when executed by the one or more processors, cause the wireless device to clear the configured grant after switching from the first bandwidth part to the second bandwidth part.

20. The wireless device of claim 13, wherein the one or more messages further comprises a radio network identifier.

21. The wireless device of claim 20, wherein the instructions, when executed by the one or more processors, cause the wireless device to descramble the DCI using the radio network identifier.

22. The wireless device of claim 13, wherein the indication of the field comprises an index associated with the wireless device, wherein the instructions, when executed by the one or more processors, cause the wireless device to determine, based on the index, a position of the field in the DCI.

23. The wireless device of claim 22, wherein the index differs from each of a plurality of other indices each associated with one of a plurality of other wireless devices.

24. The wireless device of claim 13, wherein the indication of the field comprises a wireless device-specific identifier associated with the wireless device, wherein the instructions, when executed by the one or more processors, cause the wireless device to determine, based on a wireless device identifier in the DCI indicating the wireless device-specific identifier, the field.

25. A non-transitory computer-readable medium comprising instructions that, when executed, configure a wireless device to:
receive, from a base station, one or more messages comprising an indication of a field, among a plurality of fields in downlink control information (DCI), that the wireless device should use for bandwidth part switching;
receive, via a control channel of a first bandwidth part, the DCI comprising the plurality of fields, wherein each field of the plurality of fields indicates a bandwidth part for a different wireless device; and
switch from the first bandwidth part to a second bandwidth part indicated by the field.

26. The non-transitory computer-readable medium of claim 25, wherein the instructions, when executed, configure the wireless device to deactivate, based on switching from the first bandwidth part to the second bandwidth part, the first bandwidth part.

27. The non-transitory computer-readable medium of claim 25, wherein the instructions, when executed, configure the wireless device to activate, prior to switching from the first bandwidth part to the second bandwidth part, the second bandwidth part.

28. The non-transitory computer-readable medium of claim 25, wherein the instructions, when executed, configure the wireless device to:
receive, via a second control channel of the second bandwidth part, second DCI comprising a second plurality of fields; and
reselect, based on a determination that a field associated with the wireless device indicates the second bandwidth part, the second bandwidth part.

29. The non-transitory computer-readable medium of claim 25, wherein the one or more messages further comprise a timer value for a second bandwidth part inactivity timer associated with the second bandwidth part, and wherein the instructions, when executed, configure the wireless device to:
start, based on the timer value and based on switching from the first bandwidth part to the second bandwidth part, the second bandwidth part inactivity timer.

30. The non-transitory computer-readable medium of claim 29, wherein the one or more messages further comprises an indication of a default bandwidth part, and wherein the instructions, when executed, configure the wireless device to:
switch, based on an expiry of the second bandwidth part inactivity timer, from the second bandwidth part to the default bandwidth part.

31. The non-transitory computer-readable medium of claim 25, wherein the one or more messages further comprises an indication a configured grant of the first bandwidth part, and wherein the instructions, when executed, configure the wireless device to clear the configured grant after switching from the first bandwidth part to the second bandwidth part.

32. The non-transitory computer-readable medium of claim 25, wherein the one or more messages further comprises a radio network identifier.

33. The non-transitory computer-readable medium of claim 32, wherein the instructions, when executed, configure the wireless device to descramble the DCI using the radio network identifier.

34. The non-transitory computer-readable medium of claim 25, wherein the indication of the field comprises an index associated with the wireless device, wherein the instructions, when executed, configure the wireless device to determine, based on the index, a position of the field in the DCI.

35. The non-transitory computer-readable medium of claim 34, wherein the index differs from each of a plurality of other indices each associated with one of a plurality of other wireless devices.

36. The non-transitory computer-readable medium of claim 25, wherein the indication of the field comprises a wireless device-specific identifier associated with the wireless device, wherein the instructions, when executed, configure the wireless device to determine, based on a wireless device identifier in the DCI indicating the wireless device-specific identifier, the field.

\* \* \* \* \*